the plurality of generated packets to a data receiving apparatus. Each of the plurality of packets includes an identifier field to distinguish a position or an order of the packets.

(12) United States Patent
Kim et al.

(10) Patent No.: US 9,661,107 B2
(45) Date of Patent: May 23, 2017

(54) DATA TRANSMITTING APPARATUS, DATA RECEIVING APPARATUS, DATA TRANSCEIVING SYSTEM, DATA TRANSMITTING METHOD, DATA RECEIVING METHOD AND DATA TRANSCEIVING METHOD CONFIGURED TO DISTINGUISH PACKETS

(71) Applicant: SAMSUNG ELECTRONICS CO., LTD., Suwon-si (KR)

(72) Inventors: Jong-hwa Kim, Suwon-si (KR); Soo-young Kim, Suwon-si (KR); Il-ju Na, Seongnam-si (KR); Suk-jin Yun, Seoul (KR); Jae-min Lee, Suwon-si (KR); Kyeong-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 13/768,330

(22) Filed: Feb. 15, 2013

(65) Prior Publication Data

US 2013/0223448 A1  Aug. 29, 2013

Related U.S. Application Data

(60) Provisional application No. 61/602,978, filed on Feb. 24, 2012, provisional application No. 61/602,975, (Continued)

(30) Foreign Application Priority Data

Nov. 2, 2012  (KR) .................. 10-2012-0123638

(51) Int. Cl.
  *H04L 29/06* (2006.01)
  *H04N 21/4363* (2011.01)
  (Continued)

(52) U.S. Cl.
  CPC .......... *H04L 69/22* (2013.01); *H04N 21/439* (2013.01); *H04N 21/43635* (2013.01);
  (Continued)

(58) Field of Classification Search
  CPC ............ G09G 2370/04; G09G 2370/12; G10L 19/167; H04L 27/10; H04L 69/22;
  (Continued)

(56) References Cited

U.S. PATENT DOCUMENTS

| 6,757,659 B1 | 6/2004 | Tanaka et al. |
| 7,092,365 B1 | 8/2006 | Tackin et al. |

(Continued)

FOREIGN PATENT DOCUMENTS

| CN | 1462522 A | 12/2003 |
| CN | 1678055 A | 10/2005 |

(Continued)

OTHER PUBLICATIONS

Communication dated Nov. 17, 2014, issued by the United States Patent and Trademark Office in counterpart U.S. Appl. No. 13/768,412.

(Continued)

*Primary Examiner* — Paul McCord
*Assistant Examiner* — Alexander Eljaiek
(74) *Attorney, Agent, or Firm* — Sughrue Mion, PLLC

(57) ABSTRACT

A data transmitting apparatus includes a packet generator which generates a plurality of packets regarding multi-channel audio sample data and transmitter which transmits the plurality of generated packets to a data receiving apparatus. Each of the plurality of packets includes an identifier field to distinguish a position or an order of the packets.

32 Claims, 19 Drawing Sheets

Related U.S. Application Data filed on Feb. 24, 2012, provisional application No. 61/604,844, filed on Feb. 29, 2012, provisional application No. 61/604,892, filed on Feb. 29, 2012, provisional application No. 61/611,822, filed on Mar. 16, 2012, provisional application No. 61/613,629, filed on Mar. 21, 2012, provisional application No. 61/636,901, filed on Apr. 23, 2012, provisional application No. 61/636,879, filed on Apr. 23, 2012, provisional application No. 61/647,628, filed on May 16, 2012, provisional application No. 61/641,580, filed on May 2, 2012, provisional application No. 61/599,154, filed on Feb. 15, 2012.

(51) Int. Cl.
 *H04N 21/439* (2011.01)
 *G09G 5/00* (2006.01)

(52) U.S. Cl.
 CPC ......... *G09G 5/006* (2013.01); *G09G 2370/04* (2013.01); *G09G 2370/12* (2013.01)

(58) Field of Classification Search
 CPC .. H04N 21/43635; H04N 21/439; H04R 5/00; H04S 3/00
 USPC ........... 348/462; 370/392, 474, 476; 381/17; 700/94
 See application file for complete search history.

(56) References Cited

U.S. PATENT DOCUMENTS

| | | |
|---|---|---|
| 7,286,602 B2 | 10/2007 | Ichimura |
| 7,551,972 B2 | 6/2009 | Tanaka et al. |
| 7,840,412 B2 | 11/2010 | Aprea et al. |
| 7,860,720 B2 | 12/2010 | Thumpudi et al. |
| 8,072,549 B2 | 12/2011 | Inoue et al. |
| 8,170,239 B2 | 5/2012 | Bailey et al. |
| 8,199,161 B2 | 6/2012 | Kaga |
| 8,366,552 B2 | 2/2013 | Perlman et al. |
| 8,488,796 B2 | 7/2013 | Jot et al. |
| 8,625,589 B2 | 1/2014 | Chen et al. |
| 9,100,671 B2 | 8/2015 | Hwang et al. |
| 9,154,585 B2 | 10/2015 | Kim et al. |
| 2003/0169782 A1 | 9/2003 | Ichimura |
| 2003/0208771 A1 | 11/2003 | Hensgen et al. |
| 2004/0249490 A1 | 12/2004 | Sakai |
| 2005/0220193 A1 | 10/2005 | Ichimura |
| 2006/0013405 A1 | 1/2006 | Oh et al. |
| 2006/0265227 A1 | 11/2006 | Sadamura et al. |
| 2006/0285012 A1 | 12/2006 | Ejima et al. |
| 2007/0186015 A1 | 8/2007 | Taft et al. |
| 2007/0189411 A1 | 8/2007 | Gos |
| 2007/0198551 A1 | 8/2007 | Barnes et al. |
| 2008/0080596 A1 | 4/2008 | Inoue et al. |
| 2008/0101458 A1 | 5/2008 | Kwon et al. |
| 2009/0027405 A1 | 1/2009 | Kaga |
| 2009/0118017 A1 | 5/2009 | Perlman et al. |
| 2009/0290600 A1* | 11/2009 | Tatsuta et al. ............... 370/476 |
| 2010/0027819 A1 | 2/2010 | Van De Berghe et al. |
| 2010/0033627 A1* | 2/2010 | Hayashi et al. ............. 348/500 |
| 2010/0215044 A1 | 8/2010 | Lee et al. |
| 2010/0303246 A1 | 12/2010 | Walsh et al. |
| 2011/0142245 A1 | 6/2011 | Toba et al. |
| 2011/0153043 A1 | 6/2011 | Ojala |
| 2011/0157308 A1 | 6/2011 | Mansho |
| 2011/0170614 A1 | 7/2011 | Moriyama et al. |
| 2011/0194701 A1 | 8/2011 | Zhan et al. |
| 2011/0196681 A1 | 8/2011 | Ibaraki et al. |
| 2011/0234760 A1 | 9/2011 | Yang et al. |
| 2012/0014396 A1 | 1/2012 | Bae |
| 2012/0140035 A1 | 6/2012 | Oh et al. |
| 2012/0140753 A1 | 6/2012 | Lee et al. |
| 2012/0218914 A1* | 8/2012 | Tanaka .................. H04L 1/1874 370/253 |
| 2012/0218981 A1 | 8/2012 | Lee et al. |
| 2013/0222690 A1 | 8/2013 | Kim et al. |
| 2013/0223448 A1 | 8/2013 | Kim et al. |
| 2013/0223456 A1 | 8/2013 | Kim et al. |
| 2013/0223632 A1 | 8/2013 | Kim et al. |
| 2014/0267905 A1 | 9/2014 | Lee et al. |
| 2014/0321527 A1* | 10/2014 | Inata ................ H04N 21/44209 375/240.01 |

FOREIGN PATENT DOCUMENTS

| | | |
|---|---|---|
| CN | 1756086 A | 4/2006 |
| CN | 1960498 A | 5/2007 |
| CN | 101129069 A | 2/2008 |
| CN | 101355672 A | 1/2009 |
| CN | 101491002 A | 7/2009 |
| CN | 101563921 A | 10/2009 |
| EP | 1 617 413 A2 | 1/2006 |
| EP | 2 023 632 A1 | 2/2009 |
| EP | 2 148 326 A1 | 1/2010 |
| EP | 2 276 192 A2 | 1/2011 |
| EP | 2 388 688 A1 | 11/2011 |
| EP | 2 453 659 A2 | 5/2012 |
| JP | 2006-294120 A | 10/2006 |
| JP | 2011-124925 A | 6/2011 |
| JP | 2011-155640 A | 8/2011 |
| KR | 10-2008-0065820 A | 7/2008 |
| KR | 10-2009-0066582 A | 6/2009 |
| KR | 10-1099345 B1 | 12/2011 |
| WO | 2009/134085 A2 | 11/2009 |
| WO | 2011/002141 A1 | 1/2011 |
| WO | 2011/005056 A2 | 1/2011 |

OTHER PUBLICATIONS

Communication, Issued by the United States Patent and Trademark Office, Dated Aug. 1, 2014, in counterpart U.S. Appl. No. 13/768,412.
Search Report dated May 31, 2013 issued by the International Searching Authority in counterpart Application No. PCT/KR2013/001128 (PCT/ISA/210).
Written Opinion dated May 31, 2013 issued by the International Searching Authority in counterpart Application No. PCT/KR2013/001128 (PCT/ISA/237).
Search Report dated May 31, 2013 issued by the International Searching Authority in counterpart Application No. PCT/KR2013/001130 (PCT/ISA/210).
Written Opinion dated May 31, 2013 issued by the International Searching Authority in counterpart Application No. PCT/KR2013/001130 (PCT/ISA/237).
Search Report dated Jun. 20, 2013 issued by the International Searching Authority in counterpart Application No. PCT/KR2013/001129 (PCT/ISA/210).
Written Opinion dated Jun. 20, 2013 issued by the International Searching Authority in counterpart Application No. PCT/KR2013/001129 (PCT/ISA/237).
Search Report dated Jun. 14, 2013 issued by the International Searching Authority in counterpart Application No. PCT/KR2013/001131 (PCT/ISA/210).
Written Opinion dated Jun. 14, 2013 issued by the International Searching Authority in counterpart Application No. PCT/KR2013/001131 (PCT/ISA/237).
Communication, dated Apr. 15, 2014, issued by the European Patent Office in counterpart European Patent Application No. 13155194.7.
Communication, dated Apr. 17, 2014, issued by the European Patent Office in counterpart European Patent Application No. 13155154.1.
"A DTV Profile for Uncompressed High Speed Digital Interfaces CEA-861-E," Consumer Electronics Association, Mar. 31, 2008, 160 pages total, http://blogimg.chinaunix.net/blog/upfile2/090903185624.pdf.
"Information technology—MPEG audio technologies—Part 1: MPEG Surround," ISO/IEC JTC1/SC29/WG11, ISO/IEC FDIS 23003-1 :2006(E), No. N8324, Jul. 21, 2006, 289 pages total.

(56) References Cited

OTHER PUBLICATIONS

Stockfisch, Mark W., "Prospective Standards for In-Home 3D Entertainment Products," 2010 Digest of Technical Papers, International Conference on Consumer Electronics (ICCE), IEEE, Jan. 9, 2010, pp. 133-134.
Communication dated Apr. 22, 2015 issued by the European Patent Office in counterpart European Patent Application No. 13155294.5.
Communication dated Apr. 22, 2015 issued by the European Patent Office in counterpart European Patent Application No. 13155273.9.
Communication dated May 21, 2015 issued by Untied States Patent and Trademark Office in counterpart U.S. Appl. No. 13/768,412.
Communication dated Jan. 25, 2016, from the State Intellectual Property Office of People's Republic of China in counterpart Application No. 201380020188.X.
Communication dated Jan. 26, 2016, from the State Intellectual Property Office of People's Republic of China in counterpart Application No. 201380020186.0.
Communication dated Jan. 29, 2016, from the State Intellectual Property Office of People's Republic of China in counterpart Application No. 201310052879.X.
Communication from United States Patent and Trademark Office issued Apr. 4, 2016 in counterpart U.S. Appl. No. 14/662,971.
Communication dated Nov. 13, 2015, issued by the United States Patent and Trademark Office in counterpart U.S. Appl. No. 14/662,971.
Communication dated Dec. 31, 2015, issued by the State Intellectual Property Office of P.R. China in counterpart Chinese Application No. 201310053145.3.
Communication dated Aug. 16, 2016, issued by the State Intellectual Property Office of P.R. China in counterpart Chinese application No. 201310052879.X.

1394 Trade Association, "Audio and Music Data Transmission Protocol 2.2, Revision 1.1"; Document 2009013, Oct. 13, 2010, total 141 pages.
"22.2 Mulitchannel Audio Format Standardization Activity", Broadcast Technology No. 45, Summer 2011, pp. 14-19.
Communication dated May 18, 2016, issued by the European Patent Office in counterpart European Application No. 13155194.7.
Office Action issued on May 20, 2016 by the United States Patent and Trademark Office in related U.S. Appl. No. 13/768,181.
Notice of Allowance issued on Jun. 29, 2016 by the United States Patent and Trademark Office in related U.S. Appl. No. 14/662,971.
Communication dated Jul. 6, 2016, issued by the State Intellectual Property Office of P.R. China in counterpart Chinese application No. 201380020186.0.
Communication dated Jul. 11, 2016, issued by the European Patent Office in counterpart European Application No. 13155154.1.
Communication dated Jun. 17, 2015 issued by the United States Patent and Trademark Office in counterpart U.S. Appl. No. 13/768,530.
Communication dated Aug. 20, 2015 issued by the European Patent Office in counterpart European Patent Application No. 13 155 154.1.
Communication dated Dec. 12, 2016 issued by Korean Intellectual Property Office in counterpart Korean Application No. 10-2013-0000373.
Communication dated Dec. 23, 2016 issued by European Patent Office in counterpart European Application No. 13 155 294.5.
Communication dated Jan. 17, 2017 issued by the State Intellectual Property Office of P.R. China in counterpart Chinese Application No. 201380020186.0.
Communication dated Jan. 26, 2017 issued by United States Patent and Trademark Office in counterpart U.S. Appl. No. 13/768,181.
Communication dated Jan. 30, 2017 issued by European Patent Office in counterpart European Application No. 13 155 273.9.

* cited by examiner

FIG. 8
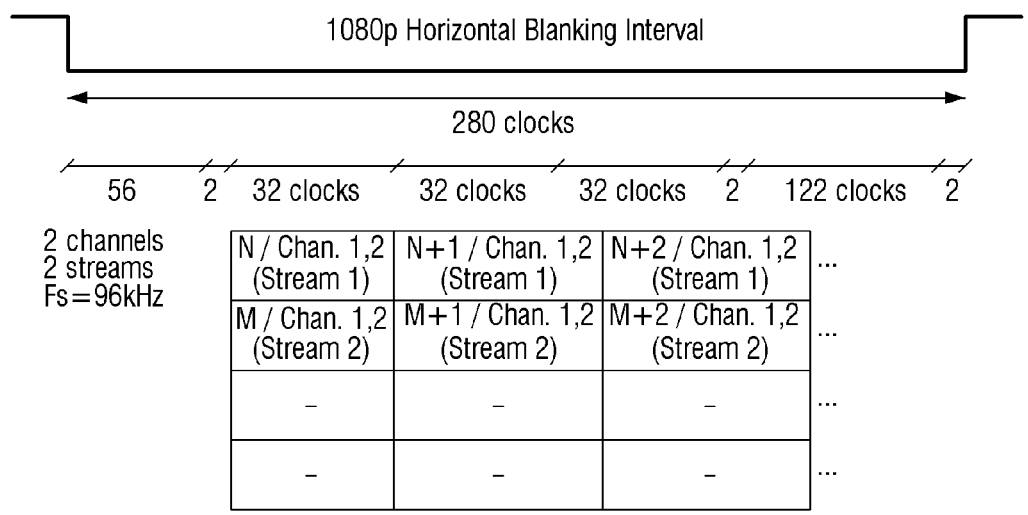
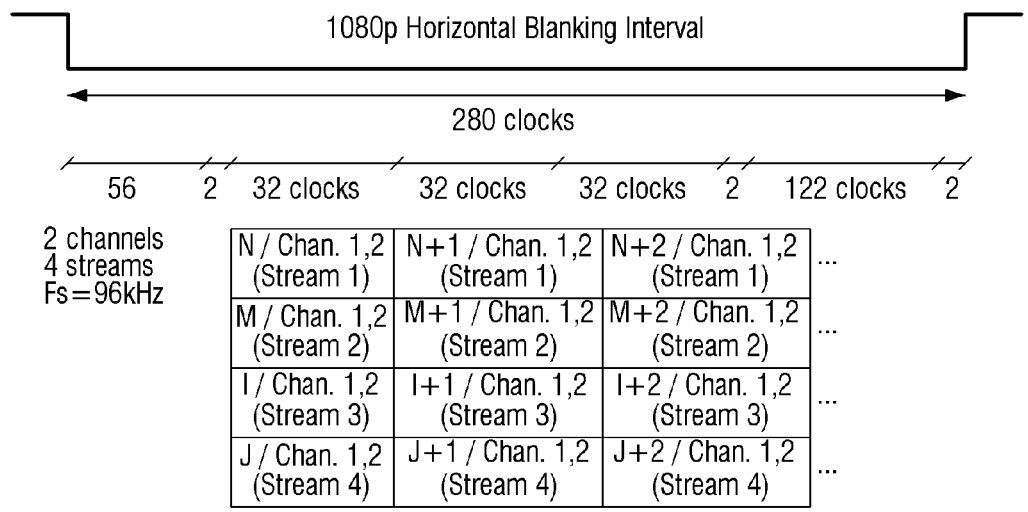

FIG. 11
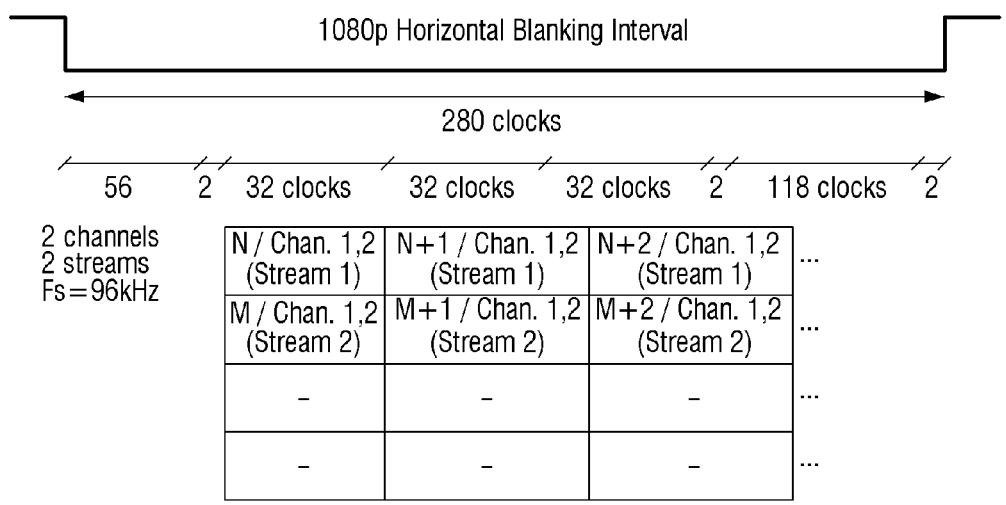
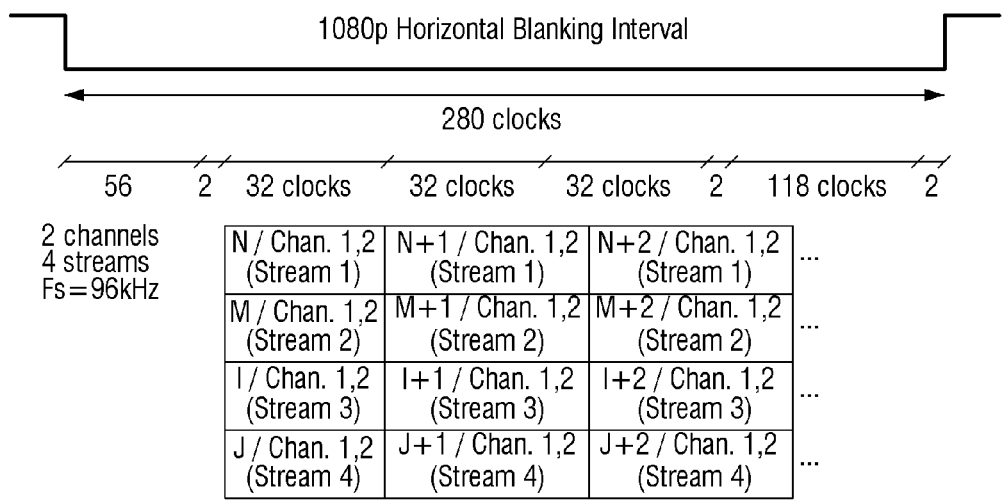

FIG. 12

Device ---<Request Speaker Position> [Speaker identifier]---> TV

<---<Response Speaker Position> [Speaker identifier][Speaker position data]---

CEC Figure 38 Typical operation to get the position of a speaker

CEC Table 29 Operand Descriptions

| Name | | Range Description | | Length | Purpose |
|---|---|---|---|---|---|
| [Speaker position data] | "x_offset" | | | 1 Byte | Used by a source to get the gap away from the default X of a speaker |
| | "y_offset" | | | 1 Byte | Used by a source to get the gap away from the default Y of a speaker |
| | "z_offset" | | | 1 Byte | Used by a source to get the gap away from the default Z of a speaker |
| | "Angle_offset" | | | 2 Bytes | Used by a source to get the gap away from the default angle of a speaker |
| [Speaker identifier] | | "front left" | 0x00 | 5 bits | Specifies the type of speaker placement |
| | | "front right" | 0x01 | | |
| | | ... | 0x01 | | |
| | | "LFE2" | 0x1F | | |

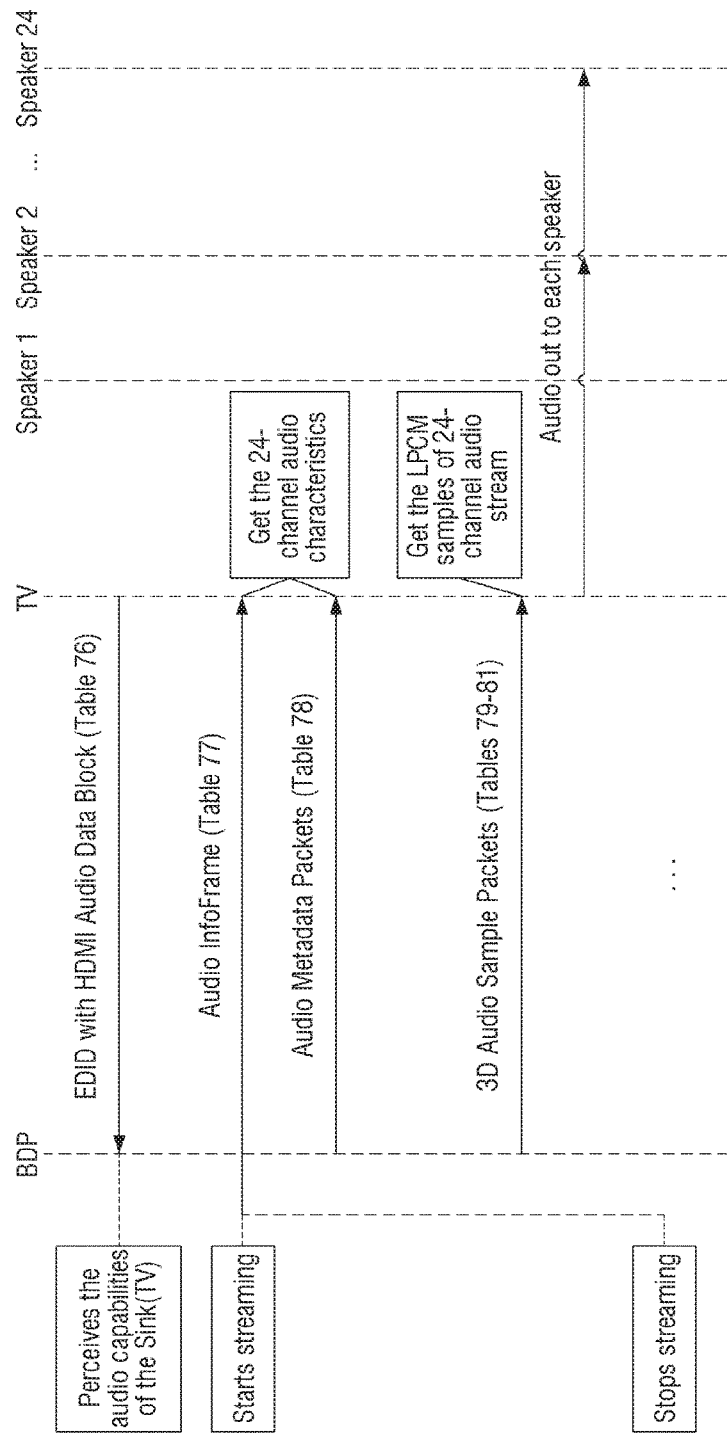

DATA TRANSMITTING APPARATUS, DATA RECEIVING APPARATUS, DATA TRANSCEIVING SYSTEM, DATA TRANSMITTING METHOD, DATA RECEIVING METHOD AND DATA TRANSCEIVING METHOD CONFIGURED TO DISTINGUISH PACKETS

CROSS-REFERENCE TO RELATED APPLICATIONS

This application claims priority of U.S. Provisional Application No. 61/613,629, filed on Mar. 21, 2012, in the U.S. Patent and Trademark Office, 61/602,975, filed on Feb. 24, 2012, in the U.S. Patent and Trademark Office, 61/599,154, filed on Feb. 15, 2012, in the U.S. Patent and Trademark Office, 61/602,978, filed on Feb. 24, 2012, in the U.S. Patent and Trademark Office, 61/611,822, filed on Mar. 16, 2012, in the U.S. Patent and Trademark Office, 61/604,892, filed on Feb. 29, 2012, in the U.S. Patent and Trademark Office, 61/636,879, filed on Apr. 23, 2012, in the U.S. Patent and Trademark Office, 61/636,901, filed on Apr. 23, 2012, in the U.S. Patent and Trademark Office, 61/641,580, filed on May 2, 2012, in the U.S. Patent and Trademark Office, 61/647,628, filed on May 16, 2012, in the U.S. Patent and Trademark Office, 61/604,844, filed on Feb. 29, 2012, in the U.S. Patent and Trademark Office, and Korean Patent Application No. 10-2012-0123638, filed on Nov. 2, 2012, in the Korean Intellectual Property Office, the disclosures of which are incorporated herein by reference in their entirety.

BACKGROUND

1. Field

Apparatuses and methods consistent with the exemplary embodiments disclosed herein relate to a data transreceiving apparatus and method, and more specifically, to a data transmitting apparatus which transmits multi-channel audio signals in a wiry interface environment, a data receiving apparatus, a data transreceiving system, a data transmitting method, a data receiving method and a data transreceiving method.

2. Description of the Related Art

As multi-media environments have recently been implemented, various wiry interface environments for transmitting data have been proposed. For instance, High-Definition Multimedia Interface (HDMI) and Mobile High-Definition Link (MHL) regulate transmitting standards of video data, audio signals, and controlling signals in various formats. Specifically, according to the advancement of the multi-media environment, transmitting standards of multi-channel audio signals are being actively discussed in order to implement transmission of high quality of sounds.

So far, standards regarding audio channels from 2 to 8 channels have been suggested. However, in the multi-media environment, transmitting standards of audio signals having 9 or more than 9 channels may be required. When transmitting the multi-channel audio signals, various formats and device environments that are used traditionally should be considered.

SUMMARY

Exemplary embodiments may overcome the above disadvantages and other disadvantages not described above. Also, the exemplary embodiments are not required to overcome the disadvantages described above, and an exemplary embodiment may not overcome any of the problems described above.

The exemplary embodiments are proposed to solve the problems as described above, and an aspect of the exemplary embodiments is to provide a data transmitting apparatus, which may include a packet generator which generates a plurality of packets regarding multi-channel audio sample data, and a transmitter which transmits the plurality of generated packets to a data receiving apparatus. Each of the plurality of generated packets may include an identifier field to distinguish a position or an order of the packets.

The identifier field may include predetermined bits indicating whether a packet having the identifier field is a first packet of the multi-channel audio sample data.

The identifier field may include predetermined bits indicating a packet index having the identifier field.

Each of the plurality of generated packets may include at least one sub packet, and the at least one sub packet stores part of the multi-channel audio sample data.

Each of the plurality of generated packets may include at least one of a sample present bit indicating whether the at least one sub packet has the multi-channel audio sample data and a sample flat bit indicating whether audio sample data included in the sub packets is valid.

Each of the plurality of generated packets may include a plurality of sub packets, and the plurality of sub packets may each store part of the multi-channel audio sample data.

The multi-channel audio sample data may include audio signals of 9 or more channels.

The multi-channel audio sample data may be configured according to IEC 60958 format.

According to another aspect of the exemplary embodiments, a data receiving apparatus is provided, which may include a receiver which receives a plurality of packets regarding multi-channel audio sample data transmitted from a data transmitting apparatus; and a packet parser which parses the plurality of received packets. Each of the plurality of received packets may include an identifier field to distinguish a position or an order of the packets.

The identifier field may include predetermined bits indicating whether a packet having the identifier field is a first packet of the multi-channel audio sample data.

Each of the plurality of received packets may include at least one sub packet, and the at least one sub packet stores part of the multi-channel audio sample data.

Each of the plurality of received packets may include at least one of a sample present bit indicating whether the at least one sub packet has the multi-channel audio sample data and a sample flat bit indicating whether audio sample data included in the sub packets is valid.

Each of the plurality of received packets may include a plurality of sub packets, and the plurality of sub packets may each store part of the multi-channel audio sample data.

The multi-channel audio sample data includes audio signals of 9 or more channels.

The multi-channel audio sample data may be configured according to IEC 60958 format.

According to another aspect of the exemplary embodiments, a data transreceiving system is provided, which may include a data transmitting apparatus which generates a plurality of packets regarding multi-channel audio data and transmits the generated packets, and a data receiving apparatus which receives the plurality of transmitted packets and parses the received packets. Each of the plurality of packets may include an identifier field to distinguish a position or an order of the packets.

The identifier field may include predetermined bits indicating whether a packet having the identifier field is a first packet of the multi-channel audio sample data.

According to another aspect of the exemplary embodiments, a data transmitting method is provided, which may include generating a plurality of packets regarding multi-channel audio sample data, and transmitting the plurality of generated packets to a data receiving apparatus. Each of the plurality of generated packets may include an identifier field to distinguish a position or an order of the packets.

The identifier field may include predetermined bits indicating whether a packet having the identifier field is a first packet of the multi-channel audio sample data.

According to another aspect of the exemplary embodiments, a data receiving method is provided, which may include receiving a plurality of packets regarding multi-channel audio sample data transmitted from a data transmitting apparatus, and parsing the plurality of received packets. Each of the plurality of received packets may include an identifier field to distinguish a position or an order of the packets.

The identifier field may include predetermined bits indicating whether a packet having the identifier field is a first packet of the multi-channel audio sample data.

According to another aspect of the exemplary embodiments, a data transreceiving method is provided, which may include transmitting, from a first apparatus to a second apparatus, an Extended Display Identification Data (EDID) block including at least one of a first sub block indicating 3D audio features of multi-channel audio data and a second sub block indicating 3D speaker allocation information of the multi-channel audio data, transmitting, from the a second apparatus to the first apparatus, a metadata packet including at least one of Audio Channel Allocation Standard Type (ACAT) field indicating a channel allocation standard type of the multi-channel audio data, a channel count field indicating the number of channels, and a 3D channel/speaker allocation field indicating channel/speaker allocation information, transmitting, from the second apparatus to the first apparatus, at least one multi-channel audio sample data packet, and parsing, at the first apparatus, the at least one transmitted multi-channel audio sample data packet and outputting audio based on the parsed at least one transmitted multi-channel audio sample data packet. The at least one multi-channel audio sample data packet may include a plurality of sub packets, and an identifier field to distinguish a position or an order of the plurality of sub packets.

According to another aspect of the exemplary embodiments, a data transreceiving method is provided, which may include transmitting, from a first apparatus to a second apparatus, an Extended Display Identification Data (EDID) block including a sub block indicating multi-stream audio features of multi-channel audio data, transmitting, from a second apparatus to the first apparatus, an audio InfoFrame packet including at least one of a channel count field indicating a number of multi-channel audio data channels and a channel/speaker allocation field indicating channel/speaker allocation information, transmitting, from the second apparatus to the first apparatus, at least one audio sample data packet, and parsing, at the first apparatus, the at least one transmitted audio sample data packet and outputting audio based on the parsed at least one audio sample data packet. The at least one audio sample data packet may include a plurality of sub packets, and the plurality of sub packets may include audio data corresponding to any one of a plurality of contents.

According to the various exemplary embodiments above, the exemplary embodiments may generate a plurality of packets regarding multi-channel audio sample data, in which each of the plurality of generated packets may include an identifier field, and thus provide a standard of transmitting audio signals having more than 9 channels.

BRIEF DESCRIPTION OF THE DRAWINGS

The above and/or other aspects of the exemplary embodiments will be more apparent by describing certain exemplary embodiments with reference to the accompanying drawings, in which:

FIG. 8 illustrates a transport stream of an audio sample packet according to an exemplary embodiment;

FIG. 11 illustrates a transport stream of a multi-stream audio sample packet according to an exemplary embodiment;

FIG. 12 illustrates an operation of transmitting a speaker position using CEC according to an exemplary embodiment;

FIG. 13 illustrates operations of transmitting 3D audio samples from BDP to the TV according to an exemplary embodiment;

DETAILED DESCRIPTION OF EXEMPLARY EMBODIMENTS

Figure 1:
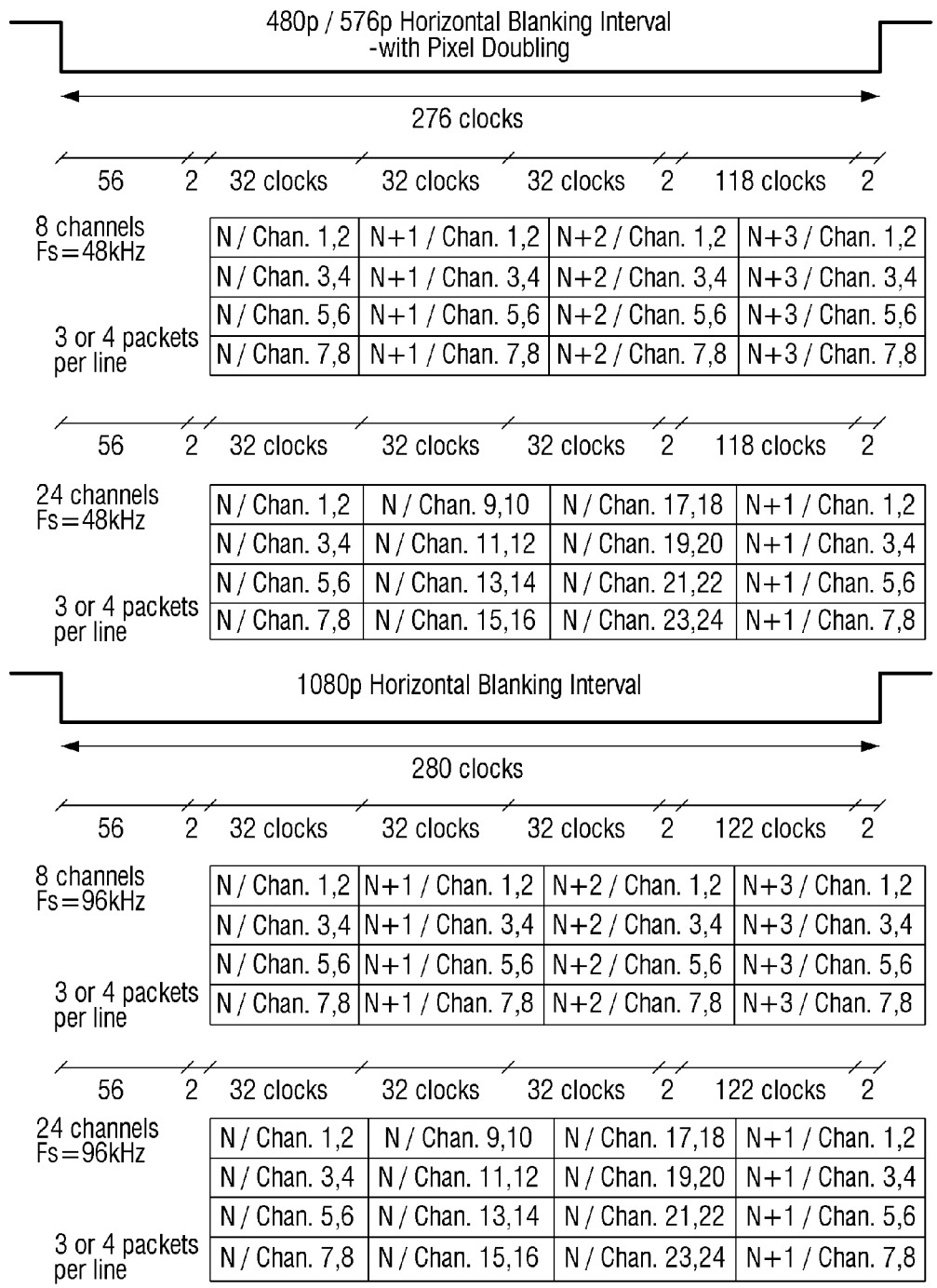
FIG. 1 illustrates transmitting timing of 3-dimensional (3D) audio signals.

Certain exemplary embodiments will now be described in greater detail with reference to the accompanying drawings.

In the following description, the same drawing reference numerals are used for the same elements even in different drawings. The matters defined in the description, such as a detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the exemplary embodiments with unnecessary detail.

The term 'multi-channel audio' as used herein indicates audio signals having more than 2 channels. In the following description of the exemplary embodiments, the multi-channel audio is divided into 2-dimensional (2D) audio channels and 3-dimensional (3D) audio channels. The '2D audio channels' have a plurality of audio channels from 2 channels to 8 channels, and indicate audio channels in which speakers corresponding to the respective channels are placed on a plane. In contrast, the '3D audio channels' have a plurality of audio channels including more than 9 channels, and speakers corresponding to the respective channels are placed on a 3D space.

For instance, exemplary embodiments may implement the 3D audio use channel layout defined in TTA (10.2ch), SMPTE2036-2 (22.2ch) or IEC62574 (30.2ch). The 3D audio may include down mix audio streams, as is defined herein.

The term 'multi-stream audio' indicates audio signals having audio signals classified corresponding to each view in a multi-view environment in which two or more distinguishing contents are viewable. Audio signals of each view may be multi channel audio. For example, the multi-stream audio may be a class of audio streams related to video streams transmitted using a 3D video format, if a multi-view video, such as those associated with dual view games or quad view games, is supported.

In the following, the exemplary embodiments will be explained based on 3D audio having from 9 to 32 channels (or more), which is extended from the audio of the HDMI 1.4b specification, and multi-stream audio for multi-view display apparatuses. More importantly, alterations to be described below are included to support the new audio features.

However, because exemplary embodiments may be applied to transmitting standards of various wiry interfaces, such as the Mobile High-Definition Link (MHL) standard as well as the High-Definition Multimedia Interface (HDMI) standard within an equivalent scope of the technical art, the exemplary embodiments to be described below may be effective in similar wiry interface transmitting standards.

In the following description, a new definition of HDMI packets transmitted through a data island period (including 3D Audio Sample Packets, 3D One Bit Audio Sample Packets, Audio Metadata Packets, Multi-Stream Audio Sample Packets and Multi-Stream One Bit Audio Sample Packets), a packetization process for the packets, and a definition of HDMI audio data blocks within Extended Display Identification Data (E-EDID) to support discovering functions according to new features will be described. Unless otherwise defined herein, according to exemplary embodiments, the specifications are basically according to HDMI 1.4b and not altered from HDMI 1.4b.

Explanations contrary to HDMI 1.4b may be replaced with newly defined features mentioned below, however, other explanations may be consistent with the specification of HDMI 1.4b. The specification refers to the following.

HDMI, HDMI Licensing, LLC, High-Definition Multimedia Interface Specification Version 1.4b, Oct. 11, 2011

TTA, TTAK.KO-07.0098, Audio Signal Formats for Ultra High Definition (UHD) Digital TV, Dec. 21, 2011

SMPTE, SMPTE 2036-2:2008, UHDTV Audio characteristics and audio channel mapping for program production, 2008

IEC, IEC 62574 ed. 1.0, Audio, video and multimedia systems General channel assignment of multichannel audio, Apr. 7, 2011

MHL, LLC, Mobile High-definition Link version 2.0, February, 2012 *TTA: Telecommunications Technology Association Overview Basic audio functions include a function related to a linear pulse-code modulation (L-PCM) audio stream of IEC 60958 in which the sample rate is 32 kHz, 44.1 kHz, or 48 kHz. This audio stream may contain a normal stereo stream. Optionally, HDMI may transmit audio having from 3 to 32 audio channels at the sample rate of 192 kHz. The HDMI may transmit audio streams in the IEC 61937 compression format having a bit rate reaching 49.152 Mbps (e.g., surround sound). HDMI may transmit one bit audio having from 2 to 32 audio channels and Direct Stream Transfer (DST), i.e., one bit audio in compression format. HDMI may transmit a 3D audio stream in which the speaker can be placed anywhere in 3D space. The 3D audio stream may include 32 audio channels at maximum, which are transmitted in a data island period through consecutive packets. HDMI may transmit a plurality of audio streams, if multi-view video streaming (for instance, dual view games or quad view games having a plurality of audio in each view) is supported. Regarding this case, four stereo audio streams may be supported.

Data Island Packet Definition

In section 5.3.1 packet header of the HDMI 1.4b specification, Tables 5-8 may be replaced with the following tables.

TABLE 1

Packet Types

| Packet Type Value | Packet Type | Described in Section |
|---|---|---|
| 0x00 | Null | 5.3.2 |
| 0x01 | Audio Clock Regeneration (N/CTS) | 5.3.3 |
| 0x02 | Audio Sample (L-PCM and IEC 61937 compressed formats) | 5.3.4 |
| 0x03 | General Control | 5.3.6 |
| 0x04 | ACP Packet | 5.3.7 |
| 0x05 | ISRC1 Packet | 5.3.8 |
| 0x06 | ISRC2 Packet | " |
| 0x07 | One Bit Audio Sample Packet | 5.3.9 |
| 0x08 | DST Audio Packet | 5.3.10 |
| 0x09 | High Bitrate (HBR) Audio Stream Packet (IEC 61937) | 5.3.11 |
| 0x0A | Gamut Metadata Packet | 5.3.12 |
| 0x0B | 3D Audio Sample Packet | 5.3.13 |
| 0x0C | 3D One Bit Audio Sample Packet | 5.3.14 |
| 0x0D | Audio Metadata Packet | 5.3.15 |
| 0x0E | Multi-Stream Audio Sample Packet | 5.3.16 |
| 0x0F | Multi-Stream One Bit Audio Sample Packet | 5.3.17 |
| 0x80 + InfoFrame Type | InfoFrame Packet | 5.3.5 |
| 0x81 | Vendor-Specific InfoFrame | 8.2.3 |
| 0x82 | AVI InfoFrame | 8.2.1 |
| 0x83 | Source Product Descriptor InfoFrame | — |
| 0x84 | Audio InfoFrame | 8.2.2 |
| 0x85 | MPEG Source InfoFrame | — |

* For packet layout for the InfoFrames, section 8.2 of the HDMI 1.4b specification should be referred to.

Referring to Table 1, new packets are defined from areas 0x0B to 0x0F. In 0x0B, a 3D Audio Sample Packet is defined. In 0x0C, a 3D One bit Audio Sample Packet is defined. Further, an Audio Meta Data Packet is defined in 0x0D, a Multi-Stream Audio Sample Packet is defined in 0x0E, and a Multi-Stream One bit Audio Sample Packet is defined in 0x0F. Newly defined packets will be explained in detail below.

Further, various alternative suggestions that do not newly define packets will be also explained. The packet definitions of Table 1 will be referred to as a first exemplary embodiment. Various alternative suggestions will be referred to as a second exemplary embodiment, a third exemplary embodiment, and so on. Various alternative suggestions will be explained based on differences from the first exemplary embodiment.

1-1. 3D Audio Sample Packet

First Exemplary Embodiment

In a first exemplary embodiment, 3D audio in an L-PCM format may be transmitted using newly defined 3D audio sample packets. As described above, the '3D audio' is defined as the audio in which speakers can be placed on a determined position according to a 3D audio standard (e.g., 10.2ch, 22.2ch, 30.2ch, or more) in 3D space.

A 3D audio stream may include 32 audio channels (or more) and be transmitted in a data island period through consecutive packets. Each packet may have up to 8 audio channels. A packet header may include sample-start and sample-present bits to inform (indicate) the packet position within a 3D audio sample, which will be described below. The following table represents a 3D audio sample packet header.

TABLE 2

3D Audio Sample Packet Header

| Byte/Bit # | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | Rsvd (0) | Rsvd (0) | Rsvd (0) | sample_ start | sample_ present sp3 | Sample_ present sp2 | Sample_ present sp1 | Sample_ present sp0 |
| HB2 | B3 | B2 | B1 | B0 | sample_ flat sp3 | sample_ flat sp2 | sample_ flat sp1 | sample_ flat sp0 |

Each field includes the following information.

sample_start: [1 bit] indicates that, if sample-start is 1, a current packet is a first packet of a 3D audio sample. Thus, sample_start indicates the beginning of a 3D audio stream. Sink distinguishes a starting part of a sample from sample-start.

sample_start=1 indicates that a current 3D audio sample packet is fully packetized to 8 audio channels, in addition to indicating that the current 3D audio sample packet is a first packet of 3D audio samples. However, if 3D audio down-mixed lower than 8 audio channels is transmitted, only 8 audio channels or less can be packetized. sample_start=0 indicates that a current 3D audio sample packet is a middle or last packet of 3D audio samples, and includes 8 audio channels or less. Setting of five effective sample_present bits of a 3D audio sample packet may only be present.

sample_present.spX: [4 fields, 1 bit each] indicates whether a sub packet X includes an audio sample. One piece of 3D audio sample data may be included in two 3D audio sample packets or more, and each 3D audio sample packet may have four sub packets. Thus, each 3D audio sample packet header may have four sample-present bits in total corresponding to the four sub packets. Each sample_present bit indicates whether a corresponding sub packet has a part of a 3D audio sample.

sample_flat.spX: [4 fields, 1 bit each] indicates whether a sub packet X refers to a flatline sample or not. It is valid if sample_present.spX is established. If available audio data that can be used at sources are not found, four sample_flat.spX bits may be established. The establishing may occur when a sample rate changes or when temporary stream interruptions exist. If sample_flat.spX is established, the sub packet X still refers to a sample period, however, does not include available audio data. sample_flat.spX is valid only if a corresponding sample_present.spX bit is established.

Adjacent 3D audio sample packets may be utilized in transmitting one 3D audio sample having from 9 to 32 channels of L-PCM audio (i.e., frames are 5 to 16 IEC 60958 frames).

Table 3 presents valid sample_present bit values.

TABLE 3

Valid Sample_Present Bit Configurations for 3D Audio Transmission

| SP0 | SP1 | SP1 | SP3 | Description |
|---|---|---|---|---|
| 0 | 0 | 0 | 0 | No Subpackets contain parts of the audio sample |
| 1 | 0 | 0 | 0 | Only Subpacket 0 contains one part of the audio sample |
| 1 | 1 | 0 | 0 | Subpackets 0 and 1 contain two contiguous parts of the audio sample |
| 1 | 1 | 1 | 0 | Subpackets 0, 1 and 2 contain three contiguous parts of the audio sample |
| 1 | 1 | 1 | 1 | Subpackets 0, 1 and 3 contain four contiguous parts of the audio sample |

B.X: [4 fields, 1 bit each] indicates that if a sub packet X includes a first frame in 192 frames consisting of an IEC 60958 block, B.X=1. Otherwise, B.X=0.

3D audio sample packets include an audio sample packet header as shown in Table 2 and four sub packets. Each sub packet of 3D audio sample packets has 3D audio sample data defined according to IEC 60958.

If sources request a down mix of a 3D audio stream, a down-mixed audio stream may be transmitted using 3D audio sample packets. If Sink does not support 3D audio, sources may not transmit a 3D audio sample packet. Converting 3D audio to legacy audio format may be out of the scope of this specification. Based on channel numbers, numerous sub packet layouts which are different from each other may exist. In the following, Tables 4 to 6 indicate examples of 3D audio packet layouts for 12, 24, and 32 channels, respectively.

TABLE 4

Example of 3D Audio Sample Packet Layout for 12 channels

| Packet # | sample_start Value | Num Channels | Samples | Subpkt 0 | Subpkt 1 | Subpkt 2 | Subpkt 3 |
|---|---|---|---|---|---|---|---|
| 0 | 1 | 12 | 1 | Chnl 1, 2 (sample 0) | Chnl 3, 4 (sample 0) | Chnl 5, 6 (sample 0) | Chnl 7, 8 (sample 0) |
| 1 | 0 | | | Chnl 9, 10 (sample 0) | Chnl 11, 12 (sample 0) | empty | empty |

TABLE 5

Example of 3D Audio Sample Packet Layout for 24 channels

| Packet # | Sample_start Value | Num Channels | samples | Subpkt 0 | Subpkt 1 | Subpkt 2 | Subpkt 3 |
|---|---|---|---|---|---|---|---|
| 0 | 1 | 24 | 1 | Chnl 1, 2 (sample 0) | Chnl 3, 4 (sample 0) | Chnl 5, 6 (sample 0) | Chnl 7, 8 (sample 0) |
| 1 | 0 | | | — | — | — | — |
| 2 | 0 | | | Chnl 17, 18 (sample 0) | Chnl 19, 20 (sample 0) | Chnl 21, 22 (sample 0) | Chnl 23, 24 (sample 0) |

TABLE 6

Example of 3D Audio Sample Packet Layout for 32 channels (Max)

| Packet # | Sample_start Value | Num Channels | samples | Subpkt 0 | Subpkt 1 | Subpkt 2 | Subpkt 3 |
|---|---|---|---|---|---|---|---|
| 0 | 1 | 32 (Max) | 1 | Chnl 1, 2 (sample 0) | Chnl 3, 4 (sample 0) | Chnl 5, 6 (sample 0) | Chnl 7, 8 (sample 0) |
| 1 | 0 | | | — | — | — | — |
| 2 | 0 | | | — | — | — | — |
| 3 | 0 | | | Chnl 25, 26 (sample 0) | Chnl 27, 28 (sample 0) | Chnl 29, 30 (sample 0) | Chnl 31, 32 (sample 0) |

FIG. 1 illustrates timing of transmitting 3D audio signals.

Referring to FIG. 1, in a horizontal blanking interval, three 2D audio signal samples of 8 channels each are transmitted. In the same time duration used in transmitting the three 2D audio signal samples described above, one sample in a 3D audio signal of 24 channels is transmitted.

In the following, a data transreceiving system 1000 according to a first exemplary embodiment will be described.

Figure 2:
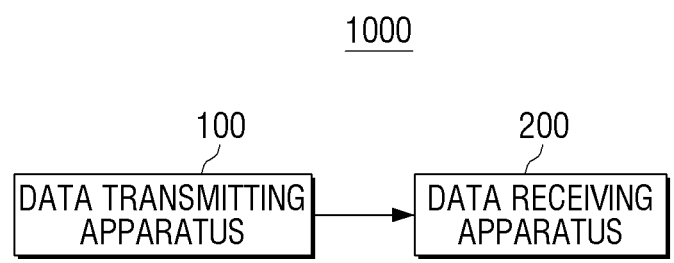
FIG. 2 is a block diagram of a data transreceiving system according to an exemplary embodiment.
Figure 3:
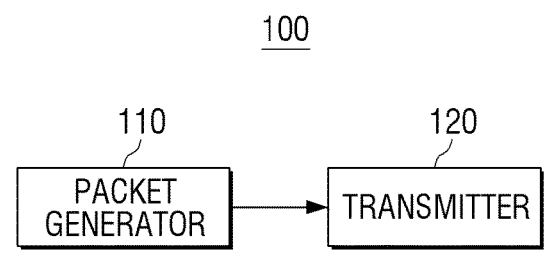
FIG. 3 is a block diagram of a data transmitting apparatus in the data transreceiving system according to an exemplary embodiment.
Figure 4:
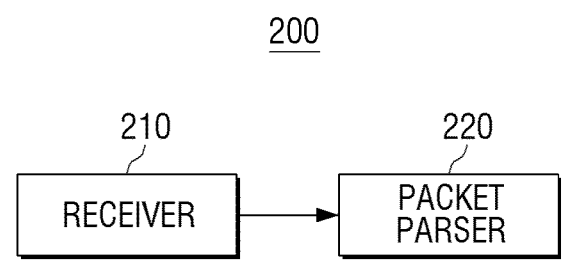
FIG. 4 is a block diagram of a data receiving apparatus in the data transreceiving system according to an exemplary embodiment.

FIG. 2 is a block diagram of the data transreceiving system 1000 according to an exemplary embodiment, FIG. 3 is a block diagram of a data transmitting apparatus 100 in the data transreceiving system 1000 according to an exemplary embodiment, and FIG. 4 is a block diagram of a data receiving apparatus 200 in the data transreceiving system 1000 according to an exemplary embodiment.

Referring to FIG. 2, the data transreceiving system 1000 according to an exemplary embodiment may include a data transmitting apparatus 100 and a data receiving apparatus 200.

Referring to FIG. 3, the data transmitting apparatus 100 according to an exemplary embodiment may include a packet generator 110 and a transmitter 120.

The packet generator 110 may generate a plurality of packets regarding multi-channel audio sample data. As described above, a plurality of packets regarding audio sample data having 9 channels or more may be generated.

Each of the generated packets may include an identifier field to be distinguished with its position or series.

The identifier field may include predetermined bits indicating whether the packet having the identifier field is a first packet of multi-channel audio sample data. In the first exemplary embodiment, sample_start bit may be an example of the predetermined bits indicating whether the packet having the identifier field is a first packet.

Further, the identifier field may include predetermined bits indicating an index of the packet having the identifier field. This example is altered from the first exemplary embodiment, and has in the effect of distinguishing packets more efficiently.

The transmitter 120 may transmit the plurality of generated packets to the data receiving apparatus 200.

Referring to FIG. 4, the data receiving apparatus 200 according to an exemplary embodiment may include a receiver 210 and a packet parser 220.

The receiver 210 may receive a plurality of packets regarding multi-channel audio sample data transmitted from the data transmitting apparatus 100. Likewise, each of the plurality of received packets may include the identifier field to be distinguished with its position or series.

The packet parser 220 may perform an operation of parsing the plurality of received packets.

Video Dependency

Table 7 presents sample rates that can be available to transmit 3D audio at various video format timings described in CEA-861-F (also described in D or E). Assume that a 58 TMDS clock period of the horizontal blanking interval is necessary for content protection re-synchronization. Transmitting 3D audio may be supported by 3D audio sample packets.

Table 7 presents a maximum sampling frequency of 3D audio for 24 bit video format timing.

TABLE 7

Maximum Sampling Frequency of 3D Audio for Video Format Timing

| Description | Format Timing | Pixel Repetition | Vertical Freq (Hz) | Max fs 10.2 ch (kHz) | Max fs 22.2 ch (kHz) | Max fs 30.2 ch (kHz) | Max frame rate 2 ch, comp* |
|---|---|---|---|---|---|---|---|
| VGA | 640 × 480p | none | 59.94/60 | 32 | X | X | 256 |
| 480i | 1440 × 480i | 2 | 59.94/60 | 44.1 | X | X | 256 |
| 480i | 2880 × 480i | 4 | 59.94/60 | 96 | 48 | 48 | 768 |
| 240p | 1440 × 240p | 2 | 59.94/60 | 44.1 | X | X | 256 |
| 240p | 2880 × 240p | 4 | 59.94/60 | 96 | 48 | 48 | 768 |
| 480p | 720 × 480p | none | 59.94/60 | X | X | X | 192 |
| 480p | 1440 × 480p | 2 | 59.94/60 | 88.2 | 48 | 44.1 | 705.6 |
| 480p | 2880 × 480p | 4 | 59.94/60 | 192 | 96 | 96 | 1536 |
| 720p | 1280 × 720p | none | 59.94/60 | 192 | 96 | 96 | 1536 |
| 1080i | 1920 × 1080i | none | 59.94/60 | 96 | 48 | 48 | 768 |
| 1080p | 1920 × 1080p | none | 59.94/60 | 192 | 96 | 96 | 1536 |
| 2160p | 3840 × 2160p | none | 59.94/60 | 192 | 192 | 192 | 1536 |
| 2160p (SMPTE) | 4096 × 2160p | none | 59.94/60 | 192 | 192 | 192 | 1536 |
| 480i/120 | 1440 × 480i | 2 | 119.88/120 | 88.2 | 48 | 44.1 | 705.6 |
| 480p/120 | 720 × 480p | none | 119.88/120 | 48 | 32 | X | 384 |
| 720p/120 | 1280 × 720p | none | 119.88/120 | 192 | 192 | 192 | 1536 |
| 1080i/120 | 1920 × 1080i | none | 119.88/120 | 192 | 96 | 96 | 1536 |
| 1080p/120 | 1920 × 1080p | none | 119.88/120 | 192 | 192 | 192 | 1536 |
| 480i/240 | 1440 × 480i | 2 | 239.76/240 | 176.4 | 96 | 88.2 | 1411.2 |
| 480p/240 | 720 × 480p | none | 239.76/240 | 96 | 48 | 48 | 768 |
| 50 Hz Formats | | | | | | | |
| 576i | 1440 × 576i | 2 | 50 | 44.1 | X | X | 256 |
| 576i | 2880 × 576i | 4 | 50 | 96 | 48 | 48 | 768 |
| 288p | 1440 × 288p | 2 | 50 | 44.1 | X | X | 256 |
| 288p | 2880 × 288p | 4 | 50 | 96 | 48 | 48 | 768 |
| 576p | 720 × 576p | none | 50 | X | X | X | 192 |
| 576p | 1440 × 576p | 2 | 50 | 88.2 | 48 | 44.1 | 705.6 |
| 576p | 2880 × 576p | 4 | 50 | 192 | 96 | 96 | 1536 |
| 720p/50 | 1280 × 720p | none | 50 | 192 | 192 | 96 | 1536 |
| 1080i/50 | 1920 × 1080i | none | 50 | 192 | 176.4 | 96 | 1536 |
| 1080p/50 | 1920 × 1080p | none | 50 | 192 | 192 | 192 | 1536 |
| 2160p | 3840 × 2160p | none | 50 | 192 | 192 | 192 | 1536 |
| 2160 (SMPTE) | 4096 × 2160p | none | 50 | 192 | 192 | 192 | 1536 |
| 1080i, 1250 10 cal | 1920 × 1080i | none | 50 | 96 | 88.2 | 48 | 1024 |
| 576i/100 | 1440 × 576i | 2 | 100 | 88.2 | 48 | 44.1 | 705.6 |
| 576p/100 | 720 × 576p | none | 100 | 48 | 32 | X | 384 |
| 720p/100 | 1280 × 720p | none | 100 | 192 | 192 | 192 | 1536 |
| 1080i/100 | 1920 × 1080i | none | 100 | 192 | 192 | 192 | 1536 |
| 1080p/100 | 1920 × 1080p | none | 100 | 192 | 192 | 192 | 1536 |
| 576i/200 | 1440 × 576i | 2 | 200 | 176.4 | 96 | 88.2 | 1411.2 |
| 576p/200 | 720 × 576p | none | 200 | 96 | 48 | 48 | 768 |
| 24-30 Hz Formats | | | | | | | |
| 720p | 1280 × 720p | none | 24 | 192 | 192 | 192 | 1536 |
| 720p | 1280 × 720p | none | 25 | 192 | 192 | 192 | 1536 |
| 720p | 1280 × 720p | none | 29.97/30 | 192 | 192 | 192 | 1536 |
| 1080p | 1920 × 1080p | none | 24 | 192 | 192 | 96 | 1536 |
| 1080p | 1920 × 1080p | none | 25 | 192 | 176.4 | 96 | 1536 |
| 1080p | 1920 × 1080p | none | 29.97/30 | 96 | 48 | 48 | 768 |
| 2160p | 3840 × 2160p | none | 24 | 192 | 192 | 192 | 1536 |
| 2160p | 3840 × 2160p | none | 25 | 192 | 192 | 192 | 1536 |
| 2160p | 3840 × 2160p | none | 29.97/30 | 192 | 192 | 192 | 1536 |
| 2160 (SMPTE) | 4096 × 2160p | none | 24 | 192 | 192 | 192 | 1536 |
| 2160 (SMPTE) | 4096 × 2160p | none | 25 | 192 | 192 | 192 | 1536 |
| 2160 (SMPTE) | 4096 × 2160p | none | 29.97/30 | 192 | 96 | 96 | 1536 |

Second Exemplary Embodiment

According to the second exemplary embodiment, which is different from the first exemplary embodiment, a conventional audio sample packet format may be modified and used.

As shown in Table 8 below, a reserved area of a conventional audio sample packet may be used as segment_indicator. According to an exemplary embodiment, segment_indicator may be expressed with two bits. If segment_indicator=00, a first packet is indicated. Further, it is indicated that a packet is an odd packet of middle packets, if segment_indicator=01, that a packet is an even packet of middle packets, if segment_indicator=10 and that a packet is a last packet, if segment_indicator=11. Also, the above identifiers are merely examples only, and packets matched with bits may be different.

The above structure can find if segments are damaged or not. If one segment is damaged, an nth sample having the damaged segment may be dropped, or only the damaged audio sample packet may be discarded. A segment indicates an individual audio sample packet in a group in which one audio sample packet or more are grouped.

Layout indicates information regarding the number of samples and channels in HDMI 1.4b. For instance, one audio sample packet may include four audio samples of two channels or one audio sample of 8 channels. Expanded in this specification, layout_ext field in a conventional reserved area is created, indicating information regarding whether a 3D audio is provided with layout.

For instance, if layout_ext=0 and layout=0, 1, the number of 2D audio samples and channels are indicated likewise according to a conventional method. However, if layout_ext=1 and layout=0, 3D audio samples are indicated. If layout_ext=1 and layout=1, multi-stream audio samples are indicated.

Fields except for those described specifically in the description of the second exemplary embodiment may be the same as in the first exemplary embodiment.

TABLE 8-2

| retation between layout and layout_exit: refer to table 7-6 HDMI 1.4b | | |
|---|---|---|
| Layout_exit | layout | Description |
| 0 | 0 | 2 ch/4 samples |
| 0 | 1 | 8 ch/1 samples |
| 1 | 0 | 3D Audio |
| 1 | 1 | Reserved |

Figure 5:
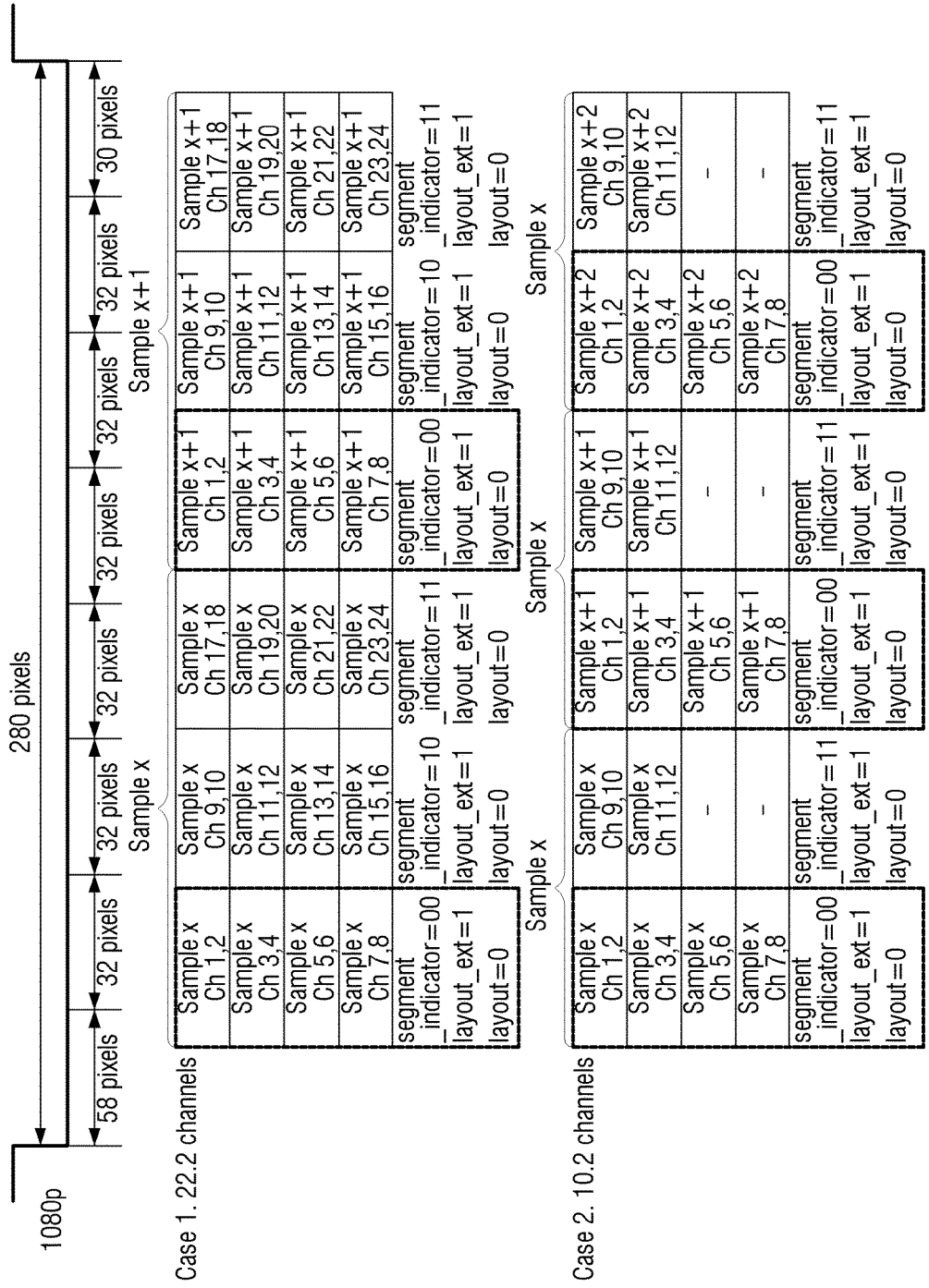
FIG. 5 illustrates a transport stream of an audio sample packet according to an exemplary embodiment.

FIG. 5 illustrates a transport stream of an audio sample packet according to the second exemplary embodiment.

Referring to FIG. 5, each field value is established when transmitting two sample packets in the horizontal blanking interval regarding 3D audio of 22.2 channels. In a first packet, a segment_indicator=00, in a second packet, a segment_indicator=10, and in a last packet, a segment_indicator=11. Because the above examples are 3D audio signals, layout_ext=1 and layout=0. Similar field values are found in 3D audio of 10.2 channels.

Third Exemplary Embodiment

According to a third exemplary embodiment, a conventional audio sample packet format is also altered and used while indicating less information as compared to the second exemplary embodiment.

Referring to Table 9 below, a reserved area of a conventional audio sample packet may be used as multichannel_indicator. Different from segment_indicator of the second exemplary embodiment, multichannel_indicator indicates information regarding whether an audio sample packet is 3D audio or not. According to bit information of multichannel_indicator, information indicated by a layout field may change.

Thus, multichannel_indicator may be expressed with one bit. If multichannel_indicator=0, a layout field indicates the channel/sample layout defined in traditional HDMI 1.4b. If multichannel_indicator=1, layout field indicates the layout which transmits multi-channel audio sample data using more than 8 channels. In this case, layout is used in referring to a start of a sample. If layout=1, it indicates that a current audio sample packet includes a start of a sample. If layout(start)=0, it indicates that a current audio sample packet does not include a start of a sample. Also, the above description is exemplary only, and packets matched with bits may be different. Fields except for those described in the third exemplary embodiment are the same as in the first exemplary embodiment.

TABLE 8

| Modified Audio Sample Packet | | | | | | | |
|---|---|---|---|---|---|---|---|
| Bit 7 | Bit 6 | Bit 5 | Bit 4 | Bit 3 | Bit 2 | Bit 1 | Bit 0 |
| Packet type - 0x02 (Audio Sample Packet) | | | | | | | |
| Segment_indictaor | Layout_ext | layout | Sample_present. sp3 | Sample_present. sp2 | Sample_present. sp1 | Sample_present. sp0 | |
| B.3 | B.2 | B.1 | B.0 | Sample_flat. sp3 | Sample_flat. sp2 | Sample_flat. sp1 | Sample_flat. sp0 |
| Audio Sample Subpacktet 0 (7 Bytes) | | | | | | | |
| Audio Sample Subpacktet 1 (7 Bytes) | | | | | | | |
| Audio Sample Subpacktet 2 (7 Bytes) | | | | | | | |
| Audio Sample Subpacktet 3 (7 Bytes) | | | | | | | |

TABLE 8-1

| segment_indicator field | |
|---|---|
| Segment_indicator | Description |
| 00 | Start_segment |
| 01 | mid_segment(odd) |
| 10 | mid_segment(even) |
| 11 | End_segment |

TABLE 9

| | | | Modified Audio Sample Packet Header | | | | |
|---|---|---|---|---|---|---|---|
| Bit 7 | Bit 6 | Bit 5 | Bit 4 | Bit 3 | Bit 2 | Bit 1 | Bit 0 |
| | | | Packet type = 0x02 (Audio Sample Packet) | | | | |
| reserved | Multichannel_indicator | Layout/start | Sample_present. sp3 | Sample_present. sp2 | Sample_present. sp1 | Sample_present. sp0 | |
| B.3 | B.2 | B.1 | B.0 | Sample_flat. sp3 | Sample_flat. sp2 | Sample_flat. sp1 | Sample_flat. sp0 |
| | | | Audio sample subpacket 0 (7 Bytes) | | | | |
| | | | Audio sample subpacket 1 (7 Bytes) | | | | |
| | | | Audio sample subpacket 2 (7 Bytes) | | | | |
| | | | Audio sample subpacket 3 (7 Bytes) | | | | |

TABLE 9-1

Multichannel_indicator and Layout/start

| Multichannel_indicator | Layout/start | Description |
|---|---|---|
| 0 | 0 | 2 ch/4 samples |
| 0 | 1 | 8 ch/1 sample |
| 1 | 0 | Multi-channel/1 sample (Non-start of sample) |
| 1 | 1 | Multi-channel/1 sample (start of sample) |

The above structure minimizes changes in a reserved area of conventional audio sample packets while indicating information regarding whether 3D audio is included with an audio sample packet. Thus, the packet structure according to the third exemplary embodiment is simpler than the second exemplary embodiment.

Figure 6:
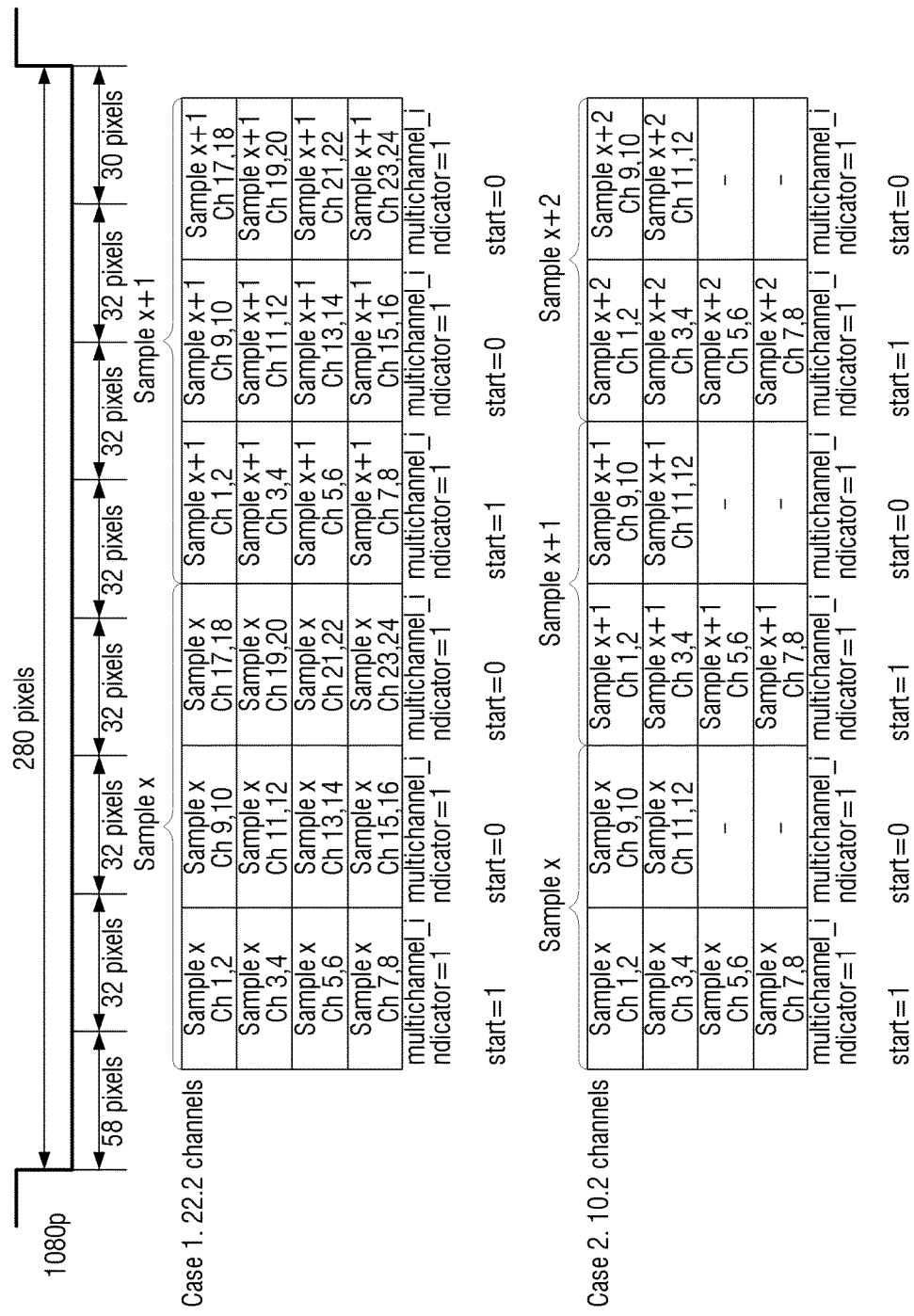
FIG. 6 illustrates a transport stream of an audio sample packet according to another exemplary embodiment.

FIG. 6 illustrates a transport stream of audio sample packets in the third exemplary embodiment.

Referring to FIG. 6, each field value is established when transmitting two sample packets in the horizontal blanking interval regarding 3D audio of 22.2 channels. In a first packet, layout=1, and in a second packet and a third packet, layout=0. However, because every packet is part of 3D audio signals, multichannel_indicator=1. Similar field values are established in 3D audio of 10.2 channels.

Fourth Exemplary Embodiment

According to a fourth exemplary embodiment, a conventional audio sample packet format is also altered and used, but unlike the second exemplary embodiment, information regarding whether or not multi-stream audio is provided is further provided.

Referring to Table 10 below, a reserved area of a conventional audio sample packet may be used as Stream_ID and multiASP_layout. multiASP_layout performs the same function of multichannel_indicator in the third exemplary embodiment. In other words, multiASP_layout indicates whether or not 3D audio is provided. Information indicated by layout fields are different according to bit information of multiASP_layout.

Stream_ID indicates stream numbers if multi-stream audio is provided. According to an exemplary embodiment, one bit may be used in Stream_ID, and 0 indicates a first stream and 1 indicates a second stream. Each stream corresponds to a view of contents which are different from each other. Also, the above description is exemplary only, and packets matched with bits may be different.

If one view corresponding to multi-stream audio has audio signals of 8 channels or less, it will not be found that Stream_ID and multiASP_layout are simultaneously 0 in one audio sample packet.

TABLE 10

| | | | | Modified Audio Sample Packet Header | | | | |
|---|---|---|---|---|---|---|---|---|
| | Bit 7 | Bit 6 | Bit 5 | Bit 4 | Bit 3 | Bit 2 | Bit 1 | Bit 0 |
| HB0 | | | | | Packet type = 0x02 | | | |
| HB1 | Stream_ID | multiASP_layout | reserved | Layout/start | Sample_present. sp3 | Sample_present. sp2 | Sample_present. sp1 | Sample_present. sp0 |
| HB2 | B.3 | B.2 | B.1 | B.0 | Sample_flat. sp3 | Sample_flat. sp2 | Sample_flat. sp1 | Sample-flat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

TABLE 10-1

Description of Stream_ID

| Stream_ID | description |
|---|---|
| 0 | $1^{st}$ stream |
| 1 | $2^{nd}$ stream |

The above structure has the effect of achieving compatibility in displaying information of both multi-stream audio and 3D audio through one data sample packet. Further, if identifiers of Stream_ID field and stream are created, a plurality of streams may be distinguished from each other when being transmitted. Thus, multi-stream audio sample data exceeding one packet size can be transmitted. Also in the fourth exemplary embodiment, fields except for those described specifically above are the same as in the first exemplary embodiment.

An audio data transport stream which combines values of Stream_ID field, multiASP_layout field and layout/start field may also be considered. If multiASP_layout=1, a transport stream of 3D audio is indicated, and layout/start indicates information regarding a start of a packet. If Stream_ID=1, multi-stream is indicated, and the number of channels and samples is established according to layout/start. For instance, a Sink which receives a packet in which Stream_ID=1 recognizes that multi-stream audio data is transmitted and that the currently received packet is a second stream audio data of two multi-stream audio data.

Fifth Exemplary Embodiment

According to a fifth exemplary embodiment, a conventional audio sample packet format is also altered and used.

Referring to Table 11 below, a reserved area of a conventional audio sample packet may be used as Supports_Multistream and multiASP_layout. multiASP_layout performs the same function of multiASP_layout in the fourth exemplary embodiment. In other words, multiASP_layout indicates whether or not 3D audio is provided. Information indicated by a layout field is different according to bit information of multiASP_layout.

Supports_Multistream indicates information regarding whether or not multi-stream audio is provided. According to an exemplary embodiment, one bit may be used in Supports_Multistream. 1 indicates that multi-stream audio is provided. Also, the above description is merely exemplary only, and packets matched with bits may be different.

According to the fifth exemplary embodiment, one audio sample packet may include four multi-stream audio samples of 2 channels at a maximum. An audio sample in each view may be transmitted corresponding to each of four sub packets.

If one view corresponding to multi-stream audio has audio signals having 8 channels or less, it will not be found that Supports_Multistream and multiASP_layout are 0 simultaneously in one audio sample packet.

and 3D audio through one data sample packet. Further, every feature to be supported may be written in one audio sample packet. Also, in the fifth exemplary embodiment, fields except for those described specifically above are the same as in the first exemplary embodiment.

Features of an audio data transport stream may be considered which combine values of Supports_Multistream field, multiASP_layout field and layout/start field. If Supports_Multistream=0 and multiASP_layout=1, a 3D audio transport stream is indicated, and layout/start indicates information regarding a start of a packet. If Supports_Multistream=1, a multi-stream is indicated, and the number of channels and samples is established according to layout/start.

Sixth Exemplary Embodiment

According to a sixth exemplary embodiment, an alteration of a conventional audio sample packet format similar to the fourth exemplary embodiment is suggested.

Referring to Table 12 below, a reserved area of a conventional audio sample packet may be used as Stream_ID and multiASP_layout. Stream_ID and multiASP_layout perform the same function as Stream_ID and multiASP_layout in the fourth exemplary embodiment. Information indicated by the layout field is different according to bit information of multiASP_layout.

Since Stream_ID is expressed with 2 bits, four stream numbers may be written if multi-stream audio is provided. Combinations of bits which are different from each other correspond to views of contents which are different from each other.

If one view of multi-stream audio has audio signals having 8 channels or less, it will not be found that Stre-

TABLE 11

| Modified Audio Sample Packet Header | | | | | | | |
|---|---|---|---|---|---|---|---|
| Bit 7 | Bit 6 | Bit 5 | Bit 4 | Bit 3 | Bit 2 | Bit 1 | Bit 0 |
| HB0 | | | | Packet type = 0x02 | | | |
| HB1 Supports_Multistream | multiASP_layout | re-served | Layout/start | Sample_present.sp3 | Sample_present.sp2 | Sample_present.sp1 | Sample_present.sp0 |
| HB2 B.3 | B.2 | B.1 | B.0 | Sample_flat.sp3 | Sample_flat.sp2 | Sample_flat.sp1 | Sample-flat.sp0 |
| SP0 | Audio Sample Subpacket 0 (7 Bytes): Reserved for 1st stream | | | | | | |
| SP1 | Audio Sample Subpacktet 1 (7 Bytes): Reserved for 2nd stream | | | | | | |
| SP2 | Audio Sample Subpacktet 2 (7 Bytes): Reserved for 3rd stream | | | | | | |
| SP3 | Audio Sample Subpacktet 3 (7 Bytes): Reserved for 4th stream | | | | | | |

The above structure has the effect of achieving compatibility in displaying information of both multi-stream audio am_ID is more than 1 and multiASP_layout is 1 in one audio sample packet.

TABLE 12

| Modified Audio Sample Packet Header | | | | | | | |
|---|---|---|---|---|---|---|---|
| Bit 7 | Bit 6 | Bit 5 | Bit 4 | Bit 3 | Bit 2 | Bit 1 | Bit 0 |
| HB0 | | | | Packet type = 0x02 (Audio Sample packet) | | | |
| HB1 Stream_ID | | multiASP_layout | Layout/start | Sample_present.sp3 | Sample_present.sp2 | Sample_present.sp1 | Sample_present.sp0 |
| HB2 B.3 | B.2 | B.1 | B.0 | Sample_flat.sp3 | Sample_flat.sp2 | Sample_flat.sp1 | Sample-flat.sp0 |
| SP0 | | | Audio Sample Subpacktet 0 (7 Bytes) | | | | |
| SP1 | | | Audio Sample Subpacktet 1 (7 Bytes) | | | | |

TABLE 12-continued

| Modified Audio Sample Packet Header | | | | | | | |
|---|---|---|---|---|---|---|---|
| Bit 7 | Bit 6 | Bit 5 | Bit 4 | Bit 3 | Bit 2 | Bit 1 | Bit 0 |
| SP2 | Audio Sample Subpacktet 2 (7 Bytes) | | | | | | |
| SP3 | Audio Sample Subpacktet 3 (7 Bytes) | | | | | | |

TABLE 12-1

Description of Stream_ID

| Stream_ID | description |
|---|---|
| 00 | $1^{st}$ stream |
| 01 | $2^{nd}$ stream |
| 10 | $3^{rd}$ stream |
| 11 | $4^{th}$ stream |

The above structure has the effect of achieving compatibility in displaying information of both multi-stream audio and 3D audio through one data sample packet. Specifically, compared to the fourth exemplary embodiment, a greater number of multi-streams can be recognized. In the sixth exemplary embodiment, fields except for those described specifically above are the same as in the first exemplary embodiment.

Table 13 presents features of an audio data transport stream which combines field values of Stream_ID, multiASP_layout, and layout/start. If multiASP_layout=1, a 3D audio transport stream is indicated, and layout/start indicates information regarding a start of a packet. If Stream_ID=01~11, a multi-stream is indicated, and the number of channels and samples is established according to layout/start.

are transmitted using 3D audio sample packets which are newly defined in the first exemplary embodiment.

The seventh exemplary embodiment is similar to the first exemplary embodiment, and further includes the feature of an ext_layout field indicating whether or not multi-stream audio is transmitted. If ext_layout=0, this field indicates that multi-stream audio is transmitted. If ext_layout=1t, this field indicates that 3D audio is transmitted.

The extra fields of sample_start field, sample_present.spX field, and sample_flat.spX field are the same as in the first exemplary embodiment, and will not be further described below. Table 14 indicates an audio sample packet structure according to the seventh exemplary embodiment.

TABLE 14

| Extended Audio Sample Packet (24 Channels Fs = 96 kHz) | | | |
|---|---|---|---|
| N/Chan 1, 2 | N/Chan 9, 10 | N/Chan 17, 18 | N + 1/Chan 1, 2 |
| N/Chan 3, 4 | N/Chan 11, 12 | N/Chan 19, 20 | N + 1/Chan 3, 4 |
| N/Chan 5, 6 | N/Chan 13, 14 | N/Chan 21, 22 | N + 1/Chan 5, 6 |
| N/Chan 7, 8 | N/Chan 15, 16 | N/Chan 23, 24 | N + 1/Chan 7, 8 |

TABLE 13

Capability to deal with proposed features according to exemplary embodiments

| | ASP header fields | | |
|---|---|---|---|
| Stream_ID | multiASP_layout | Layout/start | Description |
| 00b | 0 | Layout = 0 | 24 bits-sample + default (2 ch/4 sample) |
| 00b | 0 | Layout = 1 | 24 bits-sample + default (8 ch/1 sample) |
| 00b | 1 | Start = 0 | 24 bits-sample + 3D audio-channel non-start ('N' ch/1 sample) |
| 00b | 1 | Start = 1 | 24 bits-sample + 3D audio-channel start ('N' ch/1 sample) |
| 00b~11b | 0 | Layout = 0 | 24 bits-sample + Multi-stream (2 ch/4 sample) |
| 00b~11b | 0 | Layout = 1 | 24 bits-sample + Multi-stream (8 ch/1 sample) |
| 1 | 1 | 0 | Not supported (refer to the '2 Analysis of propeosed features (1/2) slide, page 8) |
| 1 | 1 | 1 | |

Seventh Exemplary Embodiment

According to a seventh exemplary embodiment, a 3D audio sample packet and a multi-stream audio sample packet

TABLE 14-1

| Example of Extended Audio Sample Packet | | | | | | | | |
|---|---|---|---|---|---|---|---|---|
| Byte/Bit# | 7 | 6 | 5 | 4 | 3 | 2 | 1 | 0 |
| HB0 | 0 | 0 | 0 | 0 | 1 | 0 | 1 | 1 |
| HB1 | 0 | 0 | Sample_start = 1 | Ext_layout = 1 | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sample-flat.sp0 |

TABLE 14-1-continued

Example of Extended Audio Sample Packet

| Byte/Bit# | 7 | 6 | 5 | 4 | 3 | 2 | 1 | 0 |
|---|---|---|---|---|---|---|---|---|
| PB0~PB6 | | | | | Channel 1, 2 audio data/sample N | | | |
| PB7~PB13 | | | | | Channel 3, 4 audio data/sample N | | | |
| PB14~PB20 | | | | | Channel 5, 6 audio data/sample N | | | |
| PB21~PB27 | | | | | Channel 7, 8 audio data/sample N | | | |

Table 15 indicates a packet body structure according to field values of ext_layout. Referring to Table 15, regarding a multi-stream example, audio signals corresponding to one view may include 2 channels, and thus, one packet may include audio signals corresponding to 4 views. Also, regarding 3D audio signals, audio signals regarding a plurality of channels may be expressed. The above various exemplary embodiments describe audio signals having 32 channels. However, exemplary embodiments are not limited to audio signals having 32 channels, and audio signals having more or less than 32 channels may be created according to other exemplary embodiments.

TABLE 15

EASP packetization

| Ext_layout Value | Sample_start Value | Max Num Channels | samples | Subpkt 0 | Subpkt 1 | Subpkt 2 | Subpkt 3 |
|---|---|---|---|---|---|---|---|
| 0 | X | 2 | 4 | Chnl 1, 2 Stream 0 (Sample M) | Chnl 1, 2 Stream 1 (Sample M) | Chnl 1, 2 Stream 2 (Sample M) | Chnl 1, 2 Stream 2 (Sample M) |
| 1 | 1 | N | 1 | Chnl 1, 2 Stream 0 (Sample M) | Chnl 3, 4 Stream 0 (Sample M) | Chnl 5, 6 Stream 0 (Sample M) | Chnl 7, 8 Stream 0 (Sample M) |
| 1 | 0 | | | — | — | — | — |
| 1 | 0 | | | Chnl N-7, N-6 Stream 0 (Sample M) | Chnl N-5, N-4 Stream 0 (Sample M) | Chnl N-3, N-2 Stream 0 (Sample M) | Chnl N-1, N Stream 0 (Sample M) |

Figure 7:
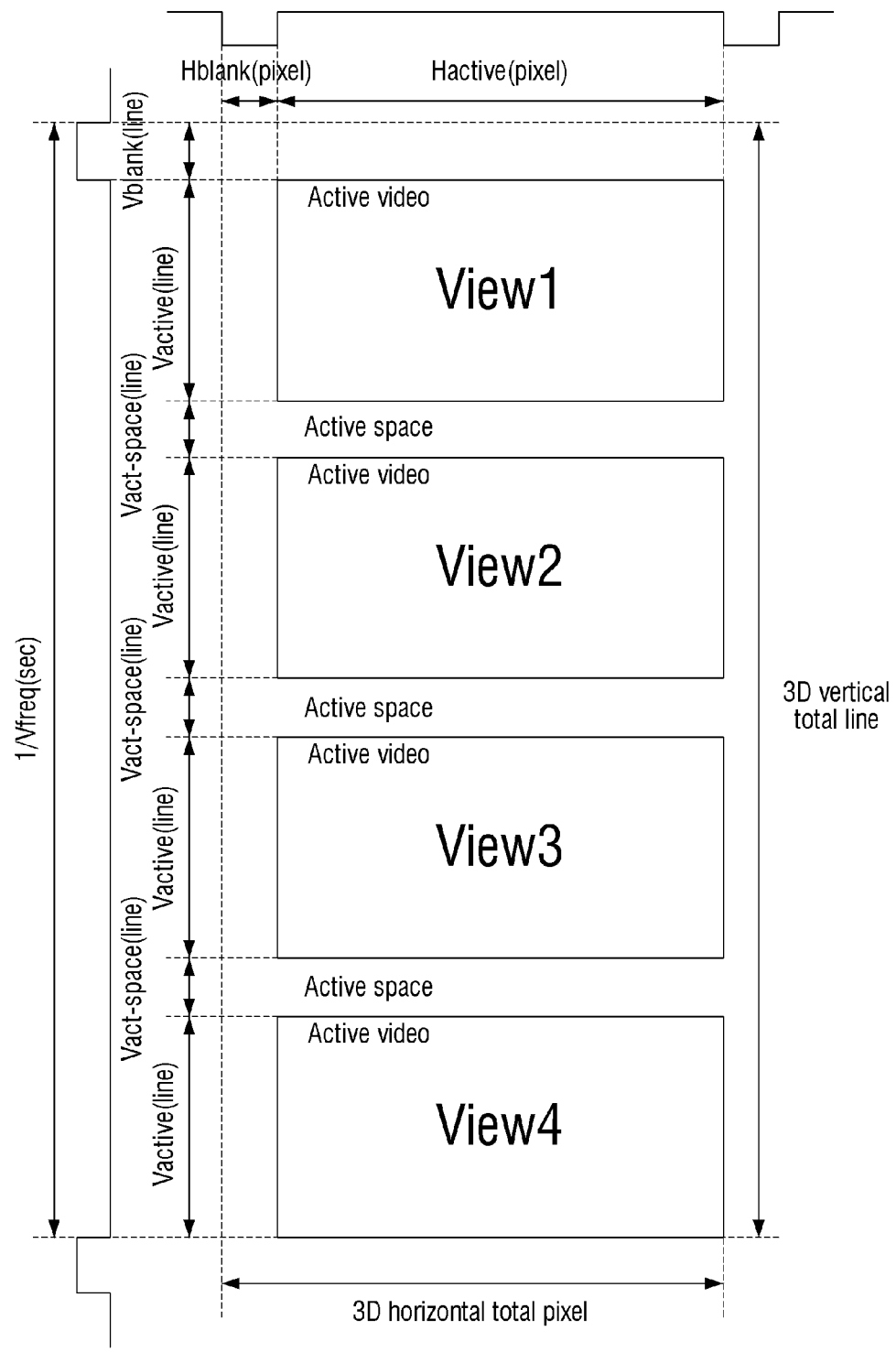
FIG. 7 illustrates a transport stream format according to an exemplary embodiment.

In the above exemplary embodiments, multi-stream audio signals may be included in an area corresponding to an area where image data of each view is placed in a vertical synchronization blanking interval and transmitted. FIG. 7 illustrates a transport stream format for the above description. Referring to FIG. 7, audio signals correspond to a left area of each view corresponding to an image signal.

1-2. 3D One Bit Audio Sample Packet

First Exemplary Embodiment

According to a first exemplary embodiment, 3D audio in a one bit audio format is transmitted using a newly defined 3D one bit audio sample packet. As described above, the definition of 3D audio according to exemplary embodiments is such that speakers can be placed anywhere in 3D space.

A 3D one bit audio stream includes 32 audio channels or more, which are transmitted in a data island period through consecutive packets. Packet headers have sample_start and sample_present bits to indicate a position of a packet within a one bit audio sample.

TABLE 16

One Bit 3D Sample Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 1 | 0 | 0 |
| HB1 | Rsvd (0) | Rsvd (0) | Rsvd (0) | sample_ start | samples_ present sp3 | Samples_ present sp2 | Samples_ present sp1 | Samples_ present sp0 |
| HB2 | Rsvd (0) | Rsvd (0) | Rsvd (0) | Rsvd (0) | Samples_ invaild.sp3 | Samples_ invalid.sp2 | Samples_ invalid.sp1 | Samples_ invalid.sp0 | sample_start: [1 bit] indicates that a current packet is a first packet of 3D one bit audio samples, if sample_start=1. sample_start is the same as described above in 3D audio packets, and will not be further described.

samples_present.xpX: [4 fields, 1 bit each] indicates whether sub packet X includes an audio sample or not. Four sample_present bits may be included in a 3D one bit audio sample packet header, and each sample_present bit is created for each sub packet. If a sub packet includes an audio sample, a corresponding bit is established. sample_present.spX is the same as described above.

samples_invalid.spx: [4 fields, 1 bit each] indicates whether sub packet X refers to an invalid sample. If sample_invalid=1, samples of sub packet X are not valid. 0 indicates the samples of sub packet X are valid. The above bits are valid only if sample_present.spX is established. If available audio data that can be used in sources is not found, four sample_invalid.spX bits are established. If sample_invalid.spX is established, sub packet X refers to a continuous sample period. However, any available data is not included.

In 3D one bit audio, sample frequency information is included and transmitted in audio InfoFrame (please refer to HDMI 1.4b Section 8.2.2).

A sample packet of a 3D one bit audio sample packet includes a one bit audio sample packet header as shown in Table 16 and four sub packets. Each sub packet may include a one bit audio bit for four audio channels at a maximum.

Adjacent 3D one bit audio sample packets may be used in transmitting 3D one bit audio samples between 9 to 32 audio channels. Available combinations of sample_present bits for 3D one bit audio sample packets are determined by allocating allowed channels. A 3D one bit audio sample packet does not have B0~B3 fields which is different from a 3D audio sample packet because the 3D one bit audio sample packet does not conform to the IEC 60958 block format.

Various Alternatives

Meanwhile, regarding various exemplary embodiments of the 3D audio sample packet, a corresponding 3D one bit audio sample packet may be defined respectively. A 3D one bit audio sample packet may be defined as the same as a 3D audio sample packet except for the difference of the sample_invalid.spX field described above, and only B0~B3 fields may be excluded from a 3D audio sample packet. Other explanations are the same as in the above descriptions, which will not be further described.

1-3. Multi Stream Audio Sample Packet

In the following, a newly suggested multi-stream audio sample packet structure will be explained. A first exemplary embodiment will be described, and other various alternative exemplary embodiments will be explained based on differences from the first exemplary embodiment.

First Exemplary Embodiment

According to a first exemplary embodiment, a plurality of audio streams in L-PEM and IEC 61937 compression audio formats are transmitted using multi-stream audio sample packets. Each audio stream included in a multi-stream audio sample has two audio channels or more. Establishing a sub packet is determined by using a stream_present bit of a packet header. Table 17 presents a header structure of a multi-stream audio sample packet.

TABLE 17

| Multi-Stream Audio Sample Packet Header | | | | | | | | |
| --- | --- | --- | --- | --- | --- | --- | --- | --- |
| Byte/Bit# | 7 | 6 | 5 | 4 | 3 | 2 | 1 | 0 |
| HB0 | 0 | 0 | 0 | 0 | 1 | 1 | 1 | 0 |
| HB1 | Rsvd (0) | Rsvd (0) | Rsvd (0) | Rsvd (0) | stream_present sp3 | stream_present sp2 | stream_present sp1 | stream_present sp0 |
| HB2 | B.3 | B.2 | B.1 | B.0 | Stream_flat.sp3 | Stream_flat.sp2 | Stream_flat.sp1 | Stream_flat.sp0 | stream_present.spX: [4 fields, 1 bit each] indicates whether sub packet X includes an audio sample of stream X. Four stream_present bits are created in a multi-stream audio sample packet header, and each is created for a corresponding sub packet. The stream_present bit indicates whether a corresponding sub packet includes an audio stream. Since stream_present.spX substantially performs the same function of sample_present.spX in the 3D audio sample packet, a description of this feature will not be explained.

stream_flat.spX: [4 fields, 1 bit each] indicates whether sub packet X refers to a flatline sample of stream X. The stream_flat.spX is valid only if stream_present.spX is established. If available audio data are not found in sources, four stream_flat.spX bits are established. The establishing of a stream_flat.spX bit is implemented while a sample rate changes or a temporary stream interruption exists. If a stream_flat.spX bit is established, sub packet X continuously indicates a sample period, however, does not include available audio data. stream_flat.spX is substantially the same as sample_flat.spX of the 3D audio sample packet, and will not be further described below.

If sub packet X includes a first frame of 192 frames constituting IEC 60958, B.X=1. Otherwise, B.X=0.

A multi-stream audio sample packet uses the packet header shown in Table 17 and four sub packets. Every sub packet has the same structure.

HDMI allows that sources may simultaneously transmit four audio streams if multi view video streaming (e.g., dual view/quad view games having different audio in each view) is supported. Each audio stream included in a multi-stream audio sample relates to one single view and include two audio channels. A sub packet of each multi-stream audio sample packet has frames configured according to an IEC 60958 or IEC 61937 block defined by 0 or 1 IEC 60958. Three sub packet layouts are defined. Tables 18 to 20 below present examples of multi-stream audio packet layouts for 2, 3, and 4 audio streams.

TABLE 18

Example of Multi-Stream Audio Sample Packet Layout for 2 Audio Streams

| Num Streams | Packet # | Max Num Channels | samples | Subpkt 0 | Subpkt 1 | Subpkt 2 | Subpkt 3 |
|---|---|---|---|---|---|---|---|
| 2 | 0 | 2 ch/stream | 1 sample/stream | Chnl 1, 2 Stream 0 (Sample a) | Chnl 1, 2 Stream 1 (Sample b) | Empty | empty |
|   | 1 | 2 ch/stream | 1 sample/stream | Chnl 1, 2 Stream 0 (Sample a + 1) | Chnl 3, 4 Stream 1 (Sample b + 1) | empty | empty |
|   | — |   |   | — | — |   |   |
|   | N | 2 ch/stream | 1 sample/stream | Chnl 1, 2 Stream 0 (Sample a + N) | Chnl 1, 2 Stream 1 (Sample b + N) | empty | empty |

TABLE 19

Example of Multi-Stream Audio Sample Packet Layout for 3 Audio Streams

| Num Streams | Packet # | Max Num Channels | samples | Subpkt 0 | Subpkt 1 | Subpkt 2 | Subpkt 3 |
|---|---|---|---|---|---|---|---|
| 3 | 0 | 2 ch/stream | 1 sample/stream | Chnl 1, 2 Stream 0 (Sample a) | Chnl 1, 2 Stream 1 (Sample b) | Chnl 1, 2 Stream 2 (Sample c) | empty |
|   | 1 | 2 ch/stream | 1 sample/stream | Chnl 1, 2 Stream 0 (Sample a + 1) | Chnl 1, 2 Stream 1 (Sample b + 1) | Chnl 1, 2 Stream 2 (Sample c + 1) | empty |
|   | — |   |   | — | — | — |   |
|   | N | 2 ch/stream | 1 sample/stream | Chnl 1, 2 Stream 0 (Sample a + N) | Chnl 1, 2 Stream 1 (Sample b + N) | Chnl 1, 2 Stream 2 (Sample c + N) | empty |

TABLE 20

Example of Multi-Stream Audio Sample Packet Layout for 4 Audio Streams

| Num Streams | Packet # | Max Num Channels | samples | Subpkt 0 | Subpkt 1 | Subpkt 2 | Subpkt 3 |
|---|---|---|---|---|---|---|---|
| 4 | 0 | 2 ch/stream | 1 sample/stream | Chnl 1, 2 Stream 0 (Sample a) | Chnl 1, 2 Stream 1 (Sample b) | Chnl 1, 2 Stream 2 (Sample c) | Chnl 1, 2 Stream 2 (Sample d) |
|   | 1 | 2 ch/stream | 1 sample/stream | Chnl 1, 2 Stream 0 (Sample a + 1) | Chnl 1, 2 Stream 1 (Sample b + 1) | Chnl 1, 2 Stream 2 (Sample c + 1) | Chnl 1, 2 Stream 3 (Sample d + 1) |
|   | — |   |   | — | — | — | — |
|   | N | 2 ch/stream | 1 sample/stream | Chnl 1, 2 Stream 0 (Sample a + N) | Chnl 1, 2 Stream 1 (Sample b + N) | Chnl 1, 2 Stream 2 (Sample c + N) | Chnl 1, 2 Stream 3 (Sample d + N) |

FIG. 8 illustrates a transport stream of audio sample packets according to the first exemplary embodiment.

Referring to FIG. 8, regarding a 2 channel audio sample packet for dual view, one sample packet including two samples is transmitted in the horizontal blanking interval. Regarding a 2 channel audio sample packet for quad view, one sample packet including four samples is transmitted in the horizontal blanking interval. Even though the diagram describes transmitting multi-stream audio samples of 2 channels at maximum, multi-stream audio samples having a plurality of channels which include more than 2 channels may be transmitted through one multi-stream audio sample packet according to other exemplary embodiments. In short, audio corresponding to each view may be transmitted through a corresponding sub packet; also, multi-stream audio sample data having a plurality of channels which include more than 2 channels may be transmitted though one or more consecutive multi-stream audio sample packets.

According to exemplary embodiments, multi-stream audio sample packets transmit four stereo audio samples. Each sample corresponds to an individual audio stream. For instance, if HDMI sources transmit two divided audio streams, sub packet 0 may be used in transmitting audio samples of stream 0 and sub packet 1 may be used in transmitting audio samples of stream 1.

Second Exemplary Embodiment

According to a second exemplary embodiment, a conventional audio sample packet format is altered and used while further providing information regarding whether or not multi-stream audio is provided.

Referring to Table 21 below, a reserved area of a conventional audio sample packet may be used as Stream_Identifier (Stream_ID). Stream_ID indicates a stream number if multi-stream audio is provided. According to an exemplary embodiment, Stream_ID may use two bits; 00 indicates a first stream, 01 indicates a second stream, and so on. Each stream corresponds to a view of contents which are different from each other. Also, the above description is exemplary only, and packets matched with bits may be different.

In HDMI 1.4b, layout indicates information regarding the number of samples and channels. For instance, one audio sample packet may include four samples of 2 channel audio and one sample of 8 channel audio.

TABLE 21

Modified Audio Sample Packet Header

|  | Bit 7 | Bit 6 | Bit 5 | Bit 4 | Bit 3 | Bit 2 | Bit 1 | Bit 0 |
|---|---|---|---|---|---|---|---|---|
| HB0 |  |  |  | Packet type = 0x02 (Audio Sample Packet) |  |  |  |  |
| HB1 | Stream_Identifer | reserved | Layout | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sample-flat.sp0 |
| SP0 |  |  |  | Audio Sample Subpacktet 0 (7 Bytes) |  |  |  |  |
| SP1 |  |  |  | Audio Sample Subpacktet 1 (7 Bytes) |  |  |  |  |
| SP2 |  |  |  | Audio Sample Subpacktet 2 (7 Bytes) |  |  |  |  |
| SP3 |  |  |  | Audio Sample Subpacktet 3 (7 Bytes) |  |  |  |  |

TABLE 21-1

Description of Stream_Identifer

| Stream_Identifer | Description |
|---|---|
| 00 | Stream_1 |
| 01 | Stream_2 |
| 10 | Stream_3 |
| 11 | Stream_4 |

The above structure achieves the advantage of providing IDs of a multi-stream in a simple fashion using a traditional reserved area.

Figure 9:
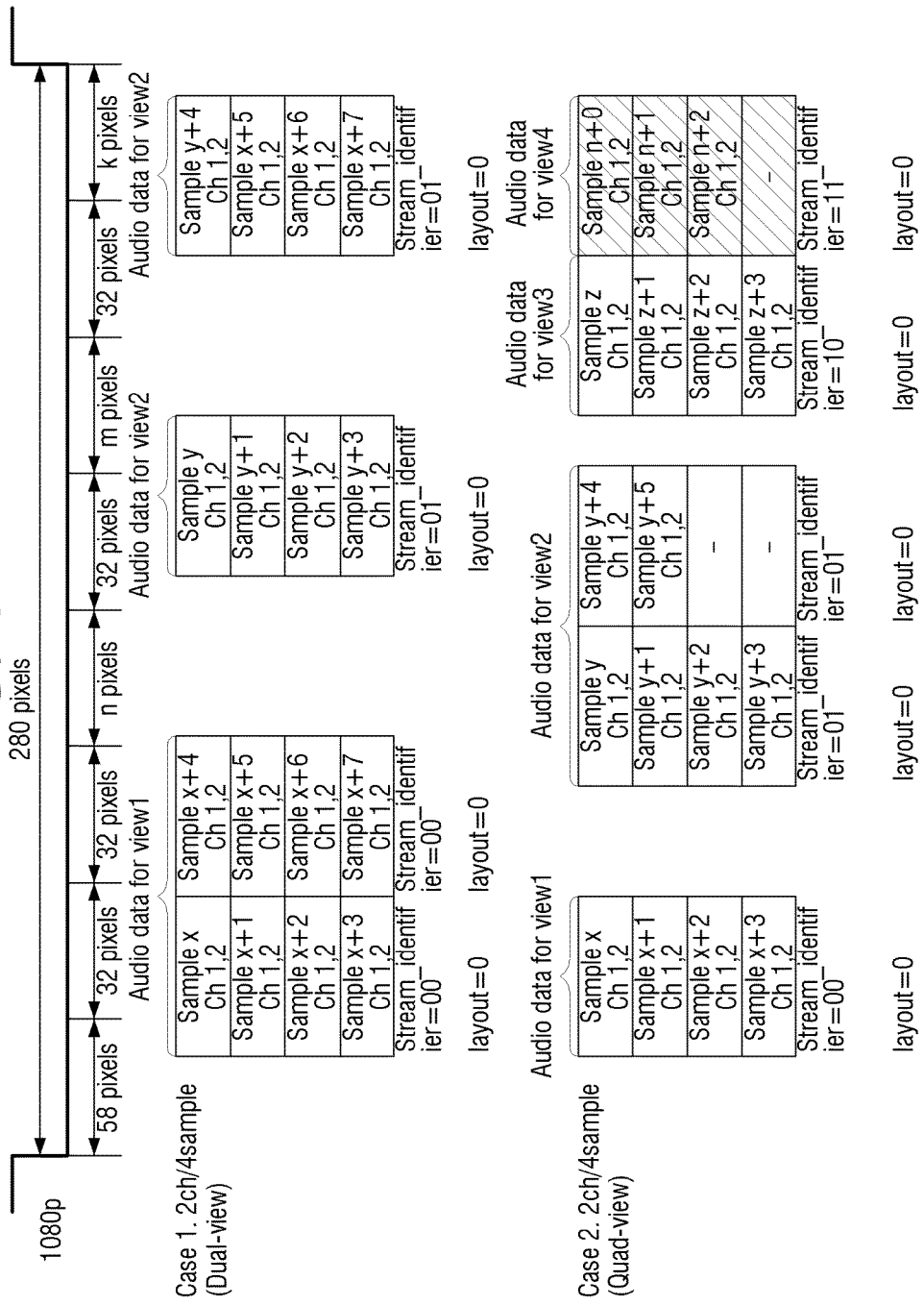
FIGS. 9 and 10 illustrate transport streams of multi-stream audio sample packets according to an exemplary embodiment.
Figure 10:
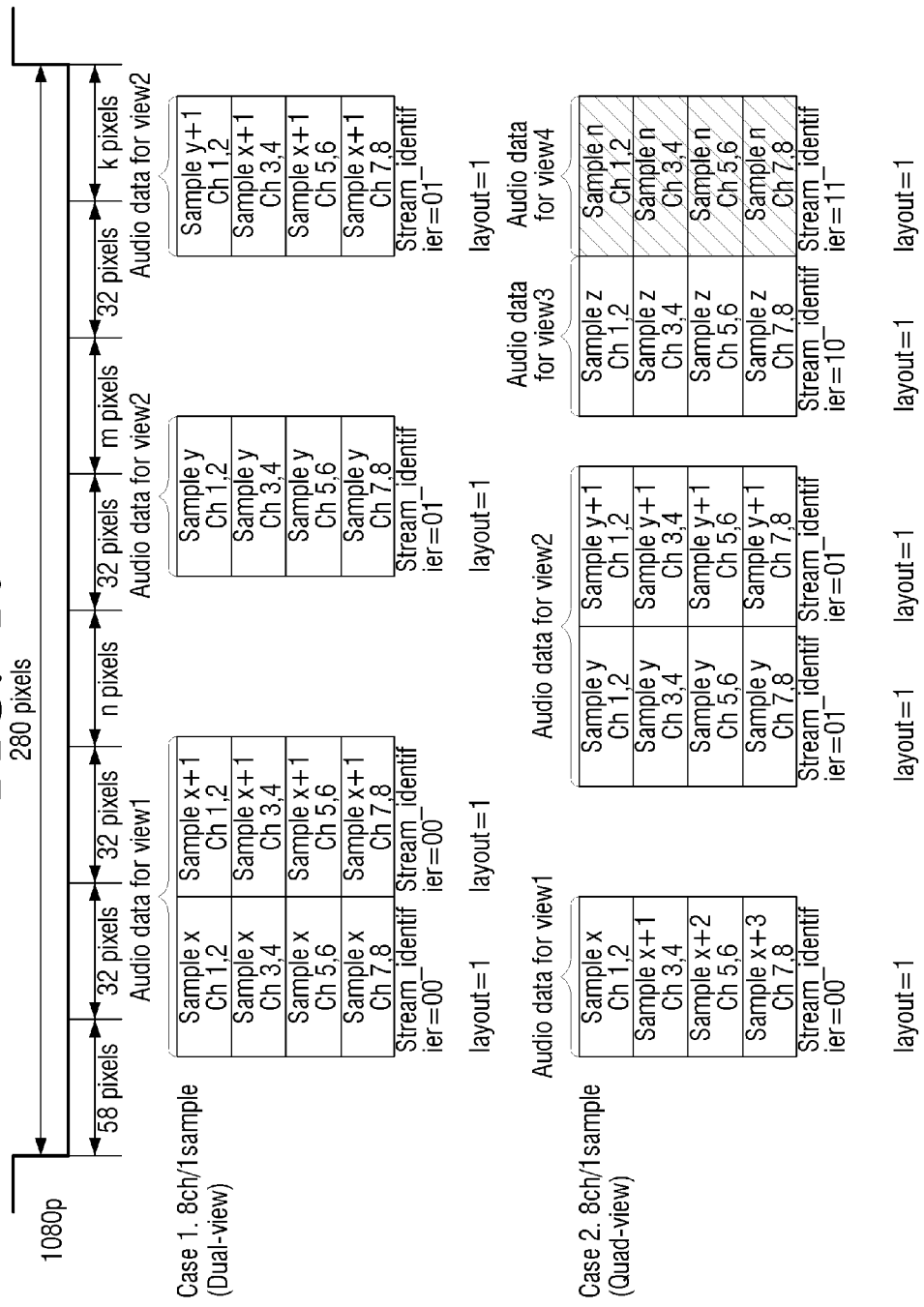

FIGS. 9 and 10 illustrate transport streams of multi-stream audio sample packets according to the second exemplary embodiment.

Referring to FIG. 9, regarding a 2 channel audio sample packet for dual view, one sample packet including four units of sample data of the same contents is transmitted in the horizontal blanking interval. In other words, one sample packet includes audio signals regarding one view. Regarding 2 channel audio sample packets for quad view, four sample packets for four views are transmitted in the horizontal blanking interval. Further, sample packets of any one of the views may be transmitted consecutively or sample packets may be transmitted in an alternating fashion with another view. FIG. 9 illustrates an example of a 2 channel audio sample packet; however, an audio sample packet having a plurality of channels including more than 2 channels may be also applied. Further, as illustrated, the same determined number of sample data may be included and transmitted in each view; however, different numbers of sample data may also be transmitted.

FIG. 10 illustrates transmitting 8 channel audio sample packets for dual view including sample data indicating 8 channels and two sample packets in the horizontal blanking interval. With one sample packet, the transmission of sample data regarding one view may be completed. Sample packets of each view may be transmitted consecutively or in an alternating fashion with sample packets for another view. Regarding 8 channel audio sample packets for quad view, one sample packet including sample data for one type of contents may be transmitted in the horizontal blanking interval; however, each sample packet of four views should be transmitted.

Similar to the second exemplary embodiment, if Stream_Identifier is used, and if an audio clock regeneration packet includes the above information, the operation of synchronizing video and audio may be implemented more efficiently. Table 22 below presents a structure of a modified audio clock regeneration packet according to the second exemplary embodiment.

Table 22 Audio Clock Regeneration Packet Header and Subpacket

TABLE 22-1

Audio Clock Regeneration Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | 0 | 0 | 0 | 0 |
| HB2 | 0 | 0 | 0 | 0 | 0 | 0 | 0 | 0 |

TABLE 22-2

Audio clock Regeneration subpacket

| Byte/Bit# | 7 | 6 | 5 | 4 | 3 | 2 | 1 | 0 |
|---|---|---|---|---|---|---|---|---|
| SB0 | 0 | 0 | 0 | 0 | 0 | 0 | Stream identifier | |
| SB1 | 0 | 0 | 0 | 0 | CTS 19 | — | — | CTS 16 |
| SB2 | CTS 15 | — | — | — | — | — | — | CTS 8 |
| SB3 | CTS 7 | — | — | — | — | — | — | CTS 0 |
| SB4 | 0 | 0 | 0 | 0 | N 19 | — | — | N 16 |
| SB5 | N 15 | — | — | — | — | — | — | N 8 |
| SB6 | N 7 | — | — | — | — | — | — | N 0 |

TABLE 22-3

Description of Stream_Identifer

| Stream_Identifer | Description |
|---|---|
| 00 | Stream_1 |
| 01 | Stream_2 |
| 10 | Stream_3 |
| 11 | Stream_4 |

Referring to Table 22, by including information regarding a multi-stream index in a reserved area of an audio clock regeneration packet, video and audio of a multi-view system may be implemented efficiently. Specifically, regarding systems that do not display multi view simultaneously, the above packet structure may be useful.

Third Exemplary Embodiment

A third exemplary embodiment is similar to a 3D audio sample packet of the fourth exemplary embodiment. A conventional audio sample packet form is altered and used while having functions of providing multi-stream identifying information.

Referring to Table 23 below, a reserved area of a conventional audio sample packet may be used as Stream_ID and multiASP_layout. Stream_ID and multiASP_layout are the same as those described in a 3D audio sample packet of the fourth exemplary embodiment.

TABLE 23

Modified Audio Sample Packet Header

| | Bit 7 | Bit 6 | Bit 5 | Bit 4 | Bit 3 | Bit 2 | Bit 1 | Bit 0 |
|---|---|---|---|---|---|---|---|---|
| HB0 | | | | Packet type = 0x02) | | | | |
| HB1 | Stream_ID | multiASP_layout | reserved | Layout/start | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sample-flat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

TABLE 23-1

Description of Stream_Identifer

| Stream_Identifer | Description |
|---|---|
| 0 | $1^{st}$ Stream |
| 01 | $2^{nd}$ Stream |

The above structure has an advantage of achieving compatibility in displaying information of both multi-stream audio and 3D audio through one data sample packet.

Features of an audio data transport stream according to a combination of values of Stream_ID field, multiASP_layout field and layout/start field are the same as those described above with respect to the 3D audio sample packet of the fourth exemplary embodiment.

Fourth Exemplary Embodiment

According to a fourth exemplary embodiment, a conventional audio sample packet format may be altered and used.

The fourth exemplary embodiment corresponds to a 3D audio sample packet of the fifth exemplary embodiment.

Referring to Table 24 below, a reserved area of a conventional audio sample packet may be used as Supports_Multistream and multiASP_layout. Supports_Multistream and multiASP_layout are the same as those described in a 3D audio sample packet of the fifth exemplary embodiment.

TABLE 24

Modified Audio Sample Packet Header

| | Bit 7 | Bit 6 | Bit 5 | Bit 4 | Bit 3 | Bit 2 | Bit 1 | Bit 0 |
|---|---|---|---|---|---|---|---|---|
| HB0 | | | | Packet type = 0x02) | | | | |
| HB1 | Supports_Multistream | multiASP_layout | reserved | Layout/start | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sample-flat.sp0 |
| SP0 | | | | Audio Sample Subpacktet 0 (7 Bytes): Reserved for $1^{st}$ stream | | | | |
| SP1 | | | | Audio Sample Subpacktet 1 (7 Bytes): Reserved for $2^{nd}$ stream | | | | |
| SP2 | | | | Audio Sample Subpacktet 2 (7 Bytes): Reserved for $3^{rd}$ stream | | | | |
| SP3 | | | | Audio Sample Subpacktet 3 (7 Bytes): Reserved for $4^{th}$ stream | | | | |

The above structure has an advantage of achieving compatibility in displaying information of both multi-stream audio and 3D audio through one data sample packet. Further, the above structure also achieves another advantage in that every feature to be supported can be written in one audio sample packet.

Features of an audio data transport stream may be implemented according to a combination of values of Supports_Multistream field, multiASP_layout field and layout/start field. Each field value is the same as in Table 13 of a 3D audio sample packet as described above.

Meanwhile, in the above exemplary embodiments, multi-stream audio signals may be included and transmitted in an area corresponding to an area where image data of each view is placed in the vertical synchronization blanking interval. The description of FIG. 7 provides a detailed description of this feature.

Fifth Exemplary Embodiment

A fifth exemplary embodiment proposes a modified method of a conventional audio sample packet format, similar to the third exemplary embodiment.

Referring to Table 25 below, a reserved area of a conventional audio sample packet may be used as Stream_ID and multiASP_layout. Stream_ID and multiASP_layout perform the same functions as Stream_ID and multiASP_layout in the third exemplary embodiment, respectively.

Since Stream_ID is expressed with two bits, four stream numbers may be indicated if multi-stream audio is provided. Each different combination of bits corresponds to a view of contents which are different from each other.

If one view of multi-stream audio has audio signals having 8 channels or less, it will not be found that Stream_ID is more than 1 and multiASP_layout is 1 for one audio sample packet.

TABLE 25

| | Bit 7 | Bit 6 | Bit 5 | Bit 4 | Bit 3 | Bit 2 | Bit 1 | Bit 0 |
|---|---|---|---|---|---|---|---|---|
| | | | | Modified Audio Sample Packet Header | | | | |
| HB0 | | | | Packet type = 0x02 (Audio Sample Packet) | | | | |
| HB1 | Stream ID | | multiASP_layout | Layout/start | Sample_present.sp3 | Sample_present.sp2 | Sample_present.sp1 | Sample_present.sp0 |
| HB2 | 8.3 | 8.2 | 8.1 | 8.0 | Sample_flat.sp3 | Sample_flat.sp2 | Sample_flat.sp1 | Sample-flat.sp0 |
| SP0 | | | | Audio Sample Subpacktet 0 (7 Bytes) | | | | |
| SP1 | | | | Audio Sample Subpacktet 1 (7 Bytes) | | | | |
| SP2 | | | | Audio Sample Subpacktet 2 (7 Bytes) | | | | |
| SP3 | | | | Audio Sample Subpacktet 3 (7 Bytes) | | | | |

TABLE 25-1

Description of Stream_Identifer

| Stream_Identifer | Description |
|---|---|
| 00 | $1^{st}$ stream |
| 01 | $2^{nd}$ stream |
| 10 | $3^{rd}$ stream |
| 11 | $4^{th}$ stream |

The above structure has an advantage of achieving compatibility in displaying information of both multi-stream audio and 3D audio though one data sample packet. Specifically, compared to the third exemplary embodiment, a greater number of multi-streams can be distinguished.

Table 26 presents features of an audio data transport stream which combines values of Stream_ID field, multiASP_layout field and layout/start field. If multiASP_layout=1, a 3D audio transport stream is indicated, and layout/start indicates information regarding a start of a packet. If Stream_ID=01~11, multi-streams are indicated, and the number of channels and samples is established according to layout/start.

TABLE 26

Capability to deal with Proposed Features According to Exemplary Embodiments

| ASP header fields | | | |
|---|---|---|---|
| Stream_ID | multiASP_layout | Layout/start | Description |
| 00b | 0 | Layout = 0 | 24 bits-sample + default (2 ch/4 sample) |
| 00b | 0 | Layout = 1 | 24 bits-sample + default (8 ch/1 sample) |
| 00b | 1 | Start = 0 | 24 bits-sample + 3D-audio-channel non-start ('N' ch/1 sample) |
| 00b | 1 | Start = 1 | 24 bits-sample + 3D-audio-channel start ('N' ch/1 sample) |

TABLE 26-continued

Capability to deal with Proposed Features According to Exemplary Embodiments

| ASP header fields | | | |
|---|---|---|---|
| Stream_ID | multiASP_layout | Layout/start | Description |
| 00b~11b | 0 | Layout = 0 | 24 bits-sample + Multi-stream (2 ch/4 sample) |
| 00b~11b | 0 | Layout = 1 | 24 bits-sample + Multi-stream (8 ch/1 sample) |
| 1 | 1 | 0 | Not supported |
| 1 | 1 | 1 | (refer to the 2. Analysis of proposed features (1/2)" slide. Poage 8) |

Sixth Exemplary Embodiment

A sixth exemplary embodiment proposes adding Stream_ID to audio sample packets according to the first exemplary embodiment. Stream_ID is the same as described above, and other fields are the same as described in the first exemplary embodiment. Table 27 presents an audio sample packet header according to the sixth exemplary embodiment. However, even though Stream_ID is established with 4 bits in the table, it may be also established with 1~3 bits, or 5 bits or more. Packet type indicates a newly defined packet type.

To distinguish audio in each stream, Stream_ID is used. Thus, in contrast to the first exemplary embodiment, one multi-stream audio sample packet includes audio sample data for one stream.

TABLE 2

| Extension Audio Sample Packet | | | | | | | |
|---|---|---|---|---|---|---|---|
| Bit 7 | Bit 6 | Bit 5 | Bit 4 | Bit 3 | Bit 2 | Bit 1 | Bit 0 |
| HB0 | Packet type = 0x02 (Multi-Stream Audio Sample Packet) | | | | | | |
| HB1 | | Stream_ID | | Sample_present.sp3 | Sample_present.sp2 | Sample_present.sp1 | Sample_present.sp0 |
| HB2 | B.3 | B.2 | B.1 | B.0 | Sample_flat.sp3 | Sample_flat.sp2 | Sample_flat.sp1 | Sample-flat.sp0 |
| SP0 | Audio Sample Subpacktet 0 (7 Bytes) | | | | | | |
| SP1 | Audio Sample Subpacktet 1 (7 Bytes) | | | | | | |
| SP2 | Audio Sample Subpacktet 2 (7 Bytes) | | | | | | |
| SP3 | Audio Sample Subpacktet 3 (7 Bytes) | | | | | | |

Seventh Exemplary Embodiment

A seventh exemplary embodiment proposes a 3D audio sample packet and a multi-stream audio sample packet using a 3D audio sample packet which is newly defined in the first exemplary embodiment of section 1.1.

The seventh exemplary embodiment is similar to the first exemplary embodiment, and further includes an ext_layout field indicating whether or not multi-stream is provided. Thus, if ext_layout=0, this field indicates that multi-stream audio is transmitted. If ext_layout=1, the field indicates that 3D audio is transmitted.

Other fields including the sample_start field, sample_present.spX field, and sample_flat.spX field, are the same as described in the first exemplary embodiment, and will not be further described. Table 28 presents an audio sample packet structure according to the seventh exemplary embodiment.

TABLE 28

| Extended Audio Sample Packet (2 channels 2 streams Fs = 96 kHz) | | |
|---|---|---|
| N/chan 1, 2 | N/chan 1, 2 | N/chan 1, 2 |
| (Stream 1) | (Stream 1) | (Stream 1) |
| N/chan 1, 2 | N/chan 1, 2 | N/chan 1, 2 |

TABLE 28-continued

| Extended Audio Sample Packet (2 channels 2 streams Fs = 96 kHz) | | |
|---|---|---|
| (Stream 1) | (Stream 1) | (Stream 1) |
| — | — | — |
| — | — | — |

TABLE 28-1

| Example of extended audio sample packet | | | | | | | | |
|---|---|---|---|---|---|---|---|---|
| Byte/Bit# | 7 | 6 | 5 | 4 | 3 | 2 | 1 | 0 |
| HB0 | 0 | 0 | 0 | 0 | 1 | 0 | 1 | 1 |
| HB1 | 0 | 0 | Sample_start = X | Ext_layout = 0 | Sample_present.sp3 = 0 | Sample_present.sp2 = 0 | Sample_present.sp1 = 1 | Sample_present.sp0 = 1 |
| HB2 | B.3 | B.2 | B.1 | B.0 | Sample_flat.sp3 | Sample_flat.sp2 | Sample_flat.sp1 | Sample-flat.sp0 |
| PB0~PB6 | Channel 1, 2 audio data/sample N(Stream 1) | | | | | | | |
| PB7~PB13 | Channel 1, 2 audio data/sample M(Stream 2) | | | | | | | |
| PB14~PB20 | — | | | | | | | |
| PB21~PB27 | — | | | | | | | |

Table 29 indicates a packet body structure according to field values of ext_layout. As illustrated, in multi-stream, audio signals corresponding to one view may include 2 channels, and thus, one packet may include audio signals for 4 views. Alternatively, in 3D audio signals, audio signals for a plurality of channels may be indicated. Even though the various exemplary embodiments described in this specification describe 3D audio for up to 32 channels, the exemplary embodiments are not limited thereto. For example, the exemplary embodiments can be applied to audio signals having 32 channels or more.

TABLE 29

EASP packetization

| Ext_layout Value | Sample_start Value | Max Num Channels | Samples | Subpkt 0 | Subpkt 1 | Subpkt 2 | Subpkt 3 |
|---|---|---|---|---|---|---|---|
| 0 | X | 2 | 4 | Chnl 1, 2 Stream 0 (Sample M) | Chnl 1, 2 Stream 1 (Sample M) | Chnl 1, 2 Stream 2 (Sample M) | Chnl 1, 2 Stream 3 (Sample M) |
| 1 | 1 | N | 1 | Chnl 1, 2 Stream 0 (Sample M) | Chnl 3, 4 Stream 0 (Sample M) | Chnl 5, 6 Stream 0 (Sample M) | Chnl 7, 8 Stream 0 (Sample M) |
| 1 | 0 | | | — | — | — | — |
| 1 | 0 | | | Chnl N-7, N-6 Stream 0 (Sample M) | Chnl N-5, N-4 Stream 0 (Sample M) | Chnl N-3, N-2 Stream 0 (Sample M) | Chnl N-1, N Stream 0 (Sample M) |

Table 30 presents valid Sample_Present bits.

TABLE 30

Valid Sample_Present Bit Configurations for Multiple Audio Stream Transmission

| SP0 | SP1 | SP1 | SP3 | Description |
|---|---|---|---|---|
| 0 | 0 | 0 | 0 | No Subpackets contain audio samples. |
| 1 | 0 | 0 | 0 | Only Subpacket 0 contains audio samples for stream 0 |
| 1 | 1 | 0 | 0 | Subpackets 0 and 1 contain audio samples for stream 0 and 1 |
| 1 | 1 | 1 | 0 | Subpackets 0, 1 and 2 contain audio samples for stream 0, 1 and 2 |
| 1 | 1 | 1 | 1 | All subpackets contain audio samples for stream 0, 1, 2, and 3 |

FIG. 11 illustrates a transport stream of a multi-stream audio sample packet in the above seventh exemplary embodiment.

Referring to FIG. 11, one sample packet including a sample of two views may be transmitted in the horizontal blanking interval regarding 2 channel audio sample packets for dual view. Regarding 2 channel audio sample packets for quad view, one sample packet including four samples is transmitted in the horizontal blanking interval. In other words, one sample packet includes and transmits samples of four views. Although FIG. 11 illustrates an example of a 2 channel audio sample packet, an audio sample packet having a plurality of channels including more than 2 channels may be applied according to other exemplary embodiments.

As described above with respect to the above various exemplary embodiments, multi-stream audio signals may be included and transmitted in an area corresponding to the area where image data of each view is placed in the vertical synchronization blanking interval. FIG. 11 illustrates a transport stream format in this case. In FIG. 11, audio signals corresponding to a left area of image signals in each view may be included.

1-4. Multi-Stream One Bit Audio Packet

First Exemplary Embodiment

According to this first exemplary embodiment, a new packet for multi-stream one bit audio is defined. This corresponds to a 3D audio sample packet.

If transmitting multi-stream one bit audio, each sub packet may include a one bit audio bit for 0, 1, 2 or more audio channels. A multi-stream one bit audio sample includes four stream_present bits, and each bit is created for a corresponding sub packet.

If a sub packet includes an audio sample in each stream, a corresponding bit may be established. Four stream_invalid.spX bits may be established if available audio data that can be used are not found. If a stream_invalid.spX bit is established, sub packet X continuously indicates a sample period, however, does not include any available data.

TABLE 31

Multi-Stream One Bit Audio Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 1 | 1 | 1 |
| HB1 | Rsvd (0) | Rsvd (0) | Rsvd (0) | Rsvd (0) | samples_ present sp3 | Samples_ present sp2 | Samples_ present sp1 | Samples_ present sp0 |
| HB2 | Rsvd (0) | Rsvd (0) | Rsvd (0) | Rsvd (0) | Samples_ invalid.sp3 | Samples_ invalid.sp2 | Samples_ invalid.sp1 | Samples_ invalid.sp0 | stream_present.spX: [4 fields, 1 bit each] indicates whether sub packet X has an audio sample of stream X. stream_present.spX substantially performs the same function as sample_present.spX described above with respect to the above 3D audio sample packet, and thus will not be further explained.

stream_invalid.spX: [4 fields, 1 bit each] indicates whether sub packet X refers to an invalid sample of stream X. If samples included in sub packet X are not valid, stream_invalid=1. Otherwise, stream_invalid=0. Bits are valid if related stream_present.spX is established. stream_present.spX substantially performs the same function as sample_present.spX described above with respect to the above 3D audio sample packet, and will not be further explained.

Regarding multi-stream one bit audio, according to exemplary embodiments, sample frequency information is included and transmitted in an audio InfoFrame (see section 8.2.2 of HDMI 1.4b).

A multi-stream one bit audio sample packet uses the same four sub packets as a one bit audio sample sub packet shown in Table 31. Since a multi-stream one bit audio sample packet does not conform to IEC 60958 block format, a one bit multi-stream audio sample packet does not have B0~B3 fields, which is different from a multi-stream audio sample packet.

Various Alternatives

Regarding the various above described exemplary embodiments of multi-stream audio sample packets, corresponding one bit multi-stream audio sample packets may be defined, respectively. In other words, beside samples_invalid.spX, as described above, a one bit multi-stream audio sample packet may be defined as a multi-stream audio sample packet, and B0~B3 fields from a multi-stream audio sample packet may be used.

2-1. InfoFrame for 3D Audio/Metadata Packet

First Exemplary Embodiment

As described above, in a first exemplary embodiment, additional information related to 3D audio may be transmitted by utilizing newly defined audio metadata packets instead of InfoFrame. Sources transmit audio metadata once for at least two video fields whenever transmitting a 3D audio stream.

Audio metadata may indicate various characteristics, such as the number of channels, an Audio Channel Allocation Standard Type (ACAT), and allocations of channel/speaker of a 3D audio stream. The following tables present a newly defined audio metadata packet header.

TABLE 32

Audio Metadata Packet Header

| Byte/Bit# | 7 | 6 | 5 | 4 | 3 | 2 | 1 | 0 |
|---|---|---|---|---|---|---|---|---|
| HB0 | 0 | 0 | 0 | 0 | 1 | 1 | 0 | 1 |
| HB1 | Rsvd (0) | Rsvd (0) | Rsvd (0) | Rsvd (0) | Rsvd (0) | Rsvd (0) | Rsvd (0) | Rsvd (0) |
| HB2 | Rsvd (0) | Rsvd (0) | Rsvd (0) | Rsvd (0) | Rsvd (0) | Rsvd (0) | Rsvd (0) | Rsvd (0) |

TABLE 33

Audio Metadata Packet Contents

| Byte/Bit# | 7 | 6 | 5 | 4 | 3 | 2 | 1 | 0 |
|---|---|---|---|---|---|---|---|---|
| PB0 | Rsvd (0) | Rsvd (0) | Rsvd (0) | 3D_CC4 | 3D_CC3 | 3D_CC2 | 3D_CC1 | 3D_CC0 |
| PB1 | Rsvd (0) | Rsvd (0) | Rsvd (0) | Rsvd (0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB2 PB27 | | | | Reserved (0) | | | | |

Each field of the above packets is defined as follows.

3D_CC: [5 bits] indicates a channel count of transmitted 3D audio. If an audio channel count (CC0, . . . , CC2) in an audio InfoFrame is not consistent with a 3D audio channel count (3D_CC0, . . . , 3D_CC4) in an audio metadata packet, the channel count of the audio InfoFrame is disregarded. Table 34 presents audio channels according to values of 3D_CC.

ACAT: [4 bits] indicates an audio channel allocation standard type provided by sources. Table 35 presents ACAT field values. Table 36 explains allocating a speaker position if ACAT is established as 0x01 (10.2 channels). Similarly, Tables 37 and 38 include information for 22.2 channels and 30.2 channels.

3D_CA: [8 bits] indicates the allocation of channels/speakers for 3D audio. Further explanations are illustrated in Tables 36 to 38. 3D_CA field is not valid for an IEC 61937 compression audio stream.

TABLE 34

3D_CC Field

| 3D_CC4 | 3D_CC3 | 3D_CC2 | 3D_CC1 | 3D_CC0 | Audio Channel Count |
|---|---|---|---|---|---|
| 0 | 0 | 0 | 0 | 0 | Refer to Stream Header |
| 0 | 0 | 0 | 0 | 1 | 2 channels |
| 0 | 0 | 0 | 1 | 0 | 3 channels |
| 0 | 0 | 0 | 1 | 1 | 4 channels |
| 0 | 0 | 1 | 0 | 0 | 5 channels |
| 0 | 0 | 1 | 0 | 1 | 6 channels |
| 0 | 0 | 1 | 1 | 0 | 7 channels |
| 0 | 0 | 1 | 1 | 1 | 8 channels |
| 0 | 1 | 0 | 0 | 0 | 9 channels |
| 0 | 1 | 0 | 0 | 1 | 10 channels |
| 0 | 1 | 0 | 1 | 0 | 11 channels |
| 0 | 1 | 0 | 1 | 1 | 12 channels |
| — | — | — | — | — | |
| 1 | 1 | 1 | 1 | 1 | 32 channels |

TABLE 35

Audio Channel Allocation Standard Type Field

| ACAT3 | ACAT2 | ACAT1 | ACAT0 | Description |
|---|---|---|---|---|
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |
| 0 | 0 | 1 | 1 | Refer to 30 2 channels (IEC62574/Ed 1) |
| 0 | 1 | 0 | 0 | reserved |
| 1 | 1 | 1 | 1 | |

TABLE 36

3D_CA Field for 10.2 channels (ACAT = 0x01)

| 3D_CA (binary) 7 | 6 | 5 | 4 | 3 | 2 | 1 | 0 | 3D_CA (hex) | Ch 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | RS | LS | FC | LFE1 | FR | FL |
| 0 | 0 | 0 | 0 | 0 | 0 | 1 | 0 | 0x02 | | | | | BR | BL | RS | LS | FC | LFE1 | FR | FL |
| 0 | 0 | 0 | 0 | 0 | 0 | 1 | 1 | 0x03 | TpFC | LFE2 | TpFR | TpFL | BR | BL | RS | LS | FC | LFE1 | FR | FL |
| 0 | 0 | 0 | 0 | 0 | 1 | 0 | 0 | 0x04 | | | | | Reserved | | | | | | | |
| 1 | 1 | 1 | 1 | 1 | 1 | 1 | 1 | 0xFF | | | | | | | | | | | | |

TABLE 37

3D_CA Field for 22.2 channels (ACAT = 0x02)

| 3D_CA (binary) 7 | 6 | 5 | 4 | 3 | 2 | 1 | 0 | 3D_CA (hex) | Ch 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | SiR | SiL | FC | LFE1 | FR | FL |
| 0 | 0 | 0 | 0 | 0 | 0 | 1 | 0 | 0x02 | | | | | BR | BL | SiR | SiL | FC | LFE1 | FR | FL |
| 0 | 0 | 0 | 0 | 0 | 0 | 1 | 1 | 0x03 | TpFC | LFE2 | TpFR | TpFL | BR | BL | SiR | SiL | FC | LFE1 | FR | FL |
| 0 | 0 | 0 | 0 | 0 | 1 | 0 | 0 | 0x04 | TpFC | LFE2 | TpFR | TpFL | BR | BL | SiR | SiL | FC | LFE1 | FR | FL |
| 0 | 0 | 0 | 0 | 0 | 1 | 0 | 1 | 0x05 | | | | | | | Reserved | | | | | |
| 1 | 1 | 1 | 1 | 1 | 1 | 1 | 1 | 0xFF | | | | | | | | | | | | |

| 3D_CA (binary) 7 | 6 | 5 | 4 | 3 | 2 | 1 | 0 | 3D_CA (hex) | Ch 24 | 23 | 22 | 21 | 20 | 19 | 18 | 17 | 16 | 15 | 14 | 13 |
|---|---|---|---|---|---|---|---|---|---|---|---|---|---|---|---|---|---|---|---|---|
| 0 | 0 | 0 | 0 | 0 | 0 | 0 | 0 | 0x00 | — | — | — | — | — | — | — | — | — | — | — | — |
| 0 | 0 | 0 | 0 | 0 | 0 | 0 | 1 | 0x01 | — | — | — | — | — | — | — | — | — | — | — | — |
| 0 | 0 | 0 | 0 | 0 | 0 | 1 | 0 | 0x02 | — | — | — | — | — | — | — | — | — | — | — | — |
| 0 | 0 | 0 | 0 | 0 | 0 | 1 | 1 | 0x03 | — | — | — | — | — | — | — | — | — | — | — | — |
| 0 | 0 | 0 | 0 | 0 | 1 | 0 | 0 | 0x04 | BtFC | BtFR | BtFL | TpC | TpSIR | TpSiL | TpBC | TpBR | TpBL | BC | FRC | FLC |
| 0 | 0 | 0 | 0 | 0 | 1 | 0 | 1 | 0x05 | | | | | | | Reserved | | | | | |
| 1 | 1 | 1 | 1 | 1 | 1 | 1 | 1 | 0xFF | | | | | | | | | | | | |

TABLE 38

3D_CA Field for 30.2 channels (ACAT = 0x03)

| 3D_CA (binary) 7 | 6 | 5 | 4 | 3 | 2 | 1 | 0 | 3D_CA (hex) | Ch 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|
| 0 | 0 | 0 | 0 | 0 | 0 | 0 | 0 | 0x00 | | | | | | | | | | | FR | FL |
| 0 | 0 | 0 | 0 | 0 | 0 | 0 | 1 | 0x01 | | | | | | | SiR | SiL | FC | LFE1 | FR | FL |
| 0 | 0 | 0 | 0 | 0 | 0 | 1 | 0 | 0x02 | | | | | BR | BL | SiR | SiL | FC | LFE1 | FR | FL |
| 0 | 0 | 0 | 0 | 0 | 0 | 1 | 1 | 0x03 | TpFC | LFE2 | TpFR | TpFL | BR | BL | SiR | SiL | FC | LFE1 | FR | FL |

TABLE 38-continued

| 3D_CA Field for 30.2 channels (ACAT = 0x03) | | | | | | | | | | | | | | | | | | | |
|---|---|---|---|---|---|---|---|---|---|---|---|---|---|---|---|---|---|---|---|
| 0 | 0 | 0 | 0 | 0 | 1 | 0 | 0 | 0x04 | TpFC | LFE2 | TpFR | TpFL | BR | BL | SiR | SiL | FC | LFE1 | FR | FL |
| 0 | 0 | 0 | 0 | 0 | 1 | 0 | 1 | 0x05 | TpFC | LFE2 | TpFR | TpFL | BR | BL | SiR | SiL | FC | LFE1 | FR | FL |
| 0 | 0 | 0 | 0 | 0 | 1 | 1 | 0 | 0x06 | Reserved | | | | | | | | | | | |
| 1 | 1 | 1 | 1 | 1 | 1 | 1 | 1 | 0xFF | | | | | | | | | | | | |

| 3D_CA (binary) | | | | | | | | 3D_CA | Channel Number | | | | | | | | | | | |
|---|---|---|---|---|---|---|---|---|---|---|---|---|---|---|---|---|---|---|---|---|
| 7 | 6 | 5 | 4 | 3 | 2 | 1 | 0 | (hex) | 24 | 23 | 22 | 21 | 20 | 19 | 18 | 17 | 16 | 15 | 14 | 13 |
| 0 | 0 | 0 | 0 | 0 | 0 | 0 | 0 | 0x00 | — | — | — | — | — | — | — | — | — | — | — | — |
| 0 | 0 | 0 | 0 | 0 | 0 | 0 | 1 | 0x01 | — | — | — | — | — | — | — | — | — | — | — | — |
| 0 | 0 | 0 | 0 | 0 | 0 | 1 | 0 | 0x02 | — | — | — | — | — | — | — | — | — | — | — | — |
| 0 | 0 | 0 | 0 | 0 | 0 | 1 | 1 | 0x03 | — | — | — | — | — | — | — | — | — | — | — | — |
| 0 | 0 | 0 | 0 | 0 | 1 | 0 | 0 | 0x04 | BtFC | BtFR | BtFL | TpC | TpSIR | TpSIL | TpBC | TpBR | TpBL | BC | FRC | FLC |
| 0 | 0 | 0 | 0 | 0 | 1 | 0 | 1 | 0x05 | BtFC | BtFR | BtFL | TpC | TpSIR | TpSIL | TpBC | TpBR | TpBL | BC | FRC | FLC |
| 0 | 0 | 0 | 0 | 0 | 1 | 1 | 0 | 0x06 | Reserved | | | | | | | | | | | |
| 1 | 1 | 1 | 1 | 1 | 1 | 1 | 1 | 0xFF | | | | | | | | | | | | |

| 3D_CA (binary) | | | | | | | | 3D_CA | Channel Number | | | | | | | |
|---|---|---|---|---|---|---|---|---|---|---|---|---|---|---|---|---|
| 7 | 6 | 5 | 4 | 3 | 2 | 1 | 0 | (hex) | 32 | 31 | 30 | 29 | 28 | 27 | 26 | 25 |
| 0 | 0 | 0 | 0 | 0 | 0 | 0 | 0 | 0x00 | — | — | — | — | — | — | — | — |
| 0 | 0 | 0 | 0 | 0 | 0 | 0 | 1 | 0x01 | — | — | — | — | — | — | — | — |
| 0 | 0 | 0 | 0 | 0 | 0 | 1 | 0 | 0x02 | — | — | — | — | — | — | — | — |
| 0 | 0 | 0 | 0 | 0 | 0 | 1 | 1 | 0x03 | — | — | — | — | — | — | — | — |
| 0 | 0 | 0 | 0 | 0 | 1 | 0 | 0 | 0x04 | — | — | — | — | — | — | — | — |
| 0 | 0 | 0 | 0 | 0 | 1 | 0 | 1 | 0x05 | TpRS | TpLS | RSd | LSd | RS | LS | FRW | FLW |
| 0 | 0 | 0 | 0 | 0 | 1 | 1 | 0 | 0x06 | Reserved | | | | | | | |
| 1 | 1 | 1 | 1 | 1 | 1 | 1 | 1 | 0xFF | | | | | | | | |

Whenever transmitting an active 3D audio stream, a correct audio metadata packet may be transmitted at least once for two video fields. If a new 3D audio stream begins, or if changes are included in a 3D audio stream that can be indicated by an audio metadata packet and an audio InfoFrame, altered and correct audio metadata packets may be transmitted no later than one video frame following a first affected non-silent audio sample. Transmitting the altered and correct audio metadata packet may occur right before transmitting the first affected audio sample. Audio metadata may be transmitted at any time including the horizontal blanking interval or the vertical blanking interval within the data island interval. If 3D audio is processed by streaming, the Sink disregards CC and CA fields included in the audio InfoFrame, and refers to 3D_CC and 3D_CA included in audio metadata.

However, if transmitting the above audio metadata, traditional audio InfoFrame may still be utilized. In other words, if audio metadata are newly used to allocate channels for 3D audio, audio InfoFrame is utilized to allocate channels for 2D audio.

Further, even though the above exemplary embodiments describe 10.2 channels, 22.2 channels, and 30.2 channels of ACAT, the technical art of the exemplary embodiments is not limited thereto and can be applied, for example, to less than 10.2 channels, more than 30.2 channels, and 10.2 to 30.2 channels.

Second Exemplary Embodiment

The second exemplary embodiment is different from the first exemplary embodiment in that alterations of audio InfoFrame defined in HDMI 1.4b may be considered according to the second exemplary embodiment. Table 39 presents audio InfoFrame in this case. The CC field indicates a channel count of transmitted audio, and the CA field indicates information of a channel/speaker allocation.

Conventionally, a CC field is expressed with three bits. However, a second exemplary embodiment uses two additional bits of reserved area. Thus, channel count information may be indicated by utilizing five bits, CC0, CC1, CC2, CC3, CC4.

Further, information of a channel/speaker allocation is added to a reserved area of CEA861-D, as shown above in Table 20. In contrast to the first exemplary embodiment, the second exemplary embodiment does not have an ACAT field.

Table 39—Modified Audio InfoFrame

TABLE 39-1

| Modified Audio InfoFrame Packet Header | | | | | | | | |
|---|---|---|---|---|---|---|---|---|
| Byte/Bit# | 7 | 6 | 5 | 4 | 3 | 2 | 1 | 0 |
| HB0 | Packet type = 0x84 | | | | | | | |
| HB1 | Version Number = 0x01 | | | | | | | |
| HB2 | 0 | 0 | 0 | Length = 10(0x0A) | | | | |

TABLE 39-2

Audio infoframe Packet contents

| Packet Byte # | CEA-861-D Byte # | 7 | 6 | 5 | 4 | 3 | 2 | 1 | 0 |
|---|---|---|---|---|---|---|---|---|---|
| PB0 | n. a | | | | Checksum | | | | |
| PB1 | Data Byte 1 | CT3 | CT2 | CT1 | CT0 | Rsvd | CC2 | CC1 | CC0 |
| PB2 | Data Byte 2 | CC4 | CC3 | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEP BL1 | LFEP BL0 |
| PB6 | Data Byte 6 | | | | Reserved(0) | | | | |
| PB7 | Data Byte 7 | | | | Reserved(0) | | | | |
| PB8 | Data Byte 8 | | | | Reserved(0) | | | | |
| PB9 | Data Byte 9 | | | | Reserved(0) | | | | |
| PB10 | Data Byte 10 | | | | Reserved(0) | | | | |
| PB11-PB27 | n. a | | | | Reserved(0) | | | | |

Third Exemplary Embodiment

A third exemplary embodiment expands the second exemplary embodiment and alters the audio InfoFrame defined in HDMI 1.4b. Table 40 presents an audio InfoFrame structure according to the third exemplary embodiment. Similar to the second exemplary embodiment, a CC field indicates a channel count of transmitted audio, and a CA field indicates information of a channel/speaker allocation.

The third exemplary embodiment provides further expansion of a CA field while being basically similar to the second exemplary embodiment. One bit of a reserved area is established as channel_extension bit. If channel_extension=0, the CC# and CA# fields defined in CEA861-D are utilized. In other words, the third exemplary embodiments supports 2D audio mode. If channel_extension=1, PB2[7:6] is used as expansion bit (CC4, CC3) of CC, and a reserved area of PB6 is used as a CA_ext field. Expansion bits for 3D audio are used.

In this case, similar to the second exemplary embodiment, conventional CC fields are expressed with three bits. However, the third exemplary embodiment further uses two bits of reserved areas. Thus, by utilizing five bits of CC0, CC1, CC2, CC3, CC4, channel count information is indicated.

Further, a PB6 field may be added and used to CA bits (PB4). In a reserved area of CEA861-D as shown in Table 20 (or, CEA861-E as shown in Table 28), a definition of channel/speaker information for audio having 10.2 channels or more may be included. Extra tables may be defined in each standard. As a result, the CA field expands to 16 bits, and thus, multi-channel audio can be transmitted.

Also, a new 8-bit field may be defined and used by substituting a field with a traditional CA field, which is different from the above description. For instance, a new CA bit can be defined using a PB6 field or a PB7 field.

Table 40—Modified Audio InfoFrame 2

TABLE 40-1

Audio infoframe Pocket Header

| Byte/Bit# | 7 | 6 | 5 | 4 | 3 | 2 | 1 | 0 |
|---|---|---|---|---|---|---|---|---|
| HB0 | | | | Packet type = 0x84 | | | | |
| HB1 | | | | Version Number = 0x01 | | | | |
| HB2 | 0 | 0 | 0 | | Length = 10(0x0A) | | | |

TABLE 40-2

Audio infoframe Pocket contents

| Packet Byte # | CEA-861-D Byte # | 7 | 6 | 5 | 4 | 3 | 2 | 1 | 0 |
|---|---|---|---|---|---|---|---|---|---|
| PB0 | n. a | | | | Checksum | | | | |
| PB1 | Data Byte 1 | CT3 | CT2 | CT1 | CT0 | Rsvd | CC2 | CC1 | CC0 |
| PB2 | Data Byte 2 | CC4 | CC3 | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEP BL1 | LFEP BL0 |
| PB6 | Data Byte 6 | | | | CA ext | | | | |
| PB7 | Data Byte 7 | | | | Reserved(0) | | | | |
| PB8 | Data Byte 8 | | | | Reserved(0) | | | | |
| PB9 | Data Byte 9 | | | | Reserved(0) | | | | |
| PB10 | Data Byte 10 | | | | Reserved(0) | | | | |
| PB11-PB27 | n. a | | | | Reserved(0) | | | | |

Fourth Exemplary Embodiment

A fourth exemplary embodiment combines the second exemplary embodiment and the third exemplary embodiment. According to the fourth exemplary embodiment, a conventional audio InfoFrame includes a 3D_CH_present field, a CA field of PB4, and a 3D_CC field of PB6.

The 3D_CH_present field performs the same function of channel_extension as described in the third exemplary embodiment. Thus, if 3D_CH_present=0, the CC# and CA# fields defined in CEA861-D are still utilized. In other words, the fourth exemplary embodiment supports a 2D audio mode. Also, if 3D_CH_present=1, PB6[4:0] is used for expansion bits of CC (CC4, CC3, CC2, CC1, CC0), and a reserved area of PB4 uses a CA field which is similar to the second exemplary embodiment. Expansion bits for 3D audio are utilized. Similar to the second and third exemplary embodiments, an ACAT field is not defined. Other features which are not described particularly are the same as the features described above with respect to the first to third exemplary embodiments.

Table 41—Modified Audio InfoFrame 3

TABLE 41-1

| Modified Audio InfoFrame Packet Header | | | | | | | | |
|---|---|---|---|---|---|---|---|---|
| Byte/Bit# | 7 | 6 | 5 | 4 | 3 | 2 | 1 | 0 |
| HB0 | Packet type = 0x84 | | | | | | | |
| HB1 | Version Number = 0x01 | | | | | | | |
| HB2 | 0 | 0 | 0 | Length = 10(0x0A) | | | | |

TABLE 41-2

| Modified Audio InfoFrame Packet Contents | | | | | | | | | |
|---|---|---|---|---|---|---|---|---|---|
| Packet Byte # | CEA-861-D Byte # | 7 | 6 | 5 | 4 | 3 | 2 | 1 | 0 |
| PB0 | n. a | Checksum | | | | | | | |
| PB1 | Data Byte 1 | CT3 | CT2 | CT1 | CT0 | 3D_CH_present = 1 | CC2 | CC1 | CC0 |
| PB2 | Data Byte 2 | Reserved (0) | | | SF2 | SF1 | SF0 | SS1 | SS0 |
| PB3 | Data Byte 3 | Format depends on coding type (i.e. CT0 . . . CT3) | | | | | | | |
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEP BL1 | LFEP BL0 |
| PB6 | Data Byte 6 | Reserved (0) | | | 3D_CC4 | 3D_CC3 | 3D_CC2 | 3D_CC1 | 3D_CC0 |
| PB7 | Data Byte 7 | Reserved(0) | | | | | | | |
| PB8 | Data Byte 8 | Reserved(0) | | | | | | | |
| PB9 | Data Byte 9 | Reserved(0) | | | | | | | |
| PB10 | Data Byte 10 | Reserved(0) | | | | | | | |
| PB11-PB27 | n. a | Reserved(0) | | | | | | | |

2-2. InfoFrame for Multi-Stream Audio

Regarding multi-stream audio, a new metadata packet may not be defined, and InfoFrame defined in HDMI 1.4b may be used. If a plurality of active audio streams are transmitted using a multi-stream audio sample packet, a correct audio InfoFrame can be transmitted at least once for two video fields. Audio InfoFrame may be used in describing audio features of every active audio stream.

If a new audio stream begins and if changes are included in an audio stream that can be implemented by a plurality of new audio streams or audio InfoFrames, altered and correct audio InfoFrames may be transmitted no later than one video field following the first affected non-silent audio sample. The transmission of the stream may be implemented right before transmitting the first affected audio sample. Regarding a one bit audio stream, an audio InfoFrame may be transmitted before the first affected sample.

Alteration of InfoFrame

In contrast to the above described exemplary embodiment, regarding the utilizing of a Stream_ID (e.g., the 4th and 6th exemplary embodiments of a 3D audio sample packet, and the 2nd, 3rd, 5th, and 6th exemplary embodiments of a multi-stream audio sample packet), the Stream_ID may be included in an audio InfoFrame, as shown, for example, in Table 42 below.

Referring to Table 42, the Stream_ID indicates a stream ID of a current audio InfoFrame, and Stream_Count indicates the number of total audio streams to be transmitted. According to the exemplary embodiment, instead of not using stream identifiers, a sample may be loaded and transmitted on four sub packets constituted of a multi-stream audio sample packet body, which does not alter an InfoFrame.

Table 42—Modified InfoFrame

TABLE 42-1

| Audio InfoFrame Packet Header | | | | | | | | |
|---|---|---|---|---|---|---|---|---|
| Byte/Bit # | 7 | 6 | 5 | 4 | 3 | 2 | 1 | 0 |
| HB0 | Packet type = 0x84 | | | | | | | |
| HB1 | Version Number = 0x01 | | | | | | | |
| HB2 | 0 | 0 | 0 | Length = 10(0x0A) | | | | |

TABLE 42-2

| Audio InfoFrame Packet contents | | | | | | | | | |
|---|---|---|---|---|---|---|---|---|---|
| Packet Byte # | CEA-861-D Byte # | 7 | 6 | 5 | 4 | 3 | 2 | 1 | 0 |
| PB0 | n. a | Checksum | | | | | | | |
| PB1 | Data Byte 1 | CT3 | CT2 | CT1 | CT0 | 3D_CH_present | CC2 | CC1 | CC0 |
| PB2 | Data Byte 2 | Reserved (0) | | | SF2 | SF1 | SF0 | SS1 | SS0 |
| PB3 | Data Byte 3 | Format depends on coding type (i.e. CT0 . . . CT3) | | | | | | | |

TABLE 42-2-continued

Audio InfoFrame Packet contents

| Packet Byte # | CEA-861-D Byte # | 7 | 6 | 5 | 4 | 3 | 2 | 1 | 0 |
|---|---|---|---|---|---|---|---|---|---|
| PB4 | Data Byte 4 | CA7 | CA6 | CA5 | CA4 | CA3 | CA2 | CA1 | CA0 |
| PB5 | Data Byte 5 | DM_INH | LSV3 | LSV2 | LSV1 | LSV0 | Rsvd(0) | LFEPBL1 | LFEPBL0 |
| PB6 | Data Byte 6 | Reserved (0) | | | 3D_CC4 | 3D_CC3 | 3D_CC2 | 3D_CC1 | 3D_CC0 |
| PB7 | Data Byte 7 | Reserved(0) | | | | Stream_count − 1 | | Stream_ID | |
| PB8 | Data Byte 8 | Reserved(0) | | | | | | | |
| PB9 | Data Byte 9 | Reserved(0) | | | | | | | |
| PB10 | Data Byte 10 | Reserved(0) | | | | | | | |
| PB11-PB27 | n. a | Reserved(0) | | | | | | | |

3-1. EDID for 3D Audio

Audio features of 3D audio and information of allocating speakers may be included in EDID by utilizing at least one of the operations of 1) altering conventional short audio descriptors and speaker allocation data blocks, 2) defining new data blocks in a reserved area for audio-related blocks on the extended tag codes, and 3) defining one new data block in a reserved area for an HDMI audio data block on the extended tag codes.

For instance, EDID data blocks described in CEA-861-F (D or E) may be utilized to indicate both sink audio features and speaker allocation support. Sink audio features and speaker allocation support are indicated by serial short audio descriptors positioned on a data block collection of a CEA extension. Such data include an audio encoding list supported by Sink and parameters related to encoding, such as channel numbers to support formats. Speaker allocation descriptors may be included on a data block collection, and requested by Sink which supports multi-channel (up to 8 channels) L-PCM for 2D audio or multi-channel (up to 8 channels) one bit audio.

First Exemplary Embodiment

If Sink supports transmitting multi-stream audio and/or 3D audio, an HDMI audio data block having an extended tag code 18 may be utilized in indicating 3D audio features, 3D speaker allocation information, and multi-stream audio features.

If Sink supports transmitting 3D audio, an HDMI audio data block includes at least one HDMI 3D audio descriptor (HDMI_3D_AD) having four bytes. Further, an HDMI audio data block may include one HDMI 3D speaker allocation descriptor (HDMI_3D_SAD) following a last HDMI 3D audio descriptor.

If Sink supports transmitting multi-stream audio while not supporting transmitting 3D audio, an HDMI audio data block may include at least one CEA short audio descriptor (CEA_SAD) following three bytes. CEA short audio descriptors are indicated in CEA-861-F (D or E).

If Sink supports transmitting multi-stream audio and 3D audio, an HDMI audio data block may include at least one CEA short audio descriptor following HDMI 3D speaker allocation descriptors. Table 43 provides additional details according to exemplary embodiments.

The above HDMI 3D audio descriptors indicate supporting audio encoding defined in CEA-861-F (D or E). HDMI apparatuses may support a 3D audio format according to TTA (10.2ch), SMPTE2036-2 (22.2ch) or IEC62574 (30.2ch). Tables 45 to 49 provide further explanations. The tables are classified by an audio format code shown in Table 24 of CEA-861-F (D or E) and Table 26.

As described above, HDMI 3D speaker allocation descriptors may be included in an HDMI audio data block and requested by Sink which supports 3D audio. The structure of HDMI 3D speaker allocation descriptors are shown in Table 50. Sink indicates audio capability by expressing speakers, e.g., a couple of speakers, and establishes corresponding flags. HDMI 3D speaker allocation descriptors may have four bits of ACAT fields, which indicate an audio channel allocation standard type. Tables 50 to 52 provide further details. Further, CEA short audio descriptors may be included in an HDMI audio data block and requested by Sink which supports transmitting multi-stream audio. The above descriptors describe audio features of each audio stream. A maximum channel count may be limited to 2 channels in each audio stream; however, exemplary embodiments are not limited thereto, and according to exemplary embodiments, the channel count may be more than 2 channels in each audio stream.

TABLE 43

HDMI Audio Data Block

| Byte/Bit # | 7 | 6 | 5 | 4 | 3 | 2 | 1 | 0 |
|---|---|---|---|---|---|---|---|---|
| 1 | | Tag cod = 7(Use Extended Tag) | | | L* = Length of following data block payload (in bytes) | | | |
| 2 | | | | Extended Tag Code = 18 (0x12) | | | | |
| 3 | NUM_HDML_3D_AD(=X) | | | NUM_CEA_SAD(=Y) | | | Max_Stream_coun | |
| (4)~(7) | (if NUM_HDMI_3D_AD>0) | | | | | | | |
| | HDMI_3D_AD_1 | | | | | | | |
| ... | ... | | | | | | | |
| (3 * X + 1)~(3 * X + 4) | (if NUM_HDMI_3D_AD>0) | | | | | | | |
| | HDMI_3D_AD_X | | | | | | | |
| (N**)~(n + 3) | (if NUM_HDMI_3D_AD>0) | | | | | | | |
| | HDMI_3D_SAD | | | | | | | |
| (N + 4)~(N + 6) | (if Max_Stream_Count−1>0 and NUM_CEA_SAD>0) | | | | | | | |
| | CEA_SAD_1 | | | | | | | |
| ... | ... | | | | | | | |
| (N + (3 * y + 1 ))~(N + (3 * Y+3)) | (if Max_Stream_Count−1>0 and NUM_CEA_SAD>0) CEA_SAD_Y | | | | | | | |

*The length of the following data block payload (in bytes), 2 + 4*X + 4 + 3*Y
**3 + 4*X + 1

Each field of HDMI audio data block illustrated in Table 43 is described as follows.

NUM_HDMI_3D_AD [3 bits] indicates the number of HDMI 3D audio descriptors.

NUM_CEA_SAD [3 bits] indicates the number of CEA short audio descriptors.

Max_Stream_Count-1[2 bits] indicates the number=the number of transport stream−1. Table 44 provides additional details.

HDMI_3D_AD indicates an HDMI 3D audio descriptor.

HDMI_3D_SAD indicates an HDMI 3D speaker allocation descriptor.

CEA_SAD CEA indicates a CEA short audio descriptor.

TABLE 44

Max_Stream_Count − 1 field

| Max_Stream_Count − 1 | Description |
|---|---|
| 00 | Do not support Multi-Stream Audio |
| 01 | 2 audio streams |
| 10 | 3 audio streams |
| 11 | 4 audio streams |

TABLE 45

HDMI 3D Audio Descriptor for Audio Format Code = 1 (LPCM)

| Byte/Bit# | 7 | 6 | 5 | 4 | 3 | 2 | 1 | 0 |
|---|---|---|---|---|---|---|---|---|
| 1 | 0 | 0 | 0 | 0 | Audio Format Code = 0001b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 khZ | 32 kHz |
| 4 | 0 | 0 | 0 | 0 | 0 | 24 bit | 20 bit | 16 bit |

TABLE 46

HDMI 3D Audio Descriptor for Audio Format Codes 2 to 8

| Byte/Bit# | 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | | | | Maximum bit rate divided by 8 kHz | | | | |

TABLE 47

HDMI 3D Audio Descriptor for Audio Format Codes 9 to 13

| Byte/Bit# | 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | | | | Audio Format Code dependent value | | | | |

TABLE 48

HDMI 3D Audio Descriptor for Audio Format Code 14 (WWA Pro)

| Byte/Bit# | 7 | 6 | 5 | 4 | 3 | 2 | 1 | 0 |
|---|---|---|---|---|---|---|---|---|
| 1 | 0 | 0 | 0 | 0 | Audio Format Code = 1110b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | Reserved (0) | | | | Profile | | | |

TABLE 49

HDMI 3D Audio Descriptor for Audio Format Code 15 (Extension)

| Byte/Bit# | 7 | 6 | 5 | 4 | 3 | 2 | 1 | 0 |
|---|---|---|---|---|---|---|---|---|
| 1 | 0 | 0 | 0 | 0 | Audio Format Code = 1111b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHZ | 32 kHz |
| 4 | Audio Format Code Extension | | | | 0 | 0 | 0 | 0 |

TABLE 50

HDMI 3D Speaker Allocation Descriptor for 10.2 channels (TTA Standard)

| Byte/Bit# | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSIL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | ACAT (=0X01) | | | | 0 | 0 | 0 | 0 |

Bold bits in the above table indicate speakers which have already been allocated in accordance with 10.2 channels.

TABLE 51

HDMI 3D Speaker Allocation Descriptor for 22.2 channels (SMPTE2036-2)

| Byte/Bit# | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSiL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | ACAT (=0X02) | | | | 0 | 0 | 0 | 0 |

Bold bits in the above table are speakers which have already been allocated in accordance with 22.2 channels.

TABLE 52

HDMI 3D Speaker Allocation Descriptor for 30.2 channels (IEC62574/Ed. 1)

| Byte/Bit # | 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSIL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | ACAT (=0X03) | | | | 0 | 0 | 0 | 0 |

Bold bits in the above table are speakers which have already been allocated in accordance with 30.2 channels.

Although the first exemplary embodiment describes speaker allocation of multi-channel 3D audio speakers with three bytes, this is merely exemplary only. 3D audio data having 30.2 channels or more may need more speaker allocation information than the information described above with respect to this exemplary embodiment. In this case, 3D speaker allocation descriptors may use more than four bytes to indicate speaker allocation.

TABLE 53

| Audio Channel Allocation Type (ACAT) Field | | | | |
|---|---|---|---|---|
| ACAT3 | ACAT2 | ACAT1 | ACAT0 | Description |
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |
| 0 | 0 | 1 | 1 | Refer to 30 2 channels (IEC62574/Ed 1) |
| 0 | 1 | 0 | 0 | Reserved |
| 1 | 1 | 1 | 1 | |

Reserved bits in ACAT fields may be allocated and utilized in various channel types, e.g., Dolby, USC or ITU-R format to be standardized, according to the needs of manufacturers.

Second Exemplary Embodiment

A second exemplary embodiment is different from the first exemplary embodiment in that the second exemplary embodiment alters an audio data block. Specifically, a reserved area of CEA short audio descriptors may be used to expand and indicate a maximum number of channels. For instance, referring to Table 54 below, a maximum number of channels may be expanded by utilizing Byte1 [7] and Byte2[7]. By this expansion, 3D audio can be indicated. CEA short audio descriptors may have a different field area according to an audio format.

Table 54—CEA Short Audio Descriptor

TABLE 54-1

| CEA Short Audio Descriptor for Audio Code = 1 (LPCM) | | | | | | | | |
|---|---|---|---|---|---|---|---|---|
| | Bits | | | | | | | |
| Byte# | 7 | 6 | 5 | 4 | 3 | 2 | 1 | 0 |
| 1 | F17 = 0 | Audio Format Code = 0001 | | | | Max Number of channels − 1 | | |
| 2 | F27 = 0 | 192 kHz | 176.4 kHz | 96 kHz | 88.2 kHz | 48 kHz | 44.1 kHz | 32 kHZ |
| 3 | F37 = 0 | F36 = 0 | F35 = 0 | F34 = 0 | F33 = 0 | 24 bit | 20 bit | 16 bit |

TABLE 54-2

| CEA Short Audio Descriptor for Audio Codes 2 to 8 | | | | | | | | |
|---|---|---|---|---|---|---|---|---|
| | Bits | | | | | | | |
| Byte# | 7 | 6 | 5 | 4 | 3 | 2 | 1 | 0 |
| 1 | F17 = 0 | Audio Format Code | | | | Max Number of channels − 1 | | |
| 2 | F27 = 0 | 192 kHz | 176.4 kHz | 96 kHz | 88.2 kHz | 48 kHz | 44.1 kHz | 32 kHZ |
| 3 | Maimum bit rate divided by 8 kHz | | | | | | | |

TABLE 54-3

| CEA Short Audio Descriptor for Audio Codes 9 to 15 | | | | | | | | |
|---|---|---|---|---|---|---|---|---|
| | bits | | | | | | | |
| Byte# | 7 | 6 | 5 | 4 | 3 | 2 | 1 | 0 |
| 1 | F17 = 0 | Audio Format Code | | | | Max Number of channels − 1 | | |
| 2 | F27 = 0 | 192 kHz | 176.4 kHz | 96 kHz | 88.2 kHz | 48 kHz | 44.1 kHz | 32 kHZ |
| 3 | [Default = 0, unless Defined by Audio Codex Vendor] | | | | | | | |

Independently of the above described second exemplary embodiment, ACAT may be established by altering a speaker allocation data block. ACAT may be recognized using Byte3[7:4] in a reserved area of a speaker allocation data block payload, and a speaker allocation data block in each type may be defined as a new table. Placement of ACAT fields may be defined differently within a range of Byte2[7:3]~Byte3[7:0].

Referring to Table 55 below, ACAT=0001 indicates 10.2 channels of a TTA standard and ACAT=0010 indicates 22.2 channels.

TABLE 55

Speaker Allocation Data Block Payload (Refer to CEA861-E)

| Byte# | bits 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | F27 = 0 | F26 = 0 | F25 = 0 | F24 = 0 | F23 = 0 | FCH | TC | FLH/FRH |
| 3 | F37 = 0 | F36 = 0 | F35 = 0 | F34 = 0 | F33 = 0 | F32 = 0 | F31 = 0 | F30 = 0 |

TABLE 55-1

ACAT Field

| ACAT | description |
|---|---|
| 0000 | Refer to CEA861-D(E, F) |
| 0001 | Refer to 10.2 channel (TTA Standard) |
| 0010 | Refer to 22.2 channel (SMPTE2036-2) |
| 0011~1111 | Reserved |
| 0011~1111 | Reserved |

TABLE 55-2

Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | LFE2 | SIL/SIR | FLC/FLR | BC | BL/BR | FC | LFE1 | FL/FR |
| 2 | BtFC | BtFL/BtFR | TpBC | TpSIL/TpSIR | TpBL/TpBR | TpC | TpFC | TpFL/TpFR |
| 3 | | | ACAT = 0010b | | 0 | 0 | 0 | 0 |

TABLE 55-3

Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | CH | LC/RC | LB/RB | LS/RS | LFE2 | LFE1 | C | L/R |
| 2 | 0 | 0 | 0 | 0 | 0 | 0 | 0 | 0 |
| 3 | | | ACAT = 0010b | | 0 | 0 | 0 | 0 |

Speaker allocation data blocks can be defined differently according to manufacturers. Manufacturers may consider enhancement of compatibility using common speaker allocation. Table 56 below presents an SMPTE2036-2 standard of 3D audio having 22.2 channels. Bold bits refer to common speaker allocations of several manufacturers.

TABLE 56

Speaker Allocation Data Block Payload 2 (Refer to CEA861-E)

| Byte# | Bits 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | F27 = 0 | F26 = 0 | F25 = 0 | F24 = 0 | F23 = 0 | FCH | TC | FLH/FRH |
| 3 | F37 = 0 | F36 = 0 | F35 = 0 | F34 = 0 | F33 = 0 | F32 = 0 | F31 = 0 | F30 = 0 |

TABLE 56-1

ACAT Field

| ACAT | Description |
|---|---|
| 0000 | Refer to CEA861-D(E, F) |
| 0001 | Refer to 10.2 channel (TTA Standard) |
| 0010 | Refer to 22.2 channel (SMPTE2036-2) |
| 0011~1111 | Reserved |

TABLE 56-2

Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | | ACAT = 0010b | | | 0 | 0 | BtFC | BtFL/BtFR |

TABLE 56-3

Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | FLW/FRW | RLC/RRC (LB/RB) | FLC/FRC | RC | RL/RR (LS/RS) | FC | LFE | FL/FR |
| 2 | TpBC | TpSIL/TpSIR | TpBL/TpBR | LFE2 | SIL/SIR | FCH | TC | FLH/FRH |
| 3 | | ACAT = 0010b | | | 0 | 0 | BtFC | BtFL/BtFR |

In the above described exemplary embodiment of a speaker allocation data block payload, classification of each type, e.g., 10.2 channels (TTA), 22.2 channels (SMPTE2036-2), and 13.1 channels (Dolby), may be determined by referring to a position and sort of bits set in a speaker allocation data payload in sources without defining ACAT fields separately. The operation of determining a classification of a type can be performed because the number of channels may be found with an altered audio data block.

Third Exemplary Embodiment

A third exemplary embodiment does not define an HDMI audio data block and newly defines an extended speaker allocation data block type of an extended tag code in EDID. The size of a new data block can be 32 bytes at maximum. Table 57 illustrates an example of four bytes. The size of ACAT may be altered and defined according to needs of a user or manufacturer.

ACAT is implemented by utilizing a reserved area (Byte3 [7:4]), and a speaker allocation data block in each type may be defined. Payload may be formed in the same fashion as the above described exemplary embodiment. Further, ACAT fields may be placed in different areas other than the above reserved area.

Reserved bits of ACAT fields may be allocated and utilized in various channel types, e.g., Dolby, USC, or ITU-R formats to be standardized, according to manufacturers.

TABLE 57

Modified Speaker Allocation Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |

TABLE 57-continued

Modified Speaker Allocation Data Block

| Extended Tag Codes | Type of Data Block |
|---|---|
| 5 | Colonmetry Data Block |
| 6 ... 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Speaker Allocation Data Block |
| 20 ... 31 | Reserved for audio-related blocks |
| 32 ... 255 | Reserved for general |

TABLE 57-1

ACAT Description

| ACAT | description |
|---|---|
| 0000 | CEA861-D(E, F) |
| 0001 | 10.2 channel (TTA Standard) |
| 0010 | 22.2 channel (SMPTE2036-2) |
| 0011~1111 | Reserved |

TABLE 57-2

Extended Speaker Allocation Data Block Payload (for 10.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | ACAT = 0001b | | | 0 | 0 | 0 | 0 |

TABLE 57-3

Extended Speaker Allocation Data Block Payload (for 22.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | ACAT = 0010b | | | 0 | 0 | 0 | 0 |

TABLE 57-4

Extended Speaker Allocation Data Block Payload (for 30.2 channel)

| Byte#/bit | 7 | 6 | 5 | 4 | 3 | 2 | 1 | 0 |
|---|---|---|---|---|---|---|---|---|
| 1 | FLW/FRW | RLC/RRC | FLC/FRC | RC | RL/RR | FC | LFE | FL/FR |
| 2 | TpBC | TpSIL/TpSIR | TpBL/TpBR | LFE2 | SIL/SIR | FCH | TC | FLH/FRH |
| 3 | 0 | 0 | 0 | LSd/RSd | LS/RS | TpLS/TpRS | BtFC | BtFL/BtFR |
| 4 | | ACAT = 0011b | | | 0 | 0 | 0 | 0 |

Fourth Exemplary Embodiment

A fourth exemplary embodiment is similar to the third exemplary embodiment, however, has a difference in that, according to the fourth exemplary embodiment, a data block in each speaker allocation standard type, e.g., 10.2 channels (TTA), 22.2 channels (NHK), 13.1 channels (Dolby), is defined, and a data block in each type is added to an extended tag code.

For instance, data block tag code 19 indicates a speaker allocation data block for TTA 10.2 channels, data block tag code 20 indicates a speaker allocation data block for NHK 22.2 channels, and data block tag code 21 indicates a speaker allocation data block for Dolby 13.1 channels.

TABLE 58

Modified Speaker Allocation Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = released blocks |
| 16 | CEA Mrscellaneous Audio Fields |
| 17 | Vendor-Specific Audio Data Block |
| 18 | Reserved for HDMI Audio Data Block |
| 19 | HDMI Speaker Allocation Data Block for 10.2 ch(TTA) |
| 20 | HDMI Speaker Allocation Data Block for 22.2 ch(NHK) |

TABLE 58-continued

Modified Speaker Allocation Data Block

| Extended Tag Codes | Type of Data Block |
|---|---|
| 21 | HDMI Speaker Allocation Data Block for 13.1 ch(Dolby) |
| 22 . . . 31 | Reserved for audio-related blocks |
| 32 . . . 255 | Reserved for general |

TABLE 58-1

Speaker Allocation Data Block payload (for multi-channel)

| Byte#/bit | 7 | 6 | 5 | 4 | 3 | 2 | 1 | 0 |
|---|---|---|---|---|---|---|---|---|
| 1 | Pos. 7 | — | — | — | — | — | — | Pos. 0 |
| 2 | Pos. 15 | — | — | — | — | — | — | Pos. 8 |
| 3 | Pos. 23 | — | — | — | — | — | — | Pos. 16 |
| 4 | Pos. 31 | — | — | — | — | — | — | Pos. 24 |

Fifth Exemplary Embodiment

A fifth exemplary embodiment defines an extended audio data block. An extended audio data block corresponds to extended tag codes. Further, an extended audio data block includes at least one extension CEA short audio descriptor. Each extension CEA short audio descriptor includes information regarding the number of channels. A size and format of each field may be the same as those of short audio descriptors in audio data blocks, however, the size and formats may also be defined differently.

TABLE 59

Extended Audio Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22 . . . 31 | Reserved for audio-related blocks |
| 32 . . . 255 | Reserved for general |

TABLE 59-1

Extended Audio Data Block

| Byte#/bit | 7 | 6 | 5 | 4 | 3 | 2 | 1 | 0 |
|---|---|---|---|---|---|---|---|---|
| PB1 | Tag Code = 7 (USE Extended Tag) Length = total number of extension audio bytes following chis byte ||||||||
| PB2 | Extended data Block Tag Code = 13h ||||||||
| PB3 | Extended CEA Short Audio Descriptor 1 (Refer to table 8*25) ||||||||
| PB4 | ||||||||
| PB5 | ||||||||
| . . . | ||||||||
| PB N-2 | **Extended CEA Short Audio Descriptor X (Refer to table 8*25)** ||||||||
| PB N-1 | ||||||||
| PB N | ||||||||

TABLE 59-2

Extended CEA Short Audio Descriptor

| Byte#/bit | 7 | 6 | 5 | 4 | 3 | 2 | 1 | 0 |
|---|---|---|---|---|---|---|---|---|
| PB1 | 0 | Uncompressed Audiio Format Code = 00 or 01 | | Max number of channels − 1 ||||  |
| PB2 | 0 | 192 kHz | 176.4 kHz | 96 kHz | 88.2 kHz | 48 kHz | 44.1 kHz | 32 kHz |
| PB3 | 0 | 0 | 0 | 0 | 0 | 24 bit | 20 bit | 16 bit |

As described in the above table, extension CEA short audio descriptors may include uncompressed audio format code. Uncompressed audio format codes may be defined as follows.

TABLE 60

Uncompressed Audio Format Code

| Uncompressed Audio Format Code | Description |
|---|---|
| 00 | FCM |
| 01 | One Bit Audio |
| 10 | Reserved |
| 11 | |

An extended speaker allocation data block may be defined to include values of extended tag codes. An extended speaker allocation data block may include an ACAT field as described in the table below. A reserved area may be used for expansion. Further, reserved bits may be allocated and utilized in various channel types, e.g., Dolby, USC, or ITU-R formats to be standardized, according to manufacturers.

TABLE 61

Extended Speaker Allocation Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |

TABLE 61-continued

Extended Speaker Allocation Data Block

| Extended Tag Codes | Type of Data Block |
|---|---|
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22 . . . 31 | Reserved for audio-related blocks |
| 32 . . . 255 | Reserved for general |

TABLE 61-1

| Extended Speaker Allocation Data Block | | | | | | | | |
|---|---|---|---|---|---|---|---|---|
| Byte#/bit | 7 | 6 | 5 | 4 | 3 | 2 | 1 | 0 |
| PB1 | Tag Code = 7 (USE Extended Tag) | | | Length = total number of extension audio bytes following chis byte (=5 byte) | | | | |
| PB2 | Extended data Block Tag Code = 13h | | | | | | | |
| PB3 | FLw/FRw | RLC/RRC | FLC/FRC | RC | RL/RR | FC | LFE1 | FL/FR |
| PB4 | TpBC | TpSIL/TpSIR | TpBL/TpBR | LFE2 | SiL/SiR | FCM | TC | FLH/FRH |
| PB5 | 0 | 0 | 0 | LSd/LRd | LS/RS | TpLS/TpRS | BtFC | BtFL/BtFR |
| PB6 | ACAT(Audio Channel Allocation Type) | | | 0 | 0 | 0 | 0 | 0 |

TABLE 61-2

| ACAT Description | | | | |
|---|---|---|---|---|
| ACAT3 | ACAT2 | ACAT1 | ACAT0 | Description |
| 0 | 0 | 0 | 0 | Refer to CEA861-D(or E, F) |
| 0 | 0 | 0 | 1 | Refer to 10.2 channels (TTA Standard) |
| 0 | 0 | 1 | 0 | Refer to 22.2 channels (SMRTE 2036-2) |
| 0 | 0 | 1 | 1 | Refer to 30.2 channels (IEC62574Ed 1) |
| 0 | 1 | 0 | 0 | Reserved |
| 1 | 1 | 1 | 1 | |

In this exemplary embodiment, payloads of extended speaker allocation data blocks are illustrated in the table below. Shade areas are used to allocate speakers for each channel allocation type.

TABLE 62

| Channel Allocation Compatibility | | | | | | | | |
|---|---|---|---|---|---|---|---|---|
| Byte#/bit | 7 | 6 | 5 | 4 | 3 | 2 | 1 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | 0 | 0 | 0 | 0 | 0 |
| Byte#/bit | 7 | 6 | 5 | 4 | 3 | 2 | 1 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | 0 | 0 | 0 | 0 | 0 |
| Byte#/bit | 7 | 6 | 5 | 4 | 3 | 2 | 1 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | 0 | 0 | 0 | 0 | 0 |
| Byte#/bit | 7 | 6 | 5 | 4 | 3 | 2 | 1 | 0 |
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpRS | BtFC | BtFL/BtFR |
| PB4 | ACAT(Audio channel Allocation Type) | | | 0 | 0 | 0 | 0 | 0 |

EDID/CEC for New Speaker Position

A speaker position data block to carry new speaker position information to sources may be defined. A data block includes coordinate values (x, y, z) of every speaker position and position angle values. Sources may be utilized in various processing operations, such as down-mixing or object audio coding, with the above information. Because values of extended tag codes in the table below are allocated according to one of the exemplary embodiments, speaker position data blocks can be defined with data blocks as defined above and utilized.

TABLE 63

| Speaker Position Data Block | |
|---|---|
| Extended Tag Codes | Type of Data Block |
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 ... 15 | Reserved for video = relaesed blocks |

TABLE 63-continued

| Speaker Position Data Block | |
|---|---|
| Extended Tag Codes | Type of Data Block |
| 16 | CEA Mrscellaneous Audio Fields |
| 17 | Vendor-Specific Audio Data Block |

TABLE 63-continued

Speaker Position Data Block

| Extended Tag Codes | Type of Data Block |
|---|---|
| 18 | Reserved for HDMI Audio Data Block |
| 19 | Reserved for audio-related blocks |
| 20 | Speaker Position Data Block 1 |
| 21 | Speaker Position Data Block 2 |
| 22 | Speaker Position Data Block 3 |
| 23 | Speaker Position Data Block 4 |
| . . . | . . . |
| 31 | Reserved for audio-related blocks |
| 32 . . . 255 | Reserved for general |

Speaker position data blocks can be defined as set forth in the table below. Byte [1] to Byte [5] store position information of one speaker. According to the same exemplary embodiment, Byte [6] to Byte [30] store speaker position information of other speakers. Byte 31 and Byte 32 are defined as reserved areas.

If the above exemplary embodiment is used, one data block can carry position information of six speakers at a maximum. Thus, to respond to N channels, a total of (N/6) speaker position data blocks may be needed.

TABLE 64

Speaker Position Data Block

| | 7 | 6 | 5 | 4 | 3 | 2 | 1 | 0 |
|---|---|---|---|---|---|---|---|---|
| 1 | | height | | Speaker_id | | | | Ang. 8 |
| 2 | Ang. 7 | Ang. 6 | Ang. 5 | Ang. 4 | Ang. 3 | Ang. 2 | Ang. 1 | Ang. 0 |
| 3 | | | | Offset_x | | | | |
| 4 | | | | Offset_y | | | | |
| 5 | | | | Offset_z | | | | |
| 6~10 | | | | $2^{nd}$ speaker position data | | | | |
| 11~15 | | | | 3th speaker position data | | | | |
| 16~20 | | | | $4^{th}$ speaker position data | | | | |
| 21~25 | | | | $5^{th}$ speaker position data | | | | |
| 26~30 | | | | $6^{th}$ speaker position data | | | | |
| 31~32 | | | | reserved | | | | |

TABLE 64-1

Speaker_id field

| Speaker_id | Description |
|---|---|
| 00000 | FL |
| 00001 | FR |
| 00010~11111 | . . . |

Transmitting Speaker Position Information Using CEC

FIG. 12 illustrates an operation of transmitting speaker position information using CEC according to an exemplary embodiment.

Referring to FIG. 12, if sources transmit a request for speaker positions to Sink, Sink responds with speaker position information.

3-1. EDID for 3D Audio

A multi-stream audio data block may be newly defined in extended tag codes. A multi-stream audio data block includes a Max_stream_count-1 field and a CEA short audio descriptor area. Max_stream_count-1 indicates the number of transmitting streams. CEA short audio descriptors are more than 1, and may be defined by CEA861-D.

TABLE 65

Multi Stream Audio Data Block

| Byte#/bit | 7 | 6 | 5 | 4 | 3 | 2 | 1 | 0 |
|---|---|---|---|---|---|---|---|---|
| 1 | | Reserved | | | | Max_stream_count − 1 | | |
| 2 | | | | CEA Short Audio Descriptor 1 | | | | |
| 3 | | | | | | | | |
| 4 | | | | | | | | |
| . . . | | | | . . . | | | | |
| N | | | | CEA Short Audio Descriptor X | | | | |

TABLE 65-1

CEA Data Block Tag Codes

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |

TABLE 65-1-continued

CEA Data Block Tag Codes

| Extended Tag Codes | Type of Data Block |
|---|---|
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 . . . | Reserved for audio-related blocks |
| XX | Multiple Audio Stream Data Block |
| . . . 31 | Reserved for audio-related blocks |
| 32 . . . 255 | Reserved for general |

According to exemplary embodiments, whether or not multi-stream video/audio is provided may be indicated in a vendor-specific data block. A multistream_indicator field is used. If Sink supports multi-stream, multistream_indicator=1. Also, a multistream_indicator field may be defined in another area of a data block as well as HDMI VSDB.

TABLE 66

| Vendor-specific Data Block | | | | | | | | |
|---|---|---|---|---|---|---|---|---|
| Byte# | 7 | 6 | 5 | 4 | 3 | 2 | 1 | 0 |
| 0 | Vendor-specific tag code(=3) | | | | Length(=N) | | | |
| 1 | 24-bit IEEE Registration (0x000c03) | | | | | | | |
| 2 | | | | | | | | |
| 3 | | | | | | | | |
| 4 | A | | | | B | | | |
| 5 | C | | | | D | | | |
| 6 | Suppors_AI | DC_40bit | DC_30bit | DC_30bit | DC_Y444 | Rsvd(0) | RSCD(0) | DVI_Dual |
| 7 | Max_TMDS_Clock | | | | | | | |
| 8 | Latency_Fields Present | I_Latency_Fields_Present | HDMI_Video_Presen | Rsvd(0) | CNC3 | CNC2 | CNC1 | CNC0 |
| (9) | Video_Latency | | | | | | | |
| (10) | Audio_Latency | | | | | | | |
| (11) | Interacted_Video_Latency | | | | | | | |
| (12) | Interacted_Audio_Latency | | | | | | | |
| (13) | 3D_present | 3D_Multi_Present | | Image_size | | Rsvd(0) | Rsvd(0) | Multistream_indicator |
| (14) | HDMI_VIC_LEN | | | | HDMI_3D_LEN | | | |
| (15) | (if HDMI_VIC_LEN>0) | | | | | | | |
| | | | | HDMI_VIC_1 | | | | |
| ... | | | | ... | | | | |
| | | | | HDMI_VIC_M | | | | |
| | (if 3D_Multi_present 01 or 10) | | | | | | | |
| | | | | 3D_Structure_ALL_15 . . . 8 | | | | |
| | | | | 3D_Structure_ALL_7 . . . 0 | | | | |
| | (if 3D_Multi_present 10) | | | | | | | |
| | | | | 3D_MASK_7 . . . 0 | | | | |
| | | | | 3D_MASK_7 . . . 0 | | | | |
| | 3D_VIC_1 | | | | 3D_Structure_1 | | | |

If multistream_indicator is defined using more than 2 bits, various multi-streams can be recognized.

TABLE 67

| Vendor-specific Data Block | | | | | | | | |
|---|---|---|---|---|---|---|---|---|
| Byte# | 7 | 6 | 5 | 4 | 3 | 2 | 1 | 0 |
| 0 | Vendor-specific tag code(=3) | | | | Length(=N) | | | |
| 1 | 24-bit IEEE Registration (0x000c03) | | | | | | | |
| 2 | | | | | | | | |
| 3 | | | | | | | | |
| 4 | A | | | | B | | | |
| 5 | C | | | | D | | | |
| 6 | Suppors_AI | DC_40bit | DC_30bit | DC_30bit | DC_Y444 | Rsvd(0) | RSCD(0) | DVI_Dual |
| 7 | Max_TMDS_Clock | | | | | | | |
| 8 | Latency_Fields Present | I_Latency_Fields_Present | HDMI_Video_Presen | Rsvd(0) | CNC3 | CNC2 | CNC1 | CNC0 |
| (9) | Video_Latency | | | | | | | |
| (10) | Audio_Latency | | | | | | | |
| (11) | Interacted_Video_Latency | | | | | | | |
| (12) | Interacted_Audio_Latency | | | | | | | |
| (13) | 3D_present | 3D_Multi_Present | | Image_size | | Multistream mode | | |
| (14) | HDMI_VIC_LEN | | | | HDMI_3D_LEN | | | |
| (15) | (if HDMI_VIC_LEN>0) | | | | | | | |
| | | | | HDMI_VIC_1 | | | | |
| ... | | | | ... | | | | |
| | | | | HDMI_VIC_M | | | | |
| | (if 3D_Multi_present 01 or 10) | | | | | | | |
| | | | | 3D_Structure_ALL_15 . . . 8 | | | | |
| | | | | 3D_Structure_ALL_7 . . . 0 | | | | |
| | (if 3D_Multi_present 10) | | | | | | | |
| | | | | 3D_MASK_7 . . . 0 | | | | |
| | | | | 3D_MASK_7 . . . 0 | | | | |
| | 3D_VIC_1 | | | | 3D_Structure_1 | | | |

Second Exemplary Embodiment

A second exemplary embodiment newly defines a multi audio stream data block using extended tag codes. A newly defined multi audio stream data block includes a CEA short audio descriptor area, lengths of audio stream, Max_stream_count field, and/or other information. Each field may be the same as those described in the above exemplary embodiments, and will not be further explained.

TABLE 68

Multi Audio Stream Data Block

| Extended Tag Codes | Type of Data Block |
|---|---|
| 0 | Vieo Capability Data Block |
| 1 | Vendor-Specific Video Data Block |
| 2 | Reserved for VESA Video Display Device Information Data Block |
| 3 | Reserved for VESA Video Data Block |
| 4 | Reserved for HDMI Video Data Block |
| 5 | Colonmetry Data Block |
| 6 . . . 15 | Reserved for video = relaesed blocks |
| 16 | CEA Mrscellaneous Audio Fields |
| 17 | Vendor-Specific Audio Data Block |
| 18 | Reserved for HDMI Audio Data Block |
| 19 | Extended Audio Data Block (includes one or more Extended Short Audio Descriptors) |
| 20 | Extended Speaker Allocation Data Block |
| 21 | Multiple Audio Stream Data Block |
| 22 . . . 31 | Reserved for audio-related blocks |
| 32 . . . 255 | Reserved for general |

TABLE 68-1

Multiple Audio Stream Data Block

| Byte# | bit 7 | 6 | 5 | 4 | 3 | 2 | 1 | 0 |
|---|---|---|---|---|---|---|---|---|
| PB1 | Tag Code = 7 (USE Extended Tag) | | | Length = total number of extension audio bytes following this byte | | | | |
| PB2 | Extended data Block Tag Code = 13h | | | | | | | |
| PB3 | 0 | 0 | 0 | 0 | 0 | 0 | Max_Stream_count − 1 | |
| PB4 | CEA Short Audio Descriptor 1 | | | | | | | |
| PB5 | | | | | | | | |
| PB6 | | | | | | | | |
| . . . | | | | | | | | |
| PB N − 2 | | | | | | | | |
| PB N − 1 | CEA Short Audio Descriptor 1 X | | | | | | | |
| PB N | | | | | | | | |

Third Exemplary Embodiment

Meanwhile, similar to the first exemplary embodiment, another method of utilizing an HDMI audio data block may be considered.

Extended tag codes are newly defined. Similar to the first exemplary embodiment, tag code 18 may be used to add an extended HDMI audio data block.

The table below presents a structure of an extended HDMI audio data block. The extended HDMI audio data block according to a third exemplary embodiment includes an Extended CEA Short Audio Descriptor (ECSAD), Extended Speaker Allocation Descriptor (ESAD), and Multiple Audio Stream Descriptor (MASD).

If a Sink apparatus supports a 3D audio function, ECSAD includes the same number of descriptors as the number of values of Num_ECSAD fields. If a Sink apparatus supports a 3D-audio-channel function and if the value of a Num_ECSAD field is more than 0, ESAD includes one descriptor. If a Sink apparatus supports a multi-stream audio function, MASD includes the same number of descriptors as the number of values of Num_MASD fields.

Max_stream_count-1 field is defined as the maximum number of streams that a Sink apparatus can receive −1. Since multi-stream audio is transmitted with one audio sample packet, an audio stream in each view indicates the same audio features such as coding type and sampling frequency.

Num_MASD field defines the number of extended CEA short audio descriptors. Up to seven may be included. If the field is 0, it is indicated that a 3D audio function may not be supported.

Num_ECSAD field defines the number of multi stream audio descriptors included in the data block. Up to four may be included. If the field is 0, it is indicated that multi-stream audio may not be supported. If Max_stream_count-1 is not 0, at least one MASA should be defined. If ECSAD includes using a method defined with four bytes, six may be defined at maximum according to exemplary embodiments.

TABLE 69

Extended HDMI Audio Data Block

| Byte# | bit 7 | 6 | 5 | 4 | 3 | 2 | 1 | 0 |
|---|---|---|---|---|---|---|---|---|
| PB1 | Tag Code = 7 (USE Extended Tag) | | | Length = total number of extension audio bytes following this byte | | | | |
| PB2 | Extended data Block Tag Code = 13h | | | | | | | |
| PB3 | Max Stream Count − 1 | | | Num MASD | | | Num ECSAD | |
| PB4~PB6 | (if Num_ECSAD(X)>0) Extended CEA Short Descriptor 1 | | | | | | | |
| . . . | | | | | | | | |
| PB(N − 3)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count−1>0 and Num MASD(Y)>0) Multiple Audio Stream Descriptor 1 | | | | | | | |
| . . . | | | | | | | | |

TABLE 69-continued

Extended HDMI Audio Data Block

| Byte# | bit 7 | 6 | 5 | 4 | 3 | 2 | 1 | 0 |
|---|---|---|---|---|---|---|---|---|
| PB(L − 1)~PB(L + 1) | (if Max Stream_Count−1>0 and Num MASD(Y)>0) Multiple Audio Stream Descriptor Y | | | | | | | |

TABLE 69-1

Stream Count − 1 field

| MaxStream Count − 1 | Description |
|---|---|
| 00 | Do not support multiple audio stream |
| 01 | 2 audio streams |
| 10 | 3 audio streams |
| 11 | 4 audio streams |

The above third exemplary embodiment may include alternative suggestions as follows.

For instance, an extended HDMI audio data block may include only ECSAD, and other two ESAD and MASD may be defined using other extended tag codes.

Two descriptors defined with other extended tag codes may be defined as one separate data block or as different data blocks from each other. In a field that PB3 defines within the above table, Max_stream_count-1 is included in a data block in which a multi stream audio descriptor is defined.

In contrast to the above, an extended HDMI audio data block may include ECSAD and ESAD related with 3D audio and MASD may be defined using other extended tag codes.

An ECSAD structure is described by referring to the table below, in which the ECSAD structure corresponds to the bold letters.

Referring to the bottom left table, the descriptors may be selected from two coding types such as LPCM and DSD currently. Also, other uncompressed audio formats may be added using a reserved area of a UAFC field.

The number of channels may be allocated with five bits, and up to 32 channels can be selected.

Table 70—Extended CEA Short Audio Descriptor

TABLE 70-1

Extended HDMI Audio Data Block Structure

| Byte# | bit 7 | 6 | 5 | 4 | 3 | 2 | 1 | 0 |
|---|---|---|---|---|---|---|---|---|
| PB1 | Tag Code = 7 (USE Extended Tag) | | | Length = total number of extension audio bytes following this byte | | | | |
| PB2 | Extended data Block Tag Code = 13h | | | | | | | |
| PB3 | Max Stream Count − 1 | | Num MASD | | | Num ECSAD | | |
| PB4~PB6 | (if Num_ECSAD(X)>0) Extended CEA Short Descriptor 1 | | | | | | | |
| ... | | | | | | | | |
| PB(N − 3)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count−1>0 and Num MASD(Y)>0) Multiple Audio Stream Descriptor 1 | | | | | | | |
| ... | | | | | | | | |
| PB(L − 1)~PB(L + 1) | (if Max Stream_Count−1>0 and Num MASD(Y)>0) Multiple Audio Stream Descriptor Y | | | | | | | |

TABLE 70-2

Uncompressed Audio Format Code field

| UAFC (Uncompressed Audio Format Code) | Description |
|---|---|
| 00 | LPCM |
| 01 | DSD |
| 10 | Reserved |
| 11 | |

TABLE 70-3

Extended CEA Short Audio Descriptor

| Byte | Bit# 7 | 6 | 5 | 4 | 3 | 2 | 1 | 0 |
|---|---|---|---|---|---|---|---|---|
| PB1 | 0 | UAFC | | | Max Number of channels − 1 | | | |
| PB2 | 0 | 192 kHz | 176.4 kHz | 96 kHz | 88.2 kHz | 48 kHz | 44.1 kHz | 32 kHZ |
| PB3 | 0 | 0 | 0 | 0 | 0 | 24 bit | 20 bit | 16 bit |

Also, regarding the above method, additional features according to exemplary embodiments are as follows.

The following table extends a total amount of descriptors to four bytes. Further, an audio format code is referred to from the table defined in CEA861-E. Thus, both compressed and uncompressed coding types defined in CEA861-E can be assigned.

As a descriptor amount increases, the number of ECSAD that can be included in a data block is limited to 6 descriptors at a maximum. Also, the above exemplary embodiment may include 4 descriptors.

Syntaxes of PB3 and PB4 are defined as the same as Bytes 2 and 3 of Tables 45 to 49 in CEA861-E according to alterations in audio format code type.

Table 17—Extended CEA Short Audio Descriptor

TABLE 71-1

| | Extended HDMI Audio Data Block Structure | | | | | | | |
|---|---|---|---|---|---|---|---|---|
| | bit | | | | | | | |
| Byte# | 7 | 6 | 5 | 4 | 3 | 2 | 1 | 0 |
| PB1 | Tag Code = 7 (USE Extended Tag) | | | Length = total number of extension audio bytes following this byte | | | | |
| PB2 | Extended data Block Tag Code = 13h | | | | | | | |
| PB3 | Max Stream Count − 1 | | | Num MASD | | | Num ECSAD | |
| PB4~PB6 | (if Num_ECSAD(X)>0) Extended CEA Short Descriptor 1 | | | | | | | |
| ... | | | | | | | | |
| PB(N − 3)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count−1>0 and Num MASD(Y)>0) Multiple Audio Stream Descriptor 1 | | | | | | | |
| ... | | | | | | | | |
| PB(L − 1)~PB(L + 1) | (if Max Stream_Count−1>0 and Num MASD(Y)>0) Multiple Audio Stream Descriptor Y | | | | | | | |

TABLE 71-2

| | Extended CEA Short Audio Descriptor | | | | | | | |
|---|---|---|---|---|---|---|---|---|
| | Bit# | | | | | | | |
| Byte | 7 | 6 | 5 | 4 | 3 | 2 | 1 | 0 |
| PB1 | 0 | 0 | 0 | Max Number of channels − 1 | | | | |
| PB2 | 0 | 0 | 0 | Audio Format Code | | | | |
| PB3 | 0 | 192 kHz | 176.4 kHz | 96 kHz | 88.2 kHz | 48 kHz | 44.1 kHz | 32 kHZ |
| PB4 | 0 | 0 | 0 | 0 | 0 | 24 bit | 20 bit | 16 bit |

According to the third exemplary embodiment, the structure of ESAD is described.

Bold letters of the table below indicate the structure of ESAD.

Currently, ESAD may select speaker allocation information of up to 30.2 channels. However, using the reserved area of an ACAT field, another speaker placement format may be additionally included.

Table 72—Extended Speaker Allocation Descriptor

TABLE 72-1

| | Extended HDMI Audio Block Structure | | | | | | | |
|---|---|---|---|---|---|---|---|---|
| | bit | | | | | | | |
| Byte# | 7 | 6 | 5 | 4 | 3 | 2 | 1 | 0 |
| PB1 | Tag Code = 7 (USE Extended Tag) | | | Length = total number of extension audio bytes following this byte | | | | |
| PB2 | Extended data Block Tag Code = 13h | | | | | | | |
| PB3 | Max Stream Count − 1 | | | Num MASD | | | Num ECSAD | |
| PB4~PB6 | (if Num_ECSAD(X)>0) Extended CEA Short Descriptor 1 | | | | | | | |
| ... | | | | | | | | |
| PB(N − 3)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count−1>0 and Num MASD(Y)>0) Multiple Audio Stream Descriptor 1 | | | | | | | |
| ... | | | | | | | | |
| PB(L − 1)~PB(L + 1) | (if Max Stream_Count−1>0 and Num MASD(Y)>0) Multiple Audio Stream Descriptor Y | | | | | | | |

TABLE 72-2

| ACAT3 | ACAT2 | ACAT1 | ACAT0 | Description |
|---|---|---|---|---|
| | | | | Audio Channel Allocation Type filed |
| 0 | 0 | 0 | 0 | Refer to CEA861-D(or E, F) |
| 0 | 0 | 0 | 1 | Refer to 10.2 channels (TTA Standard) |
| 0 | 0 | 1 | 0 | Refer to 22.2 channels (SMPTE2036-2) |
| 0 | 0 | 1 | 1 | Refer to 30.2 channels (IEC62574/Ed 1) |
| 0 | 1 | 0 | 0 | Reserved |
| ... | | | | |
| 1 | 1 | 1 | 1 | |

TABLE 72-3

Extended Speaker Allocation Descriptor

| Byte# | bit 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

The table below indicates ESAD. Bold letters of each table are used to allocate a speaker of a corresponding channel allocation type.

TABLE 73

Extended Speaker Allocation Descriptors

| Byte#/bit | 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

| Byte#/bit | 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

| Byte#/bit | 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

| Byte#/bit | 7 | 6 | 5 | 4 | 3 | 2 | 1 | 0 |
|---|---|---|---|---|---|---|---|---|
| PB1 | FLW/FRW | RLC/RRC | FLC/FRC | RC | RL/RR | FC | LFE1 | FL/FR |
| PB2 | TpBC | TpSIL/TpSIR | TpBL/TpBR | LFE2 | SIL/SIR | FCH | TC | FLH/FRH |
| PB3 | 0 | 0 | 0 | LSd/LRd | LS/RS | TpLS/TpR | BtFC | BtFL/BtFR |
| PB4 | ACAT(Audio Channel Allocation Type) | | | | 0 | 0 | 0 | 0 |

The structure of ESAD according to the third exemplary embodiment is explained below. Bold letters of the table indicate the structure of ESAD.

A CEA short audio descriptor defined in CEA861-E is used as stated. Also, while including each field in CEA short audio descriptors, a new format partly changing/modifying the defined field placement or amount may be used. The descriptors may be only included when transmitting multi-stream audio. If used, at least one of the descriptors is included.

Table 74—Multiple Audio Stream Descriptor

TABLE 74-1

| | | | | | | | | |
|---|---|---|---|---|---|---|---|---|
| Extended HDMI Audio Data Block Structure | | | | | | | | |
| | bit | | | | | | | |
| Byte# | 7 | 6 | 5 | 4 | 3 | 2 | 1 | 0 |
| PB1 | Tag Code = 7 (USE Extended Tag) | | | Length = total number of extension audio bytes following this byte | | | | |
| PB2 | Extended data Block Tag Code = 13h | | | | | | | |
| PB3 | Max Stream Count − 1 | | | Num MASD | | | Num ECSAD | |
| PB4~PB7 | (if Num_ECSAD(X)>0) Extended CEA Short Descriptor 1 | | | | | | | |
| ... | | | | | | | | |
| PB(N − 4)~PB(N − 1) | (if Num_ECSAD(X)>0) Extended CEA Short Descriptor X | | | | | | | |
| PB(N)~PB(N + 3) | (if Num_ECSAD(X)>0) Extended Speaker Allocation Descriptor | | | | | | | |
| PB(N + 4)~PB(N + 6) | (if Max Stream_Count−1>0 and Num MASD(Y)>0) Multiple Audio Stream Descriptor 1 | | | | | | | |
| ... | | | | | | | | |
| PB(L − 1)~PB(L + 1) | (if Max Stream_Count−1>0 and Num MASD(Y)>0) Multiple Audio Stream Descriptor Y | | | | | | | |

TABLE 74-2

| | | | | | | | | |
|---|---|---|---|---|---|---|---|---|
| Multiple Audio Stream Descriptor | | | | | | | | |
| | bit | | | | | | | |
| Byte# | 7 | 6 | 5 | 4 | 3 | 2 | 1 | 0 |
| PB1 | CEA Short Audio Descriptor for each Audio Format Code | | | | | | | |
| PB2 | | | | | | | | |
| PB3 | | | | | | | | |

The table below newly defines the structure of a multi stream audio descriptor. Instead of using CEA short audio descriptors as stated, new descriptors may be utilized.

The number of channels in multi-stream audio is limited to 2. Thus, in these descriptors, an unnecessary channel count field is deleted and maximum number of stream-1 is defined as 2-bit. Max_stream_count-1 stated in PB3 of an Extended HDMI audio data block is defined as the maximum value of Max_stream_count-1 in each descriptor.

Each table below indicates descriptors in each audio format code.

Table 75—Multiple Audio Stream Descriptor

TABLE 75-1

| | | | | | | | | |
|---|---|---|---|---|---|---|---|---|
| Multiple Audio Stream Descriptor for Audio Format Code 1 (LPCM) | | | | | | | | |
| | Bit# | | | | | | | |
| Byte | 7 | 6 | 5 | 4 | 3 | 2 | 1 | 0 |
| PB1 | 0 | Audio Format Code = 0001 | | | | 0 | Max Stream_Count − 1 | |
| PB2 | 0 | 192 kHz | 176.4 kHz | 96 kHz | 88.2 kHz | 48 kHz | 44.1 kHz | 32 kHZ |
| PB3 | 0 | 0 | 0 | 0 | 0 | 24 bit | 20 bit | 16 bit |

TABLE 75-2

| | | | | | | | | |
|---|---|---|---|---|---|---|---|---|
| Multiple Audio Stream Descriptor for Audio Format Code 2 to 8 | | | | | | | | |
| | Bit# | | | | | | | |
| Byte | 7 | 6 | 5 | 4 | 3 | 2 | 1 | 0 |
| PB1 | 0 | Audio Format Code | | | | 0 | Max Stream_Count − 1 | |
| PB2 | 0 | 192 kHz | 176.4 kHz | 96 kHz | 88.2 kHz | 48 kHz | 44.1 kHz | 32 kHZ |
| PB3 | Maximum bit rate divided by 8 kHz | | | | | | | |

TABLE 75-3

| | | | | | | | | |
|---|---|---|---|---|---|---|---|---|
| Multiple Audio Stream Descriptor for Audio Format Code 9 to 13 | | | | | | | | |
| | Bit# | | | | | | | |
| Byte | 7 | 6 | 5 | 4 | 3 | 2 | 1 | 0 |
| PB1 | 0 | Audio Format Code | | | | 0 | Max Stream_Count − 1 | |
| PB2 | 0 | 192 kHz | 176.4 kHz | 96 kHz | 88.2 kHz | 48 kHz | 44.1 kHz | 32 kHZ |
| PB3 | Audio Format Code dependent value | | | | | | | |

TABLE 75-4

| | | | | | | | | |
|---|---|---|---|---|---|---|---|---|
| Multiple Audio Stream Descriptor for Audio Format Code 14 (WMA Pro) | | | | | | | | |
| | Bit# | | | | | | | |
| Byte | 7 | 6 | 5 | 4 | 3 | 2 | 1 | 0 |
| PB1 | 0 | Audio Format Code = 1110 | | | | 0 | Max Stream_Count − 1 | |
| PB2 | 0 | 192 kHz | 176.4 kHz | 96 kHz | 88.2 kHz | 48 kHz | 44.1 kHz | 32 kHZ |
| PB3 | Reserved | | | | | Profile | | |

TABLE 75-5

Multiple Audio Stream Descriptor for Audio Format Code 15 (extension)

| Byte | Bit# 7 | 6 | 5 | 4 | 3 | 2 | 1 | 0 |
|---|---|---|---|---|---|---|---|---|
| PB1 | 0 | Audio Format Code = 1111 | | | | 0 | Max Stream_Count − 1 | |
| PB2 | 0 | 192 kHz | 176.4 kHz | 96 kHz | 88.2 kHz | 48 kHz | 44.1 kHz | 32 kHZ |
| PB3 | Audio Format Code Extension | | | | | 24 bit | 20 bit | 16 bit |

4-1. Application Scenario for 3D Audio and Multi-Stream Audio

In the following description, application scenarios for 3D audio and multi-stream audio according to the first exemplary embodiment are provided. The following exemplary embodiments show the capability of a Sink apparatus to transmit HDMI 2.0 source, 3D audio, and multi-stream audio.

Scenario for 3D Audio

FIG. 13 illustrates that a 3D audio sample is transmitted from the blu-ray player (BDP) to the TV. This exemplary embodiment assumes the following.

A Source such as the BDP and Sink such as the TV are HDMI 2.0 compliant devices.

The Source transmits an L-PCM 48 kHz 22.2 channel audio stream to the Sink.

The Sink receives an L-PCM 48 kHz 22.2 channel audio sample, and transmits each audio stream to a corresponding speaker. According to exemplary embodiments, the transmitted video format is 1080 p/60 Hz.

The TV includes a CEA-861-F (D or E) compliant E-EDID data structure that can be accessed with the DDC. To support transmitting 3D audio, E-EDID includes an HDMI audio data block in addition to other necessary data blocks. The BDP receives an HDMI audio data block and recognizes 3D audio capability of the TV described in Table 76.

Byte 1, 2, 3 indicate an HDMI audio data block header. NUM_HDMI_3D_AD is established to be 1, which indicates transmitting 3D audio. NUM_CEA_SAD and Max_stream_count-1 are set to be 0 because the BDP does not handle multi-stream audio in this exemplary scenario.

Byte 4, 5, 6, 7 constitute HDMI 3D audio descriptors describing 3D audio features of the TV. Audio format codes, maximum channel number −1, sampling frequency and sample size are defined.

Byte 8, 9, 10, 11 constitute HDMI 3D allocation descriptors describing active speakers for 22.2 channels (SMPEG 2036-2).

The BDP receives EDID from the TV and transmits an audio InfoFrame and an audio metadata packet to the TV. In this case, an audio metadata packet is used instead of an audio InfoFrame, which transmits channel count and channel/speaker allocation information.

3D_CC and 3D_CA included in an audio metadata packet describes channel count and channel/speaker allocation information for a 22.2 channel audio stream, respectively. Table 77 below presents an example of audio InfoFrame payload to transmit 22.2 channel audio. Table 78 presents an audio metadata packet payload to transmit 22.2 channel audio.

TABLE 77

Example of the Audio InfoFrame Payload for 22.2 Channels

| Packet Byte# | 7 | 6 | 5 | 4 | 3 | 2 | 1 | 0 |
|---|---|---|---|---|---|---|---|---|
| PB0 | | | | Checksum | | | | |
| PB1 | CT3 (0) | CT2 (0) | CT1 (0) | CT0 (0) | Reserved (0) | CC2 (0) | CC1 (0) | CC0 (0) |
| PB2 | Reserved (0) | | | SF2 (0) | SF1 (0) | SF0 (0) | SS1 (0) | SS0 (0) |
| PB3 | Format depends on coding type (i.e CT0 . . . CT3) | | | | | | | |
| PB4 | CA7 (0) | CA6 (0) | CA5 (0) | CA4 (0) | CA3 (0) | CA2 (0) | CA1 (0) | CA0 (0) |
| PB5 | DM_INH | LSV3 | LSV2 | LSV1 | LSV0 | Rscd (0) | LFEP BL1 | LFEP BL0 |
| PB6 | | | | Reserved (0) | | | | |

TABLE 76

Example of the HDMI Audio Data Block for 22.2 Channels

| Byte/bit# | 7 | 6 | 5 | 4 | 3 | 2 | 1 | 0 |
|---|---|---|---|---|---|---|---|---|
| 1 | Tag Code = 7 (Use Extended Tag) | | | | L = 10(1010b) | | | |
| 2 | Extended Tag Code = 18(0x12) | | | | | | | |
| 3 | NUM_HDMI_3D_AD = 001b | | | NUM_CEA_SAD = 000b | | | Max_Stream_Count1 = oob | |
| 4 | 0 | 0 | 0 | 0 | Audio Format Code = 1 | | | |
| 5 | 0 | 0 | 0 | Max Number of channels − 1 = 23 (10111b) | | | | |
| 6 | 0 | 192 kHZ (0) | 176.4 kHz (0) | 96 kHz (1) | 88 2 kHz (1) | 48 kHz (1) | 44 1 kHz (1) | 32 kHz (1) |
| 7 | 0 | 0 | 0 | 0 | 0 | 24 bit | 20 bit | 16 bit |
| 8 | FLW/FRW (0) | BLC/BRC (0) | FLC/FRC (1) | BC (1) | BL/BR (1) | FC (1) | LFE1 (1) | FL/FR (1) |
| 9 | TpSIL/TpSIR (1) | SIL/SIR (1) | TpBC (1) | LFE2 (1) | LS/RS (0) | TpFC (1) | TpC (1) | TpFL/TpFR (1) |
| 10 | 0 | 0 | 0 | LSd/LRd (0) | TpLS/TpRS (0) | BtFL/BtFR (1) | BtFC (1) | TpBL/TpBR (1) |
| 11 | ACAT = 2(0010b) | | | | 0 | 0 | 0 | 0 |

TABLE 77-continued

Example of the Audio InfoFrame Payload for 22.2 Channels

| Packet Byte# | 7 | 6 | 5 | 4 | 3 | 2 | 1 | 0 |
|---|---|---|---|---|---|---|---|---|
| PB7 | | | | Reserved (0) | | | | |
| PB8 | | | | Reserved (0) | | | | |
| PB9 | | | | Reserved (0) | | | | |
| PB10 | | | | Reserved (0) | | | | |
| PB11-PB27 | | | | Reserved (0) | | | | |

TABLE 78

Audio Metadata Packet payload

| Byte/Bit# | 7 | 6 | 5 | 4 | 3 | 2 | 1 | 0 |
|---|---|---|---|---|---|---|---|---|
| PB0 | Rsvd (0) | Rsvd (0) | Rsvd (0) | 3D_CC4 (1) | 3D_CC3 (0) | 3D_CC2 (1) | 3D_CC1 (1) | 3D_CC0 (1) |
| PB1 | Rsvd (0) | Rsvd (0) | Rsvd (0) | Rsvd (0) | ACAT = 0x02 | | | |
| PB2 | 3D_CA7 (0) | 3D_CA6 (0) | 3D_CA5 (0) | 3D_CA4 (0) | 3D_CA3 (0) | 3D_CA2 (1) | 3D_CA1 (0) | 3D_CA0 (0) |
| PB2 ... PB27 | | | | Reserved (0) | | | | |

The BDP transmits 22.2 channel audio samples through 3D audio sample packets. Each 3D audio sample packet supports up to 8 audio channels, and thus, requires three consecutive 3D audio sample packets to transmit 22.2 channel audio samples. sample_start is used in assigning a first 3D audio sample packet. In this exemplary embodiment, three 3D audio sample packets may be defined as stated in Tables 79 to 81.

TABLE 79

Example of First 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (1) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3 (0) | Sample_flat sp2 (0) | Sample_flat sp1 (0) | Sample_flat sp0 (0) |
| SB0~SB2 | | | | Channel 1/Sample N | | | | |
| SB3~SB5 | | | | Channel 2/Sample N | | | | |
| SB6 | | PCUV of Ch 2 | | | | PCUV of Ch 1 | | |
| SB7~SB9 | | | | Channel 3/Sample N | | | | |
| SB10~SB12 | | | | Channel 4/Sample N | | | | |
| SB13 | | PCUV of Ch 4 | | | | PCUV of Ch 3 | | |
| SB14~SB16 | | | | Channel 5/Sample N | | | | |
| SB17~SB19 | | | | Channel 6/Sample N | | | | |
| SB20 | | PCUV of Ch 6 | | | | PCUV of Ch 5 | | |
| SB21~SB23 | | | | Channel 7/Sample N | | | | |
| SB24~SB26 | | | | Channel 8/Sample N | | | | |
| SB27 | | PCUV of Ch 8 | | | | PCUV of Ch 7 | | |

TABLE 80

Example of Second 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (0) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3 (0) | Sample_flat sp2 (0) | Sample_flat sp1 (0) | Sample_flat sp0 (0) |

TABLE 80-continued

Example of Second 3D Audio Sample Packet for 22.2 Channels

| Byte/bit# | 7 | 6 | 5 | 4 | 3 | 2 | 1 | 0 |
|---|---|---|---|---|---|---|---|---|
| SB0~SB2 | | | | | Channel 9/Sample N | | | |
| SB3~SB5 | | | | | Channel 10/Sample N | | | |
| SB6 | | PCUV of Ch 10 | | | | PCUV of Ch 9 | | |
| SB7~SB9 | | | | | Channel 11/Sample N | | | |
| SB10~SB12 | | | | | Channel 12/Sample N | | | |
| SB13 | | PCUV of Ch 12 | | | | PCUV of Ch 11 | | |
| SB14~SB16 | | | | | Channel 13/Sample N | | | |
| SB17~SB19 | | | | | Channel 14/Sample N | | | |
| SB20 | | PCUV of Ch 14 | | | | PCUV of Ch 13 | | |
| SB21~SB23 | | | | | Channel 15/Sample N | | | |
| SB24~SB26 | | | | | Channel 16/Sample N | | | |
| SB27 | | PCUV of Ch 16 | | | | PCUV of Ch 15 | | |

TABLE 81

Example of Third 3D Audio Sample Packet for 22.2 Channels

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | Sample_Start (0) | Sample_Present sp3 (1) | Sample_Present sp2 (1) | Sample_Present sp1 (1) | Sample_Present sp0 (1) |
| HB2 | B 3 | B 2 | B 1 | B 0 | Sample_flat sp3 (0) | Sample_flat sp2 (0) | Sample_flat sp1 (0) | Sample_flat sp0 (0) |
| SB0~SB2 | | | | | Channel 17/Sample N | | | |
| SB3~SB5 | | | | | Channel 18/Sample N | | | |
| SB6 | | PCUV of Ch 18 | | | | PCUV of Ch 17 | | |
| SB7~SB9 | | | | | Channel 19/Sample N | | | |
| SB10~SB12 | | | | | Channel 20/Sample N | | | |
| SB13 | | PCUV of Ch 20 | | | | PCUV of Ch 19 | | |
| SB14~SB16 | | | | | Channel 21/Sample N | | | |
| SB17~SB19 | | | | | Channel 22/Sample N | | | |
| SB20 | | PCUV of Ch 22 | | | | PCUV of Ch 21 | | |
| SB21~SB23 | | | | | Channel 23/Sample N | | | |
| SB24~SB26 | | | | | Channel 24/Sample N | | | |
| SB27 | | PCUV of Ch 24 | | | | PCUV of Ch 23 | | |

4-2. Example of Scenario for Multi-Stream Audio

Figure 14:
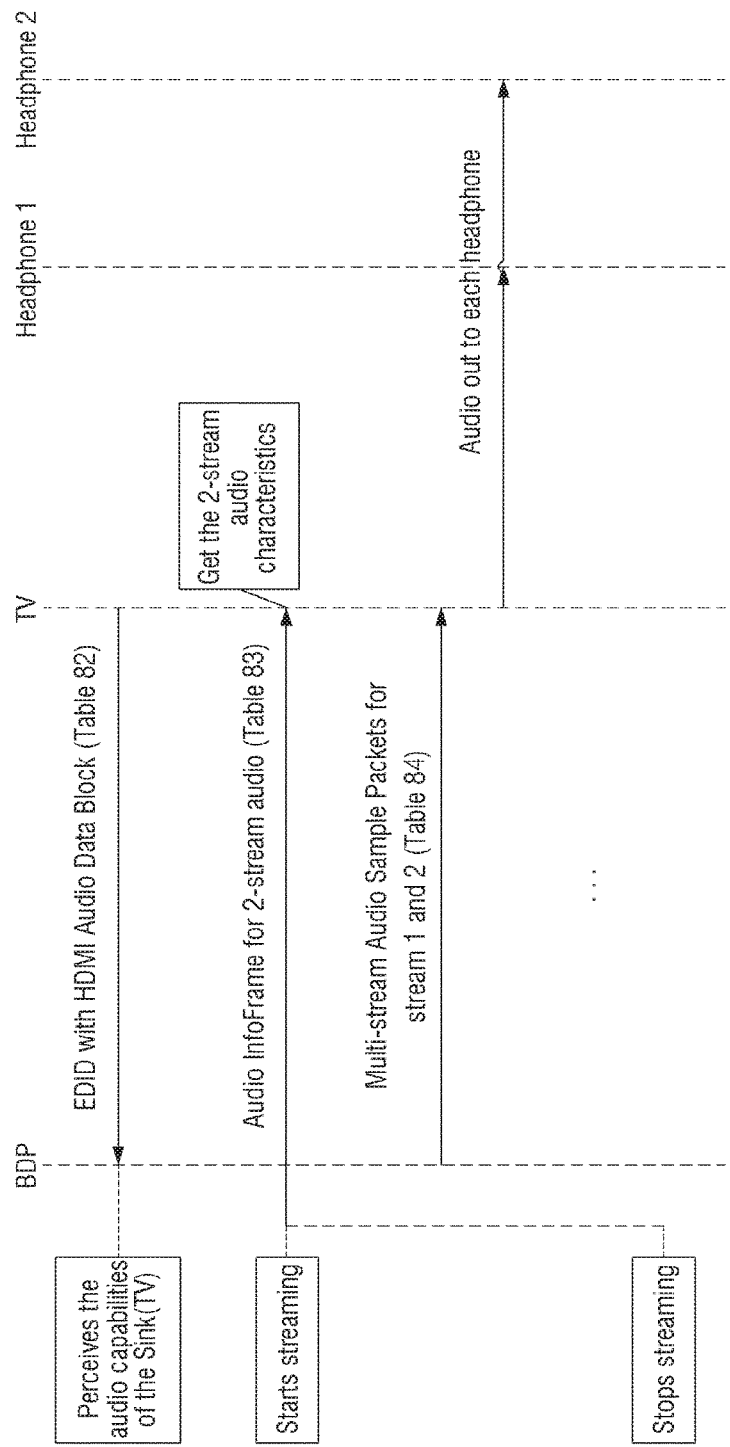
FIG. 14 illustrates operations of transmitting multi-stream audio from the BDP to the TV according to an exemplary embodiment.

FIG. 14 illustrates that multi-stream audio is transmitted from the BDP to the TV according to an exemplary embodiment. This exemplary embodiment assumes the following.

A Source such as the BDP and a Sink such as the TV are HDMI 2.0 compliant devices.

The Source/Sink enter into dual-view game mode.

The Source transmits two audio streams of each view.

The Sink may transmit two audio streams to two different headphones to each other.

The transmitted video format is HDMI 3D 1080 p/60 Hz.

The TV includes a CEA-861-F (D or E) compliant E-EDID data structure that can be accessed through DDC. To support multi-stream audio, E-EDID may have an HDMI audio data block in addition to other necessary blocks. The BDP receives an HDMI audio data block and recognizes a multi-stream audio capability of the TV as stated in Table 76.

TABLE 82

Example of HDMI Audio Data Block for Two Audio Streams

| Byte/bit# | 7 | 6 | 5 | 4 | 3 | 2 | 1 | 0 |
|---|---|---|---|---|---|---|---|---|
| 1 | Tag Code = 7 (Use Extended Tag) | | | | | L = 8(1010b) | | |
| 2 | Extended Tag Code = 18(0x12) | | | | | | | |
| 3 | NUM_HDMI_3D_AD = 000b | | | NUM_CEA_SAD = 010b | | | Max_Stream_Count 1 = 01b | |
| 4 | 0 | Audio Format Code = 0001b | | | | Max Number of channel 1 = 001b | | |
| 5 | 0 | 192 kHZ (1) | 176.4 kHz (1) | 96 kHz (1) | 88 2 kHz (1) | 48 kHz (1) | 44 1 kHz (1) | 32 kHz (1) |
| 6 | 0 | 0 | 0 | 0 | 0 | 24 bit | 20 bit | 16 bit |
| 7 | 0 | Audio Format Code = 0110b | | | | Max Number of channel 1 = 001b | | |
| 8 | 0 | 192 kHZ (1) | 176.4 kHz (1) | 96 kHz (1) | 88 2 kHz (1) | 48 kHz (1) | 44 1 kHz (1) | 32 kHz (1) |
| 9 | Maximum bit rate divided by 8 kHz | | | | | | | |

Byte 1, 2, 3 indicate HDMI audio data block headers. NUM_CEA_SAD is established to be 2 because the Sink supports two types of audio format codes for multi-stream audio. Max_stream_count-1 is established to be 1 because the Sink can handle two independent audio streams as described above. NUM_HDMI_3D_AD is established to be 0 because the BDP can handle transmitting 3D audio in this exemplary scenario.

Byte 4, 5, 6 constitute a first CEA short audio descriptor describing audio features. Regarding transmitting multi-stream audio, a maximum channel count is limited to be 2. Because of this, a maximum number of channels −1 is 1.

Byte 7, 8, 9 indicates a second CEA short audio descriptor describing audio features. As stated above, a maximum number of channels −1 is 1. The BDP may transmit an audio InfoFrame to the TV after receiving EDID from the TV. Contrary to a 3D audio transmitting scenario, CC and CA are used in transmitting a channel count and channel/speaker allocation information, respectively. An audio metadata packet may not be utilized in transmitting multi-stream audio. Table 83 shows an example of audio InfoFrame payload to transmit two audio streams.

TABLE 83

Example of Audio InfoFrame Payload for Two Audio Streams

| Packet Byte# | 7 | 6 | 5 | 4 | 3 | 2 | 1 | 0 |
|---|---|---|---|---|---|---|---|---|
| PB0 | | | | Checksum | | | | |
| PB1 | CT3 (0) | CT2 (0) | CT1 (0) | CT0 (0) | Reserved (0) | CC2 (0) | CC1 (0) | CC0 (0) |
| PB2 | Reserved (0) | | | SF2 (0) | SF1 (0) | SF0 (0) | SS1 (0) | SS0 (0) |
| PB3 | Format depends on coding type (i.e CT0 . . . CT3) | | | | | | | |
| PB4 | CA7 (0) | CA6 (0) | CA5 (0) | CA4 (0) | CA3 (0) | CA2 (0) | CA1 (0) | CA0 (0) |
| PB5 | DM_INH | LSV3 | LSV2 | LSV1 | LSV0 | Rscd (0) | LFEP BL1 | LFEP BL0 |
| PB6 | | | | Reserved (0) | | | | |
| PB7 | | | | Reserved (0) | | | | |
| PB8 | | | | Reserved (0) | | | | |
| PB9 | | | | Reserved (0) | | | | |
| PB10 | | | | Reserved (0) | | | | |
| PB11-PB27 | | | | Reserved (0) | | | | |

The BDP transmits multi-stream audio sample packets having stereo audio samples for two independent audio streams. Thus, a first sub packet has a stereo audio sample from the first audio stream, and a second sub packet has a stereo audio sample from the second audio stream. In the exemplary embodiment, a multi-stream audio sample packet may be defined as shown in Table 84.

TABLE 84

Example of Multi-stream Audio Sample Packet for Two Audio Streams

| Byte/bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | Stream present sp3 (0) | Stream present sp2 (0) | Stream present sp1 (1) | Stream present sp0 (1) |
| HB2 | B 3 | B 2 | B 1 | B 0 | Stream_flat sp3 (0) | Stream_flat sp2 (0) | Stream_flat sp1 (0) | Stream_flat sp0 (0) |
| SB0~SB2 | | | | Channel 1/Sample N (Stream 0) | | | | |
| SB3~SB5 | | | | Channel 2/Sample N (Stream 0) | | | | |
| SB6 | PCUV of Ch 2 (Stream 0) | | | | PCUV of Ch 1 (Stream 0) | | | |
| SB7~SB9 | | | | Channel 1/Sample N (Stream 1) | | | | |
| SB10~SB12 | | | | Channel 2/Sample N (Stream 1) | | | | |
| SB13 | PCUV of Ch 2 (Stream 1) | | | | PCUV of Ch 1 (Stream 1) | | | |
| SB14~SB16 SB17~SB19 SB20 | | | | Empty (0) | | | | |
| SB21~SB23 SB24~SB26 SB27 | | | | Empty (0) | | | | |

3D Audio Speaker Replacement and Channel Allocation

In the following description, speaker replacement and channel allocation for 3D audio channels are described.

Figure 15:
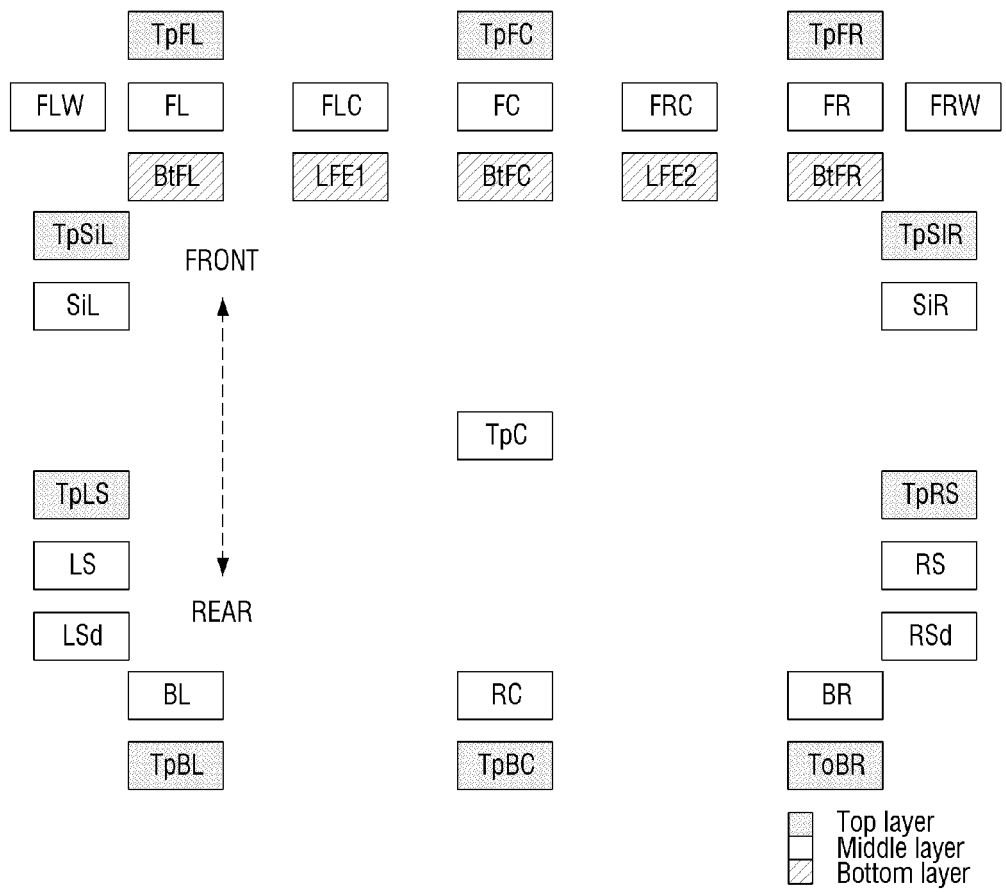
FIG. 15 illustrates a speaker setting for 3D audio channels according to an exemplary embodiment.

FIG. 15 illustrates speaker placement for 3D audio channels according to an exemplary embodiment.

According to an exemplary embodiment described in Table 85, in case of an IEC 30.2 channel standard type, FL indicates a front left speaker, FR indicates a front right speaker, LFF1 indicates a low frequency effect 1 speaker, FC indicates a front center speaker, BL indicates a back left speaker, BR indicates a back right speaker, FLW indicates a front left wide speaker, FRW indicates a front right wide speaker, TpFL indicates a top front left speaker, TpFR indicates a top front right speaker, BC indicates a back center speaker, LS indicates a left surround speaker, RS indicates a right surround speaker, LFE2 indicates a low frequency effect 2 speaker, FLC indicates a front left center speaker, FRC indicates a front right center speaker, TpFC indicates a top front center speaker, TpC indicates a top center speaker, SiL indicates a side left speaker, SiR indicates a side right speaker, TpBL indicates a top back left speaker, TpBR indicates a top back right speaker, TpSiL indicates a top side left speaker, TpSiR indicates a top side right speaker, BtFC indicates a bottom front center speaker, BtFL indicates a bottom front left speaker, BtFR indicates a bottom front right speaker, TpBC indicates a top back center speaker, TpLS indicates a top left surround speaker, TpRS indicates a top right surround speaker, LSd indicates a left surround direct speaker, and RSd indicates a right surround direct speaker.

However, according to a standard type, speaker names may be different from each other. For instance, a front center speaker is written as FC in the above IEC standard, however, the TTA standard writes the front center speaker as C. Various speaker names other than those described in the table below may be used. The following table and description of FIG. 15 describe one of the exemplary embodiments; speaker and channel allocation may be configured differently according to other exemplary embodiments.

Different from 2D audio data, 3D audio data supported with multi-channel has common features in having different speakers from each other in top, center, and bottom of 3D spaces respectively. FIG. 15 illustrates an exemplary embodiment of speaker placement in an area.

TABLE 85

Audio Channel Description & Abbreviation Comparison (CEA/TTA/SMPTE/IEC)

| | Abbreviation | | | |
|---|---|---|---|---|
| CEA_861 | TTA (10.2 ch) | SMPTE (22.2 ch) | IEC (30.2 ch) | Description |
| FL | L | FL | FL | Front left |
| FR | R | FR | FR | Front right |
| LFE | LFE1 | LFE1 | LFE1 | Low Frequency Effect 1 |
| FC | C | FC | FC | Front center |
| RL | LB | BL | BL | Back Left |
| RR | RB | BR | BR | Back Right |
| FLW | | | FLW | Front Left Wide |
| FRW | | | FRW | Front Right Wide |
| FLH | LH | TpFL | TpFL | Top Front Left |
| FRH | RH | TpFR | TpFR | Top Front right |
| RC | | BC | BC | Back Center |
| | LS | | LS | Left Surround |
| | RS | | RS | Right Surround |
| | LFE2 | LFE2 | LFE2 | Low Frequency Effect 2 |
| FLC | | FLC | FLC | Front Left center |
| FRC | | FRC | FRC | Front right Center |
| RLC | | | | Rear Left Center |
| RRC | | | | Rear Right Center |
| FCH | | TpFC | TpFC | Top Front Center |
| TC | | TpC | TpC | Top Center |
| | | SiL | SiL | Side Left |
| | | SiR | SiR | Side Right |
| | | TpBL | TpBL | Top Back Left |
| | | TpBR | TpBR | Top Back Right |
| | | TpSiL | TpSiL | Top Side Left |
| | | TpSiR | TpSiR | Top Side Right |
| | | BtFC | BtFC | Bottom Front Center |
| | | BtFL | BtFL | Bottom Front Left |
| | | BtFR | BtFR | Bottom Front Right |
| | CH | TpBC | TpBC | Top Back Center |
| | | | TpLS | Top Left Surround |
| | | | TpRS | Top right Surround |
| | | | LSd | Left surround direct |
| | | | RSd | Right Surround direct |

5. Data Transmitting Method and Data Receiving Method

In the following, methods of transmitting and receiving data following the above standard are explained by referring to FIGS. 16 to 19.

FIGS. 16 to 19 are flowcharts of a data transmitting method and a data receiving method according to various exemplary embodiments.

Figure 16:
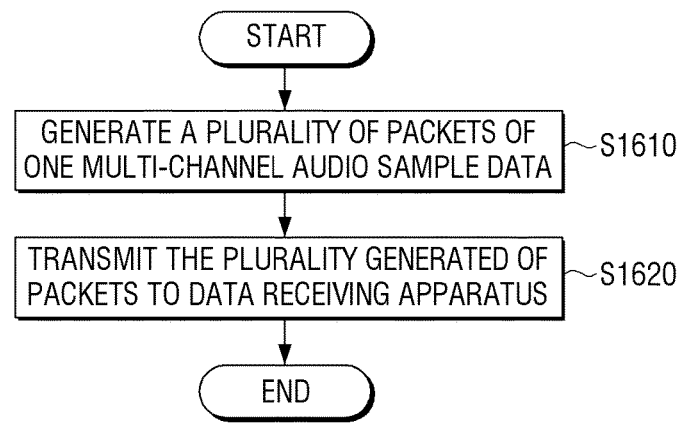
FIGS. 16 to 19 are flowcharts provided to explain a data transmitting method and a data receiving method according to various exemplary embodiments.

Referring to FIG. 16, the data transmitting method according to various exemplary embodiments may include generating a plurality of packets regarding multi-channel audio sample data at operation S1610, and transmitting the plurality of generated packets to a data receiver at operation S1620. Each of the plurality of generated packets may include an identifier field to distinguish a position or order of the packets. Each operation is already described above, and will not be further explained.

Figure 17:
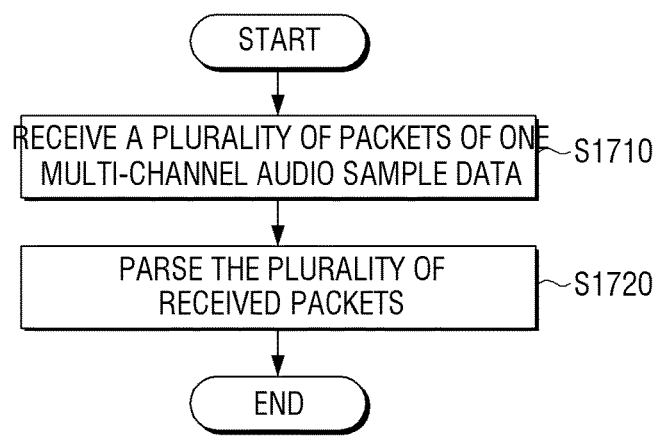

Referring to FIG. 17, the data receiving method according to various exemplary embodiments may include receiving a plurality of packets regarding multi-channel audio sample data transmitted from a data transmitter at operation S1710 and parsing the plurality of received packets at operation S1720. Each of the plurality of received packets may include an identifier field to distinguish a position or order of the packets. Each operation is already described above, and will not be further explained.

The identifier field may include predetermined bits indicating whether a packet having the identifier field is a first packet of the multi-channel audio sample data.

Figure 18:
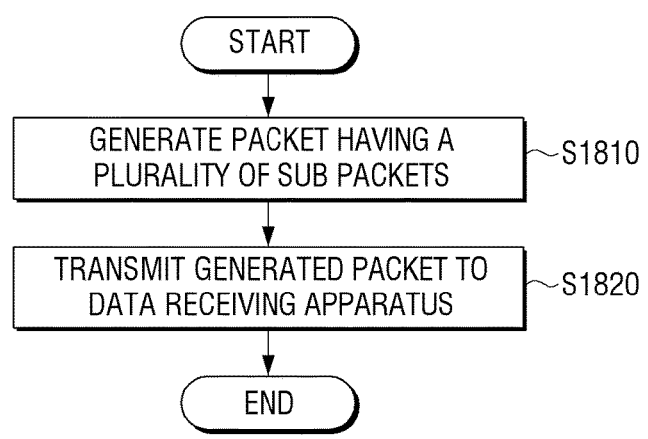

Referring to FIG. 18, the data transmitting method according to various exemplary embodiments may include generating a packet including a plurality of sub packets at operation S1810 and transmitting the generated packet to a data receiving apparatus at operation S1820. Each operation is already described above, and will not be further explained.

Figure 19:
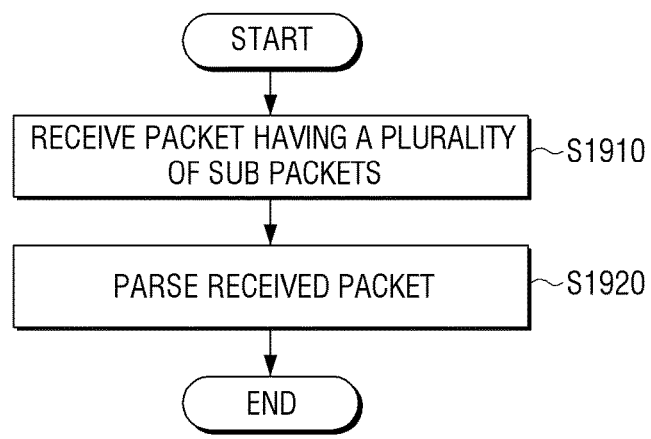

Referring to FIG. 19, the data receiving method according to various exemplary embodiments may include receiving a packet including a plurality of sub packets at operation S1910 and parsing the received packet at S1920. Each operation is already described above, and will not be further explained.

Each of the plurality of sub packets may include audio data corresponding to any one of a plurality of contents.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative and not to limit the scope of the claims, and many alternatives, modifications, and variations will be apparent to those skilled in the art.

What is claimed is:
1. A data transmitting apparatus, comprising:
a packet generator configured to packetize 3D multi-channel audio sample data into a plurality of packets; and
a transmitter configured to transmit the plurality of packets to a data receiving apparatus,
wherein each packet of the plurality of packets comprises an identifier field included in a packet header to distinguish a position of the packet within the plurality of packets of the multi-channel audio sample data or an order of the packets, and
wherein the identifier field comprises:
a predetermined bit indicating whether the packet is a first packet of the plurality of packets of the multi-channel audio sample data and its fully packed with 8 audio channels and
a predetermined bit indicating whether the packet is a middle packet or a final packet of the plurality of packets of the multi-channel audio sample data and contains 8 or fewer audio channels.
2. The data transmitting apparatus of claim 1, wherein the identifier field comprises predetermined bits indicating whether a packet having the identifier field is a first packet of the multi-channel audio sample data.

3. The data transmitting apparatus of claim 1, wherein the identifier field comprises predetermined bits indicating a packet index having the identifier field.

4. The data transmitting apparatus of claim 1, wherein each of the plurality of packets comprises at least one sub packet, and the at least one sub packet stores part of the 3D multi-channel audio sample data.

5. The data transmitting apparatus of claim 4, wherein each of the plurality of packets comprises at least one of a sample present bit indicating whether the at least one sub packet has the 3D multi-channel audio sample data and a sample flat bit indicating whether audio sample data included in the sub packets is valid.

6. The data transmitting apparatus of claim 1, wherein the 3D multi-channel audio sample data includes audio signals of 9 or more channels.

7. The data transmitting apparatus of claim 1, wherein the 3D multi-channel audio sample data is configured according to an international electrotechnical commission (IEC) 60958 format.

8. A data receiving apparatus, comprising:
a receiver configured to receive a plurality of packets of 3D multi-channel audio sample data transmitted from a data transmitting apparatus; and
a packet parser configured to parse the plurality of received packets,
wherein each packet of the plurality of received packets comprises an identifier field included in a packet header to distinguish a position within the plurality of packets of the multi-channel audio sample data or an order of the packets, and
wherein the identifier field comprises:
a predetermined bit indicating whether the packet is a first packet of the plurality of packets of the multi-channel audio sample data and is fully packed with 8 audio channels, and
a predetermined bit indicating whether the packet is a middle packet or a final packet of the plurality of packets of the multi-channel audio sample data and contains 8 or fewer audio channels.

9. The data receiving apparatus of claim 8, wherein the identifier field comprises predetermined bits indicating whether a packet having the identifier field is a first packet of one multi-channel audio sample data.

10. The data receiving apparatus of claim 8, wherein each of the plurality of received packets comprises at least one sub packet, and the at least one sub packet stores part of the 3D multi-channel audio sample data.

11. The data receiving apparatus of claim 10, wherein each of the plurality of received packets comprises at least one of a sample present bit indicating whether the at least one sub packet has the 3D multi-channel audio sample data and a sample flat bit indicating whether audio sample data included in the sub packets is valid.

12. The data receiving apparatus of claim 8, wherein the 3D multi-channel audio sample data includes audio signals of 9 or more channels.

13. The data receiving apparatus of claim 8, wherein the 3D multi-channel audio sample data is configured according to an international electrotechnical commission (IEC) 60958 format.

14. A data transceiving system, comprising:
a data transmitting apparatus configured to packetize 3D multi-channel audio sample data into a plurality of packets and to transmit the plurality of packets; and
a data receiving apparatus configured to receive the plurality of transmitted packets and to parse the received packets,
wherein each packet of the plurality of packets comprises an identifier field included in a packet header to distinguish a position of the packet within the plurality of packets of the multi-channel audio sample data or an order of the packets, and
wherein the identifier field comprises:
a predetermined bit indicating whether the packet is a first packet of the plurality of packets of the multi-channel audio sample data and is fully packed with 8 audio channels, and
a predetermined bit indicating whether the packet is a middle packet or a final packet of the plurality of packets of the multi-channel audio sample data and contains 8 or fewer audio channels.

15. The data transceiving system of claim 14, wherein the identifier field comprises predetermined bits indicating whether a packet having the identifier field is a first packet of the multi-channel audio sample data.

16. The data transmitting apparatus of claim 1, wherein the identifier field indicates whether a packet is a first packet, an odd packet of middle packets, an even packet of middle packets, or a last packet.

17. The data transmitting apparatus of claim 1, wherein the identifier field indicates that a current 3D audio sample packet of the plurality of packets is fully packetized to 8 audio channels.

18. The data receiving apparatus of claim 8, wherein the identifier field indicates that a current 3D audio sample packet of the plurality of packets is fully packetized to 8 audio channels.

19. The data transmitting apparatus of claim 1, wherein the transmitter is further configured to transmit the plurality of packets to the data receiving apparatus for a horizontal blanking interval.

20. The data receiving apparatus of claim 8, wherein the receiver is further configured to receive the plurality of packets from the data transmitting apparatus for a horizontal blanking interval.

21. The data transmitting apparatus of claim 19, wherein if a part of the plurality of packets is transmitted to the data receiving apparatus for the horizontal blanking interval, a remainder of the plurality of packets is transmitted to the data receiving apparatus for a next horizontal blanking interval.

22. The data receiving apparatus of claim 20, wherein if a part of the plurality of packets is received from the data transmitting apparatus for the horizontal blanking interval, a remainder of the plurality of packets is received from the data transmitting apparatus for a next horizontal blanking interval.

23. The data transmitting apparatus of claim 19, wherein the horizontal blanking interval comprises a data island period.

24. The data receiving apparatus of claim 20, wherein the horizontal blanking interval comprises a data island period.

25. The data transmitting apparatus of claim 1, wherein the transmission of the plurality of packets complies with a wire Interface standards.

26. The data receiving apparatus of claim 8, wherein the reception of the plurality of packets complies with a wire Interface standards.

27. The data transmitting apparatus of claim 25, wherein the wire Interface standards comprises at least one of High Definition Multimedia Interface (HDMI) standards and Mobile High-Definition Link (MHL) standards.

28. The data receiving apparatus of claim 26, wherein the wire Interface standards comprises at least one of High Definition Multimedia Interface (HDMI) standards and Mobile High-Definition Link (MHL) standards.

29. A data transmitting method, comprising:
packetizing 3D multi-channel audio sample data into a plurality of packets; and
transmitting the plurality of packets to a data receiving apparatus,
wherein each of the plurality of packets comprises an identifier field included in a packet header so that the data receiving apparatus distinguishes a position of the packet within the plurality of packets of the multi-channel audio sample data or an order of the packets, and
wherein the identifier field comprises:
a predetermined bit indicating whether the packet is a first packet or a middle packet of the plurality of packets of the multi-channel audio sample data and is fully packed with 8 audio channels, and
a predetermined bit indicating whether the packet is a final packet of the plurality of packets of the multi-channel audio sample data and contains 8 or fewer audio channels.

30. A data receiving apparatus, comprising:
a receiver configured to receive a plurality of packets of 3D multi-channel audio sample data transmitted from a data transmitting apparatus; and
a packet parser configured to parse the plurality of received packets,
wherein each of the plurality of packets comprises an identifier field included in a packet header so that the data receiving apparatus distinguishes a position of the packet within the plurality of packets of the multi-channel audio sample data or an order of the packets, and
wherein the identifier field comprises:
a predetermined bit indicating whether the packet is a first packet or a middle packet of the plurality of packets of the multi-channel audio sample data and is fully packed with 8 audio channels, and
a predetermined bit indicating, whether the packet is a final packet of the plurality of packets of the multi-channel audio sample data and contains 8 or fewer audio channels.

31. A data transceiving system, comprising:
a data transmitting apparatus configured to packetize 3D multi-channel audio sample data into a plurality of packets and to transmit the plurality of packets; and
a data receiving apparatus configured to receive the plurality of transmitted packets and to parse the received packets,
wherein each of the plurality of packets comprises an identifier field included in a packet header so that the data receiving apparatus distinguishes a position within the plurality of packets of the multi-channel audio sample data or an order of the packets, and
wherein the identifier field comprises:
a predetermined bit indicating whether the packet is a first packet of the plurality of packets of the multi-channel audio sample data and is fully packed with 8 audio channels, and
a predetermined bit indicating whether the packet is a middle packet or a final packet of the plurality of packets of the multi-channel audio sample data and contains 8 or fewer audio channels.

32. The data transmitting apparatus of claim 1, wherein the each packet of the plurality of packets comprises the packet header and four subpackets.

* * * * *